US011692443B2

(12) United States Patent
Jones et al.

(10) Patent No.: US 11,692,443 B2
(45) Date of Patent: Jul. 4, 2023

(54) BOUNDARY LAYER TURBOMACHINE

(71) Applicant: Wesley Turbines IP Limited, Coventry (GB)

(72) Inventors: Mark W. Jones, Birmingham (GB); Billy W. Helton, Pleasant Grove, UT (US)

(73) Assignee: Wesley Turbines IP Limited, Coventry (GB)

( * ) Notice: Subject to any disclaimer, the term of this patent is extended or adjusted under 35 U.S.C. 154(b) by 0 days.

(21) Appl. No.: 16/331,893

(22) PCT Filed: Sep. 8, 2017

(86) PCT No.: PCT/IB2017/001528
§ 371 (c)(1),
(2) Date: Mar. 8, 2019

(87) PCT Pub. No.: WO2018/047018
PCT Pub. Date: Mar. 15, 2018

(65) Prior Publication Data
US 2019/0264566 A1  Aug. 29, 2019

Related U.S. Application Data

(60) Provisional application No. 62/385,236, filed on Sep. 8, 2016.

(51) Int. Cl.
*F01D 1/36* (2006.01)
*F03B 5/00* (2006.01)

(52) U.S. Cl.
CPC ............ *F01D 1/36* (2013.01); *F03B 5/00* (2013.01); *F05D 2240/30* (2013.01); *Y02E 10/20* (2013.01)

(58) Field of Classification Search
None
See application file for complete search history.

(56) References Cited

U.S. PATENT DOCUMENTS 1,061,142 A   5/1913  Tesla
1,061,206 A   5/1913  Tesla
(Continued)

FOREIGN PATENT DOCUMENTS

EP   3103962 A1   12/2016
GB   2226081 A    6/1990
(Continued)

OTHER PUBLICATIONS

Harikishan et al.; "Design and Operation of Tesla Turbo Machine—A State of the Art Review"; International Journal of Advanced Transport Phenomena; (Jan.-Dec. 2013); pp. 7-14; vol. 2, No. 1.; BASHA Research Centre.

*Primary Examiner* — David E Sosnowski
*Assistant Examiner* — Jason G Davis
(74) *Attorney, Agent, or Firm* — Thorpe North & Western, LLP

(57) ABSTRACT

A boundary layer turbomachine can include a housing (10) defining an interior space and having an inlet opening and an outlet opening to facilitate movement of a fluid through the housing (10). The boundary layer turbomachine can also include a rotor assembly (20) disposed in the rotor chamber and configured to rotate about an axis of rotation (1). The rotor assembly (20) can have a plurality of disks (21) spaced apart along the axis of rotation (1) to provide gaps (54) between the disks (21). The plurality of disks (21) can also define an interior opening (26) along the axis of rotation (1). The rotor assembly (20) can have a disk carrier (46) disposed at least partially in the interior opening (26) in support of the plurality of disks (21). The disk carrier (46) can have a fluid passageway (47) exposed to two or more of the gaps (Continued)

(54) between the disks (21). The fluid can pass through gaps (54) between the disks (21) and the interior opening (26) as the fluid moves through the housing (10).

23 Claims, 37 Drawing Sheets

(56) References Cited

U.S. PATENT DOCUMENTS

| | | | |
|---|---|---|---|
| 3,007,311 A * | 11/1961 | Amero | F01D 1/36 60/805 |
| 3,899,875 A | 8/1975 | Oklejas et al. | |
| 4,100,140 A | 7/1978 | Zahir et al. | |
| 4,232,992 A | 11/1980 | Possell | |
| 4,403,911 A | 9/1983 | Possell | |
| 4,449,888 A | 5/1984 | Baljé | |
| 4,534,699 A * | 8/1985 | Possell | F01D 17/165 415/42 |
| 4,586,871 A * | 5/1986 | Glass | F01D 1/36 415/90 |
| 4,655,679 A | 4/1987 | Giacomel | |
| 4,773,819 A | 9/1988 | Gurth | |
| 4,940,385 A | 7/1990 | Gurth | |
| 5,174,726 A * | 12/1992 | Findlay | F04D 1/06 415/90 |
| 5,297,926 A | 3/1994 | Negishi | |
| 5,497,615 A | 3/1996 | Noe et al. | |
| 6,132,080 A | 10/2000 | Gurth | |
| 6,375,412 B1 | 4/2002 | Dial | |
| 6,503,067 B2 | 1/2003 | Palumbo | |
| 6,512,305 B1 | 1/2003 | Pinkerton et al. | |
| 6,692,232 B1 | 2/2004 | Letourneau | |
| 6,726,442 B2 | 4/2004 | Letourneau | |
| 6,779,964 B2 | 8/2004 | Dial | |
| 6,973,792 B2 | 12/2005 | Hicks | |
| 7,023,103 B2 | 4/2006 | Zinck | |
| 7,097,416 B2 | 8/2006 | Gurth | |
| 7,192,244 B2 | 3/2007 | Grande, III et al. | |
| 7,241,106 B2 * | 7/2007 | Avina | F01D 1/36 415/100 |
| 7,478,990 B2 | 1/2009 | Wilson | |
| 7,695,242 B2 | 4/2010 | Fuller | |
| 8,061,997 B2 | 11/2011 | Le Hong et al. | |
| 8,425,179 B2 | 4/2013 | Hesting | |
| 8,453,428 B1 | 6/2013 | Kinde, Sr. | |
| 8,622,056 B2 | 1/2014 | Bohl | |
| 8,636,910 B2 | 1/2014 | Irvin, Sr. et al. | |
| 8,776,522 B2 | 7/2014 | Schubert | |
| 8,801,359 B2 | 8/2014 | Sherrer | |
| 8,833,338 B2 | 9/2014 | Pekrul | |
| 8,863,530 B2 | 10/2014 | Bergen | |
| 8,863,723 B2 | 10/2014 | Shkolnik et al. | |
| 9,260,967 B2 * | 2/2016 | Shi | F01D 1/34 |
| 9,841,000 B2 * | 12/2017 | Greenblatt | F03B 5/00 |
| 2003/0086782 A1* | 5/2003 | Moorehead | F01D 1/36 415/1 |
| 2005/0019154 A1 | 1/2005 | Dial | |
| 2005/0276681 A1* | 12/2005 | Avina | F01D 1/36 415/1 |
| 2006/0112823 A1 | 6/2006 | Avina | |
| 2006/0233647 A1 | 10/2006 | Saunders | |
| 2012/0171031 A1 | 7/2012 | Chevrette | |
| 2012/0288226 A1 | 11/2012 | Konde et al. | |
| 2013/0039742 A1 | 2/2013 | Wilson et al. | |
| 2013/0227940 A1* | 9/2013 | Greenblatt | F03B 5/00 60/327 |
| 2014/0102115 A1 | 4/2014 | Tepic | |
| 2014/0252772 A1 | 9/2014 | Hui et al. | |
| 2016/0258442 A1* | 9/2016 | Helton | F04D 29/448 |

FOREIGN PATENT DOCUMENTS

| | | |
|---|---|---|
| WO | WO 2005/081766 A2 | 9/2005 |
| WO | WO 2008/070369 A2 | 6/2008 |
| WO | WO 2009/150427 A2 | 12/2009 |
| WO | WO 2012/152447 A1 | 11/2012 |
| WO | WO 2013/040334 A2 | 3/2013 |

* cited by examiner

BOUNDARY LAYER TURBOMACHINE

BACKGROUND

Transfer of motive force between stacked rotating disks and a fluid is described by Tesla in U.S. Pat. Nos. 1,061,142 and 1,061,206. According to these patents, fluid drags on closely spaced rotating disks due to viscosity and adhesion of a surface layer of the fluid, which subjects the fluid to two forces, one acting tangentially in the direction of rotation and the other acting radially outward. The combined effect of these tangential and centrifugal forces is to propel the fluid with continuously increasing velocity in a spiral path until it reaches a suitable peripheral outlet from which it is ejected.

The design described by Tesla can be used as a pump or as a motor. Such devices take advantage of the properties of a fluid when in contact with the rotating surfaces of the disks. If the disks are driven by the fluid, then as the fluid passes between the spaced apart disks, the movement of the fluid causes the disks to rotate thereby generating power which can be transmitted external to the device via a shaft to provide motive force for various applications. Accordingly, such devices function as a motor or turbine. On the other hand, if the fluid is essentially static, rotation of the disks will cause the fluid to commence rotating in the same direction as the disks and to thus draw the fluid through the device, thereby causing the device to function as a pump or a fan. In this disclosure, all such devices, whether used as a motor or as a pump or fan, are referred to generically as "boundary layer turbomachines."

Despite numerous improvements to the original design by Tesla, such machines have found limited practical application due to various drawbacks such as reliability and costs. A typical boundary layer turbomachine has several shortcomings. The thin disks of a typical boundary layer turbomachine tend to deflect under operating loads, which can cause contact with other disks and/or other structures, such as a housing that encloses the disks. To minimize this potentially destructive contact, some boundary layer turbomachines include features such as dimples incorporated into the housing or through-bolts which act as spacers. In addition, efficiencies of typical boundary layer turbomachines can be limited. Accordingly, improvements in boundary layer turbomachine design continue to be sought.

SUMMARY

A boundary layer turbomachine is disclosed herein that can minimize or eliminate disk deflections that tend to cause contact between adjacent disks and/or a housing. In one aspect, principles are disclosed herein that also provide increased efficiency of the boundary layer turbomachine. The boundary layer turbomachine can include a housing defining an interior space and having an inlet opening and an outlet opening to facilitate movement of a fluid through the housing. The boundary layer turbomachine can also include a rotor assembly disposed in the rotor chamber and configured to rotate about an axis of rotation. The rotor assembly can have a plurality of disks spaced apart along the axis of rotation to provide gaps between the disks. The plurality of disks can also define an interior opening along the axis of rotation. The rotor assembly can have a disk carrier disposed at least partially in the interior opening in support of the plurality of disks. The disk carrier can have a fluid passageway exposed to two or more of the gaps between the disks. The fluid can pass through gaps between the disks and the interior opening as the fluid moves through the housing.

In one aspect, a rotor assembly for a boundary layer turbomachine is disclosed. The rotor assembly can include a plurality of disks spaced apart along an axis of rotation to provide gaps between the disks. The plurality of disks can define an interior opening along the axis of rotation. The rotor assembly can also include a disk carrier disposed at least partially in the interior opening in support of the plurality of disks. The disk carrier can have a fluid passageway exposed to at least two of the gaps between the disks, such that fluid passes through the at least two of the gaps between the disks and the interior opening as the fluid moves through the rotor assembly.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1A:
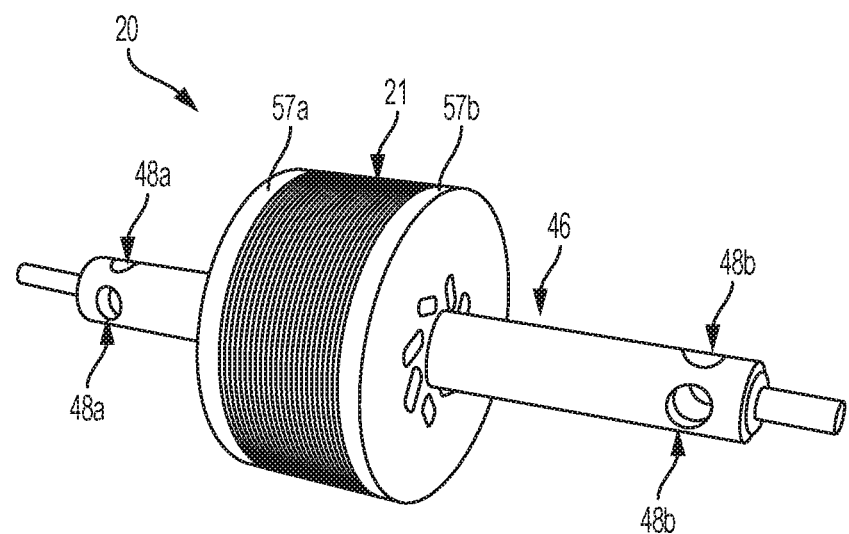
FIG. 1A is a perspective view of a rotor assembly of a boundary layer turbomachine in accordance with an example of the present disclosure.
Figure 1B:
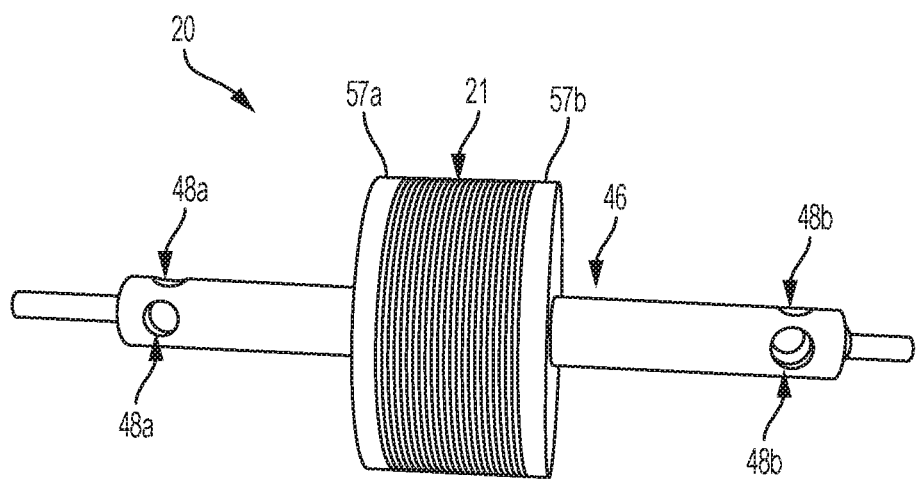
FIG. 1B is a side view of the rotor assembly of FIG. 1B.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "a disk" includes reference to one or more of such disks and reference to "the spacer" refers to one or more of such spacers.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, "boundary layer thickness" refers to a distance from a solid surface at which the viscous flow velocity is 99% of a freestream velocity. Most often, the turbomachine can be operated under substantially laminar conditions, although the device can sometimes be functional under turbulent conditions.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, or combinations of each.

As used herein, the term "about" is used to provide flexibility and allow for imprecision associated with a given term, metric or value. The degree of flexibility for a particular variable can be readily determined by one skilled in the art. However, unless otherwise enunciated, the term "about" generally connotes flexibility of less than 5%, and most often less than 1%, and in some cases less than 0.01%.

Numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Boundary Layer Turbomachine

Figure 1C:
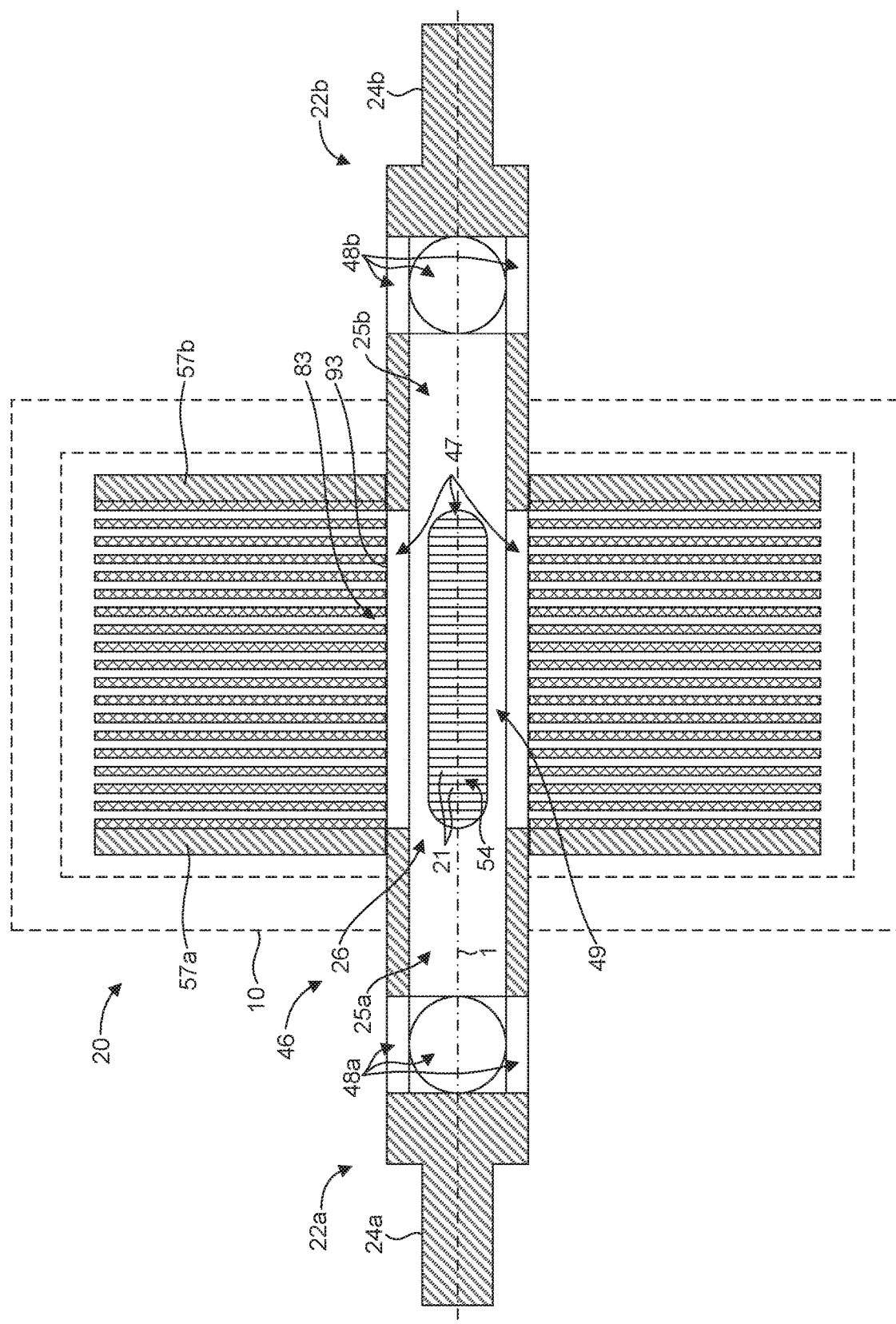
FIG. 1C is a side cross-sectional view of the rotor assembly of FIG. 1A.
Figure 1D:
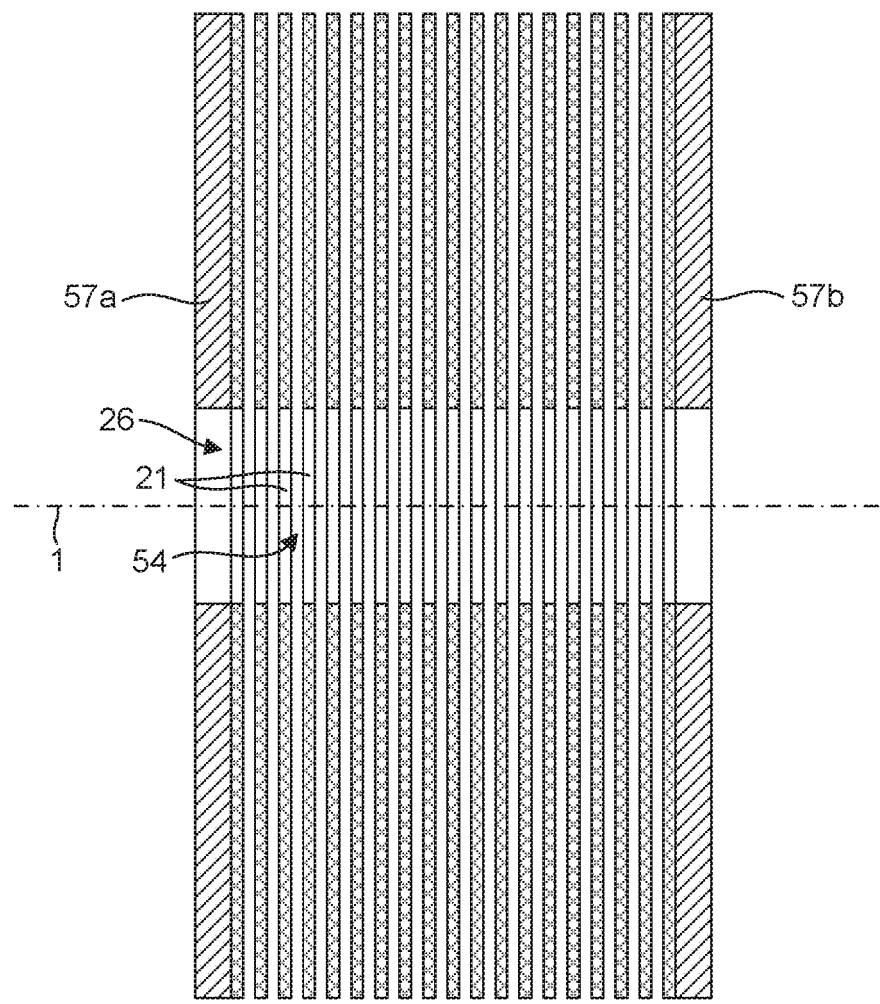
FIG. 1D is a cross-sectional view of a disk pack of the rotor assembly of FIG. 1A.
Figure 1E:
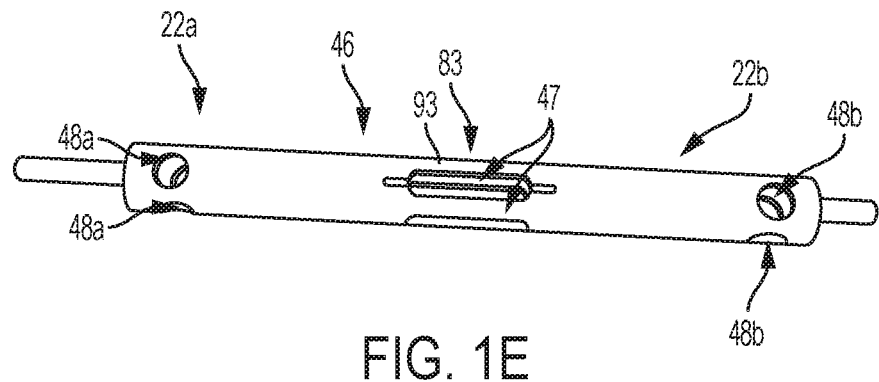
FIGS. 1E and 1F illustrate a disk carrier 46 of the rotor assembly of FIG. 1A.
Figure 1F:
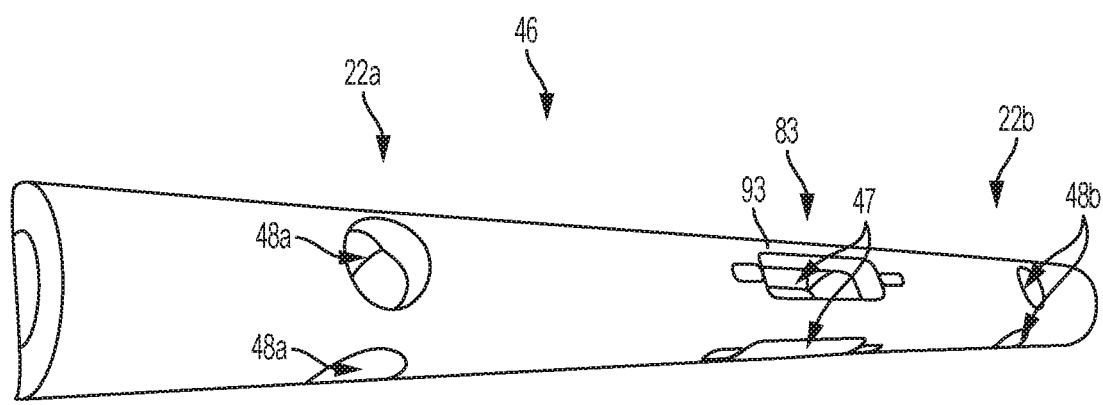
Figure 1G:
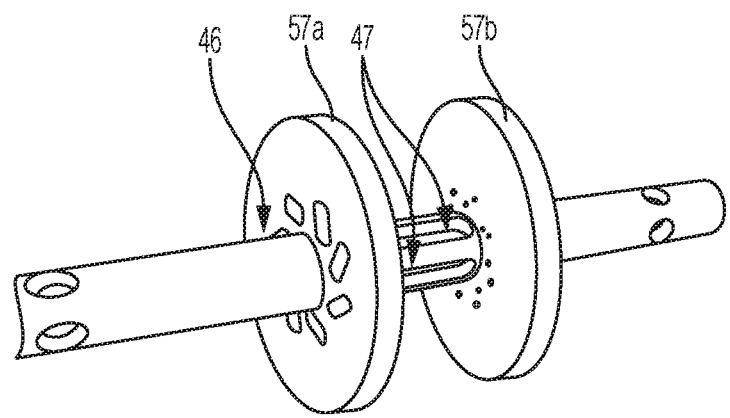
FIGS. 1G and 1H illustrate an assembly of outer support disks and the disk carrier of the rotor assembly of FIG. 1A.
Figure 1H:
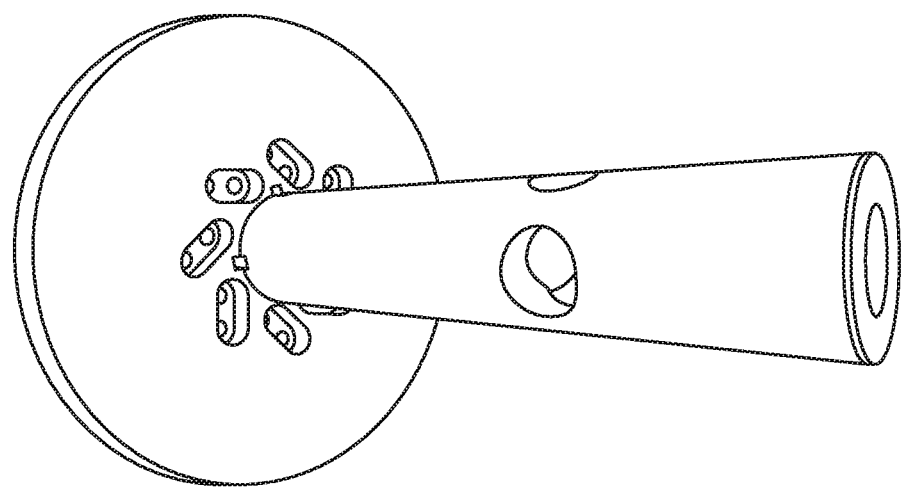

With reference to FIGS. 1A-1J, aspects and features of a rotor assembly 20 are illustrated in accordance with an example of the present disclosure. The complete rotor assembly 20 is shown in perspective and side views in FIGS. 1A and 1B, respectively. The rotor assembly 20 can include a plurality of disks 21 oriented about a disk carrier 46. Outer support disks 57a, 57b can be disposed about opposite ends of the plurality of disks 21. The outer support disks 57a, 57b can be used to "cap" ends of the disks 21, thus providing smooth exposed disk faces on opposite ends of a disk pack or assembly. A side cross-sectional view of the rotor assembly 20 is shown in FIG. 1C. A cross-section of the disk pack or assembly, including the disks 21 and the outer support disks 57a, 57b, is shown isolated from the disk carrier in FIG. 1D. The disk carrier 46 is shown isolated in FIGS. 1E and 1F. The outer support disks 57a, 57b and the disk carrier 46 are shown in FIGS. 1G and 1H. Thus, the plurality of disks 21 and outer support disks 57a, 57b are parallel to one another and are oriented about a common rotational axis. Typically, the plurality of disks and outer support disks are circular and have a common outer diameter.

The disk carrier 46 can include a disk portion 83 and extension portions 22a, 22b as illustrated in FIG. 1C. The extension portions 22a, 22b can be configured to couple the rotor assembly 20 to a portion of a turbomachine as disclosed herein (e.g., a housing 10 shown in phantom lines in FIG. 1C) and facilitate rotation of the rotor assembly 20 about an axis of rotation 1. For example, the extension portions 22a, 22b can extend in opposite directions from the plurality of disks 21 and can be substantially inline to facilitate rotation of the rotor assembly about the axis 1. The extension portions 22a, 22b can be mounted on bearings when coupled to the housing 10 to provide a low friction rotational interface. In one alternative, the bearings can comprise brush bearing seals although other rotational interfaces can be used.

With particular reference to FIGS. 1C and 1D, the plurality of disks 21 can be spaced apart along the axis of rotation 1 to provide gaps 54 between the disks. In one aspect, the disks can be substantially planar and oriented perpendicular to the axis of rotation, although any suitable disk configuration can be utilized, such as a conical disk configuration or other dimensions and configurations as outlined further below in connection with any one of the embodiments described herein. For example, non-planar disks can be nested to form a rotor assembly using the principles described herein. Regardless, outer surfaces of adjacent disks 21 can be substantially parallel to one another throughout. Furthermore, any suitable number of disks can be utilized (e.g., depending on power requirements), although typically more than five and most often more than ten disks are utilized. The plurality of disks 21 can define an interior opening 26 (radially internal to the plurality of disks 21) along the axis of rotation 1.

As shown in FIG. 1C, the disk carrier 46 can be disposed at least partially in the interior opening 26 in support of the plurality of disks 21. For example, the disks 21 (e.g., individual disks or in groups of two or more) can be slid or otherwise positioned over the disk portion 83 of the disk carrier 46. The disks can generally have an inner opening diameter which is about equal to an outer diameter of the disk carrier. This can allow the disks to be merely contacting the disk carrier and friction fit together. Alternatively, the inner perimeter of each disk can be secured to an outer surface of the disk carrier (e.g. gluing, welding, notches, etc).

The disks can be positioned about the disk carrier 46 such that one or more fluid passageways 47 of the disk carrier 46 can be exposed to two or more of the gaps 54 between the disks 21. These fluid passageways 47 can be openings along the disk carrier. In other words, one or more fluid passageways 47 can overlap or traverse two or more of the gaps 54 between the disks 21 such that the fluid passageways 47 and the multiple gaps 54 are in fluid communication. Thus, fluid can pass through the gaps 54 between the disks 21 and the interior opening 26 as the fluid moves through the rotor assembly 20. The outer support disks 57a, 57b can be located outside or in a non-overlapping relationship with the inner fluid passageways 47. The disks 21 are omitted to reveal the inner fluid passageways 47 in FIG. 1G. Any suitable number of fluid passageways 47 can be included. In one aspect, the disk carrier 46 can include at least three fluid passageways. The fluid passageways 47 can have any suitable configuration, individually or collectively. In one aspect, the fluid passageways 47 can be distributed (uniformly or non-uniformly) circumferentially about the disk carrier 46. In one example, the fluid passageways 47 can comprise elongated slots extending longitudinally along the rotation axis 1 of the disk carrier 46. However, the fluid passageways can be circular, rectangular, overlapping, etc. Typically, the fluid passageways 47 can extend a distance corresponding to a width of the plurality of disks 21. In this manner, each of the gaps 54 is fluidly connected to the interior opening 26 via the fluid passageways 47. As a general rule, the fluid passageways 47 can comprise from about 20% to about 95% of an external area of the disk portion 83, and generally from about 50% to 90%. The fluid passageways can generally have any shape or size as long as structural integrity of the disk carrier is maintained over expected operating conditions.

With fluid entering the disk carrier 46 (e.g., via the fluid passageways 47), the disk carrier 46 can include a central chamber 49, which can serve as a conduit for fluid to move through the disk carrier 46. In one aspect, the extension portions 22a, 22b can also facilitate movement of fluid through the disk carrier 46. For example, the extension portions 22a, 22b can include vent ports 25a, 25b extending through the respective extension portions in fluid communication with the central chamber 49 of the disk carrier 46 (i.e., in fluid communication with the interior opening 26). In addition, the extension portions 22*a*, 22*b* can include outer fluid passageways 48*a*, 48*b* in fluid communication with the vent ports 25*a*, 25*b*, respectively. Thus, fluid can exit the housing 10 via the disk carrier 46 by passing through the inner fluid passageways 47, the central chamber 49, the vent ports 25*a*, 25*b*, and the outer fluid passageways 48*a*, 48*b*. In this manner, fluid exits the disk carrier 46 off axis through fluid passageways 48*a*, 48*b*. Fluid can also enter the housing 10 in the reverse direction through these openings in the disk carrier 46 when operated as a pump or fan. The disk carrier 46 can therefore facilitate the exhaust of fluids from, or the inlet of fluids into, the housing 10 of a turbomachine. The inner fluid passageways 47, the central chamber 49, the vent ports 25*a*, 25*b*, and the outer fluid passageways 48*a*, 48*b* of the disk carrier 46 can have any suitable configuration providing that there is sufficient area to allow for fluid (in a liquid and/or gaseous state) to pass through without undue restriction while maintaining the structural integrity of the disk carrier 46.

In one aspect, the extension portion 22*a*, 22*b* can facilitate coupling the rotor assembly 20 to a generator or a motor. For example, the extension portion 22*a*, 22*b* can include interface features or surfaces 24*a*, 24*b* to interface with, and facilitate coupling to, a drive component such as a generator or a motor. The interface features 24*a*, 24*b* can have any suitable configuration in accordance with these objectives. In one aspect, a generator (e.g., an electric generator or a pump) can be coupled to the rotor assembly 20 to generate power as the fluid moves through the rotor assembly 20. In another aspect, a motor can be coupled to the rotor assembly 20 to cause rotation of the rotor assembly, thereby causing movement of the fluid through the rotor assembly 20 and utilizing a boundary layer turbomachine as a pump. The extension portion 22*a*, 22*b* can therefore serve as a mechanical transfer coupling for the rotor assembly 20 to an external device, such as a generator or a motor. Any suitable generator or motor can be utilized with the boundary layer turbomachines described herein, as long as such components are properly designed and sized as with other types of pumps or turbines.

The disk carrier 46 can provide benefits in balancing the disks 21 upon assembly. For example, an outer surface 93 of the disk portion 83 of the disk carrier 46 can be configured to interface with inner radial surfaces of the disks 21 and outer support disks 57*a*, 57*b*. The outer surface 93 can therefore serve as a locating feature for the disks of the disk pack, which can maintain consistency of assembly and reduce variation in location among the disks relative to the rotational axis 1. Thus, the disk carrier 46 can improve the degree and ease of balancing the disks 21, which is beneficial in operation particularly as the turbomachine increases in rpm, and during the initial startup where the torque is very low at low rpm.

Although the various components of the rotor assembly 20 can be constructed of any suitable material, in one aspect the rotor assembly 20 (e.g., the disks 21 and/or the disk carrier 46) can be made in whole or in part from a composite material, such as carbon fiber composite (e.g., Toray T800S), basalt fiber composite, or any other suitable lightweight structural material. In one example, the disks 21 can be formed of a woven fiber composite material (e.g. warp/weft). In one embodiment, the woven fiber material can be a basalt fiber material such as, but not limited to, commercially available 15582/50 material. In another example, the disks 21 can be formed of a ceramic composite material, which may be advantageous for high temperature applications. In one aspect, the disk carrier 46 can be made of a metal, such as aluminum, stainless steel, and/or titanium, a ceramic, a carbon fiber composite, or the like. As a general guideline, the rotor assembly 20 can be designed to provide a low mass to surface area ratio. Typically, a lower mass to surface area ratio provides improved performance as long as sufficient strength is maintained in the rotor assembly 20. In some cases, the rotor assembly 20 can be provided as a complete unit as a replacement of a damaged or worn rotor assembly.

Figure 1I:
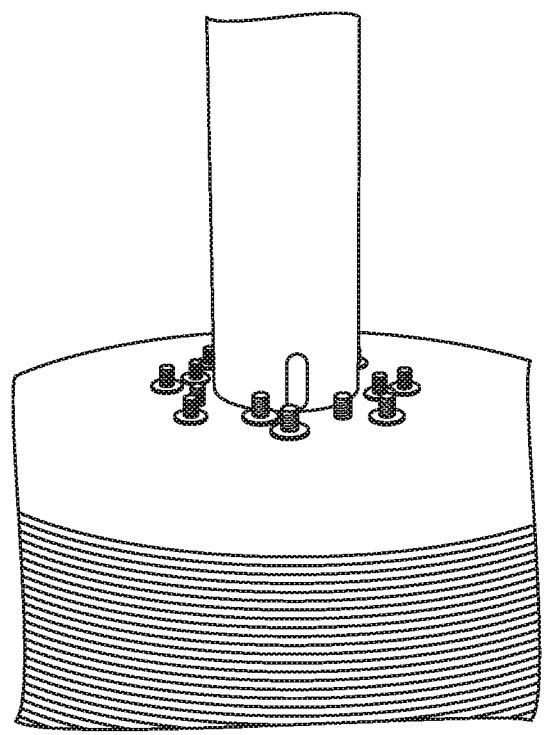
FIG. 1I illustrates an assembly of disks on the disk carrier of the rotor assembly of FIG. 1A.
Figure 1J:
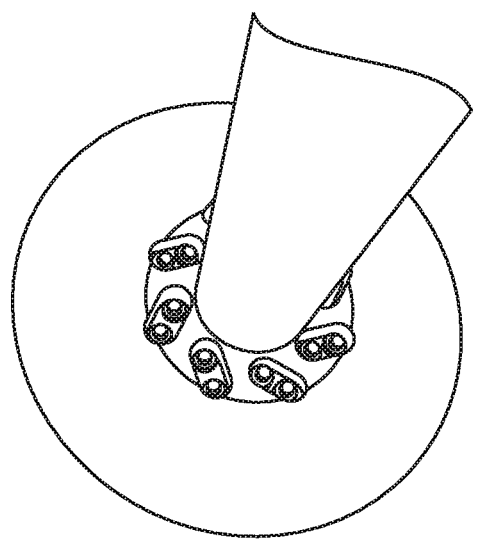
FIG. 1J illustrates the outer support disks assembled on the disk carrier of the rotor assembly of FIG. 1A.

FIG. 1I shows assembly of the disks 21 on the disk carrier 46 and FIG. 1J shows the outer support disks assembled on the disk carrier. The disks 21 can be secured to one another and the outer support disks 57*a*, 57*b* with one or more fasteners or rods. Furthermore, as discussed in more detail in connection with a related variation, spacers can be optionally used to maintain a uniform gap distance between adjacent disks. These spacers can have various shapes and can be fixed via permanent means or via through-holes which extend through the plurality of disks (e.g. FIG. 1I). Notably, these rotor assemblies 20 which include a disk carrier can also be used in connection with any of the configurations illustrated and described in more detail with respect to FIGS. 2-23C.

Figure 1K:
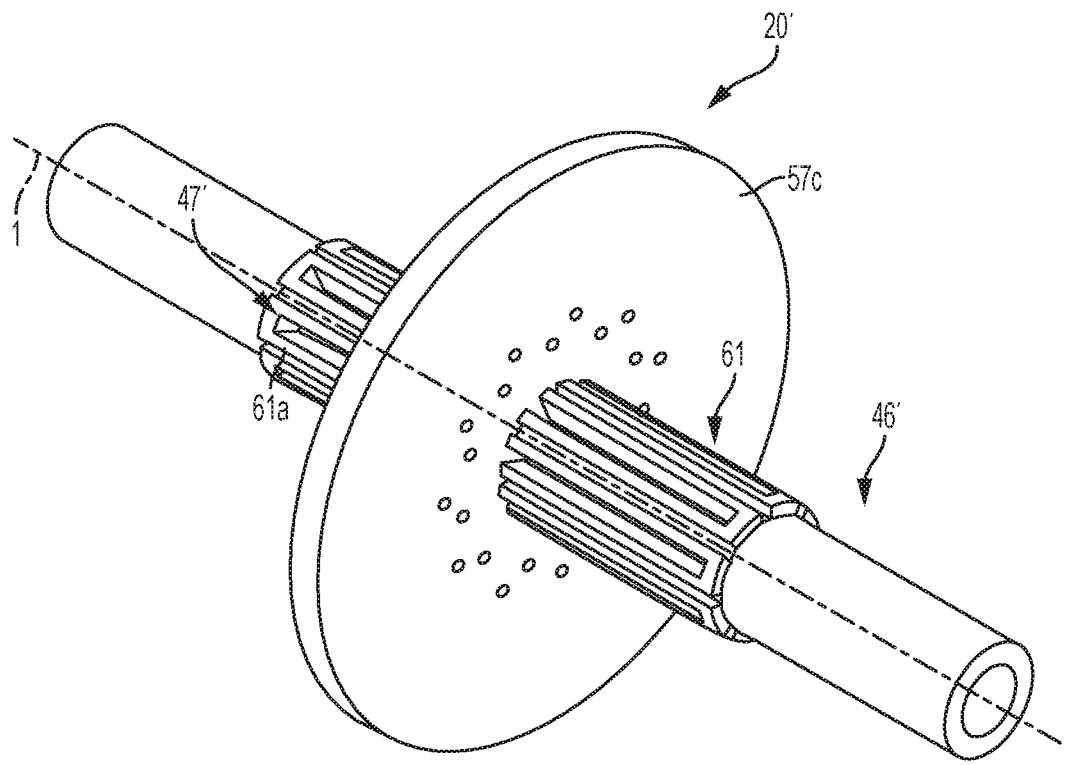
FIGS. 1K and 1L illustrate aspects and features of a rotor assembly in accordance with an example of the present disclosure.
Figure 1L:
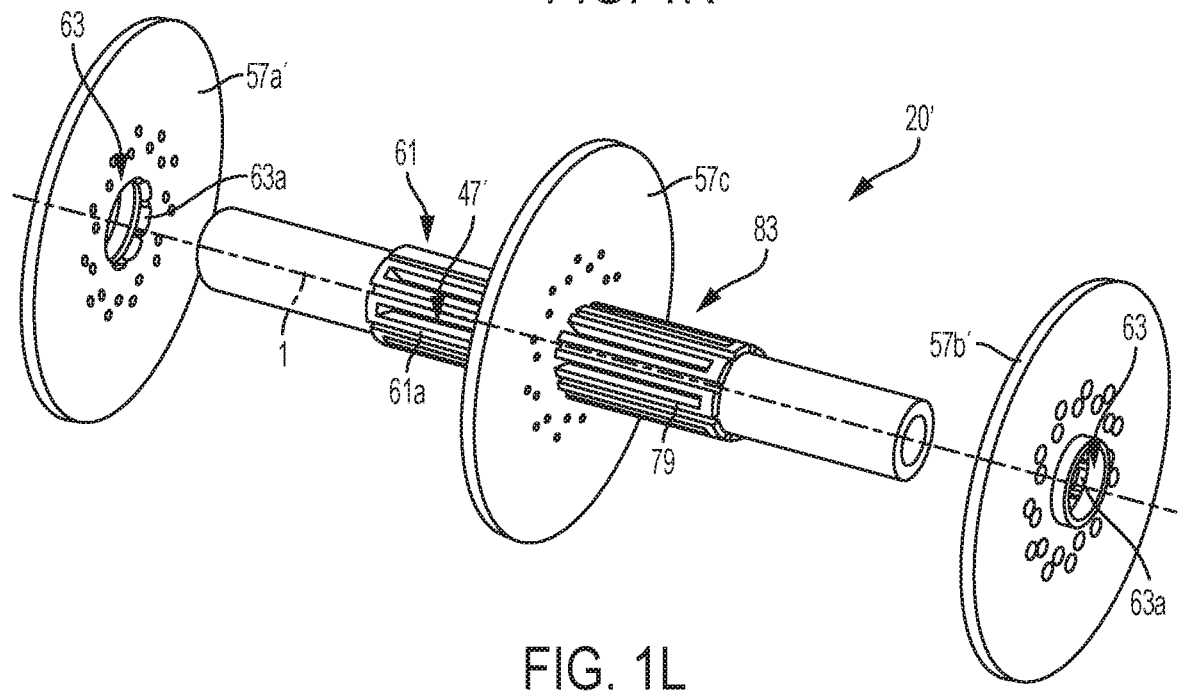

With reference to FIGS. 1K and 1L, aspects and features of a rotor assembly 20' are illustrated in accordance with another example of the present disclosure. The plurality of disks identified by reference number 21 above have been omitted from these figures for clarity. In this case, a disk carrier 46' can be configured to couple any of the various disks of a rotor assembly. This can ease assembly and provide torque transfer directly between a given rotor assembly disk and the disk carrier 46'. For example, the disk carrier 46' can include a disk coupling interface portion 61, and one or more of the rotor assembly disks can have a carrier coupling interface portion. Such a carrier coupling interface portion is shown in FIG. 1L, as an example, by reference number 63 on outer support disks 57*a*', 57*b*'. An inner support disk 57*c* can be included between disks 21 discussed above to provide additional support for the disks 21. The outer and inner support disks are utilized to couple with and provide support for the plurality of disks 21 (discussed above) in the rotor assembly. In one embodiment, the inner support disk 57*c* can be integrally formed with the disk carrier 46' (e.g., fixedly coupled to one another, such as by welding). In a particular aspect of this embodiment, a portion of the inner support disk 57*c* can partition a central chamber within the disk carrier 46' by extending through the disk carrier 46', thus blocking or obstructing the central chamber local to the mid-span support. In this case, fluid is prevented from passing entirely through the disk carrier, as the central opening has been separated and subdivided by the inner support disk 57*c*. Alternatively, the inner support disk 57*c* can include a central aperture that forms a portion of a central chamber thus allowing fluid to pass entirely through the disk carrier 46'. In other embodiments, the inner support disk 57*c* can include a carrier coupling interface portion that is the same or different from a carrier coupling interface portion included in the outer support disks 57*a*', 57*b*'. The disk coupling interface portion 61 and the carrier coupling interface portion(s) 63 can interface to couple the disk carrier and the rotor assembly disks to one another. In one embodiment, all of the rotor assembly disks will have carrier coupling interface portions, although any combination of rotor assembly disks can have carrier coupling interface portions.

As shown in FIGS. 1K and 1L, the disk coupling interface portion 61 of the disk carrier can comprise protrusions 61a that extend radially outward relative to the axis of rotation 1. On the other hand, the rotor assembly disks (e.g., outer support disks 57a', 57b' of FIG. 1L) can have protrusions 63a that extend radially inward toward the axis of rotation 1. Thus, the disk coupling interface portion 61 and the carrier coupling interface portion 63 can comprise complementary protrusions 61a, 63a that, when coupled, are circumferentially offset from one another about the axis of rotation 1. The outer support disks 57a', 57b' are configured to be disposed at outer ends of the plurality of disks 21, and the inner support disk 57c is configured to be disposed between at least two of the plurality of disks. Thus, the various disks of the rotor assembly can be directly coupled to the disk carrier 46' in a manner to transfer torque between the components about the axis of rotation 1. In other words, the coupling interfaces provided by the coupling interface portions 61, 63 can facilitate coupling to one another to prevent relative movement in a rotational degree of freedom about the axis of rotation 1.

It should be recognized that the coupling interface portions 61, 63 can have any suitable configuration. For example, the complementary protrusions 61a, 63a can be of any suitable configuration to form a rotationally fixed interface between the disks (e.g., the outer support disks, 57a, 57b, the inner support disk 57c, and/or the disks 21) and the corresponding coupling interface portion on the disk carrier 46'. In one embodiment, the protrusions 61a, 63a can be splines of any suitable configuration, such as castellated profile splines or any other suitable spline profile or shape. The coupling interface portions 61, 63 can have any suitable type of fit with one another. For example, the complementary protrusions 61a, 63a of the coupling interface portions 61, 63 can be sized for a clearance fit, a transition fit, or an interference fit. The geometry of the complementary protrusions 61a, 63a can provide a mechanical resistance to relative rotation between the coupling interface portions 61, 63 about the axis of rotation 1 that is sufficient to prevent such relative rotation. As a result, the disk carrier 46', disks 21, and support disks 57a,57b,57c can rotate together as a single unit. In one aspect, the protrusions 61a, 63a can extend parallel to the axis of rotation 1 (as illustrated in FIGS. 1K and 1L) or may extend helically about the axis of rotation 1. In another aspect, the protrusions 61a, 63a can extend in the radial direction from a cylindrical base shape (as illustrated in FIGS. 1K and 1L) or a conical base shape (i.e., tapering along the axis of rotation 1). In a further aspect, radial heights of the protrusions 61a, 63a can be constant or variable (e.g., tapering in height) along the axis of rotation 1. In addition, a weld or adhesive can be applied at the interface of the protrusions 61a, 63a to fix the coupling interface portions 61, 63 to one another.

With further reference to FIGS. 1K and 1L, fluid passageways 47' of the disk carrier 46' can be defined at least in part by spans 79 in the disk portion 83' extending along the axis of rotation 1. As illustrated, the spans 79 can extend parallel to the axis of rotation 1, although other configurations are contemplated, such as extending helically about the axis of rotation 1. As shown in the figures, the disk coupling interface portion 61 can be associated with the spans 79, and in some cases can be commensurate in longitudinal length. In one aspect, the spans 79 can be integrated with the coupling interface portion 61, such as forming at least a part of the protrusions 61a and/or a recess between adjacent protrusions configured to receive an interfacing protrusion 63a of a disk. Integrating the interlocking coupling interface portion 61 with the spans 79 can improve disk alignment and maximize the fluid exit area of the fluid passageways 47' to and from the inner chamber. The inner support disk 57c can be positioned anywhere along the spans 79. Thus, in this embodiment, the inner support disk 57c can provide mid-span support for the spans 79. In contrast, the outer support disks 57a', 57b' in the illustrated example are configured to abut ends of the disk coupling interface portion 61 proximate the outer ends of the spans 79, thus limiting their position to ends of the disk portion 83' of the disk carrier 46'.

Figure 1M:
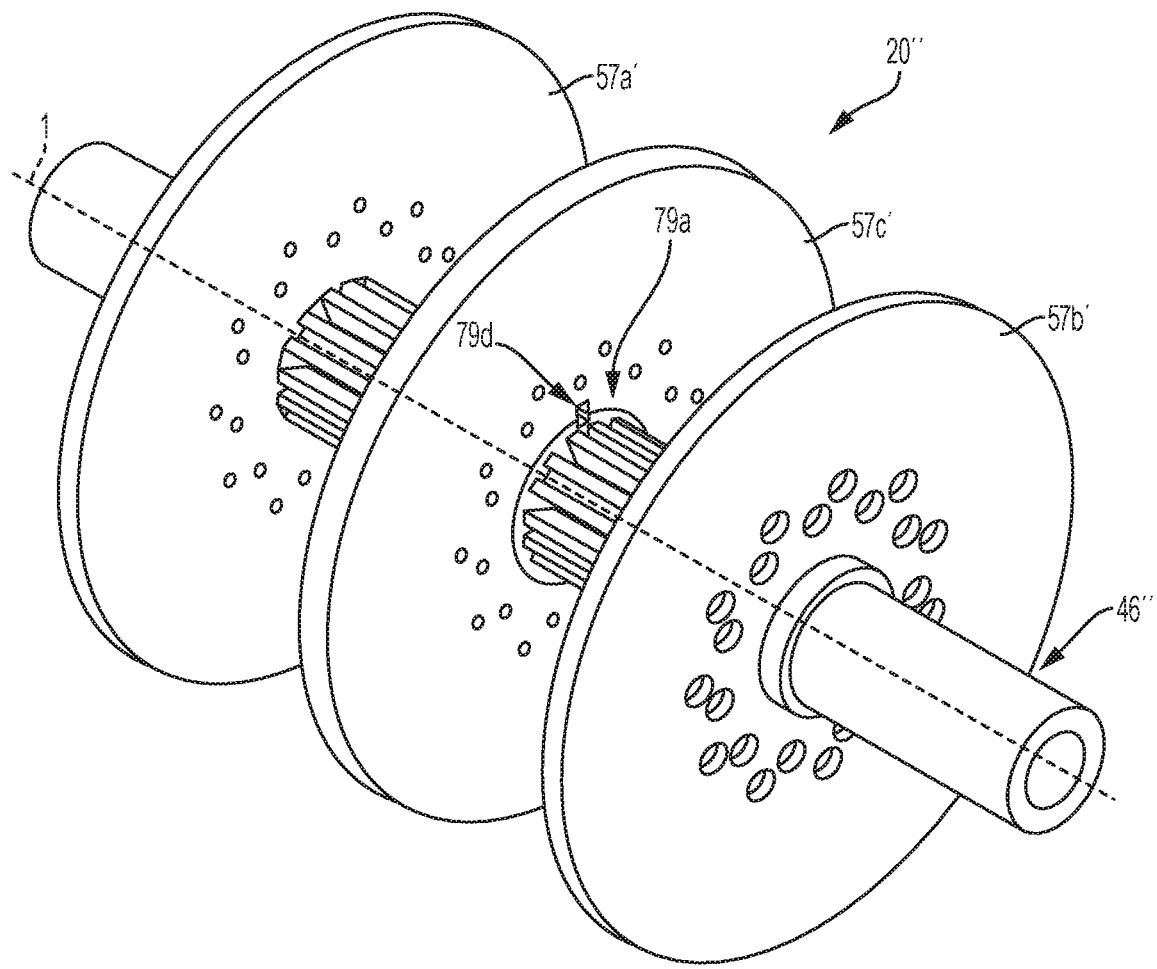
FIGS. 1M-1T illustrate aspects and features of a rotor assembly having a keyed disk carrier in accordance with another example of the present disclosure.
Figure 1N:
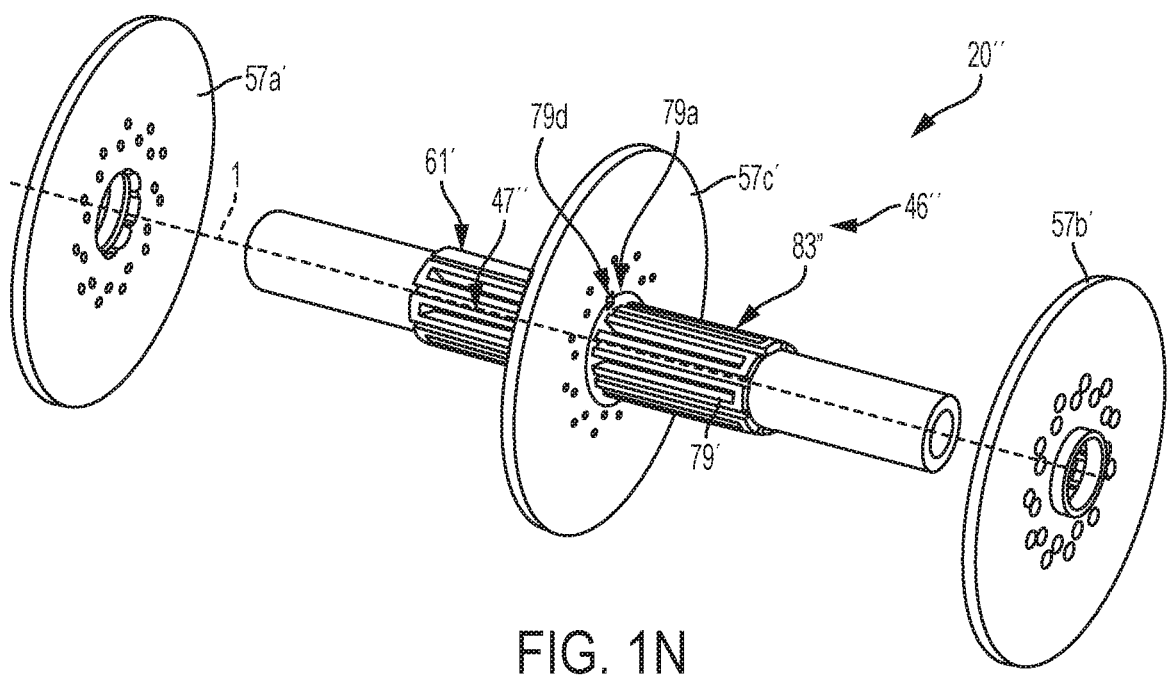
Figure 1O:
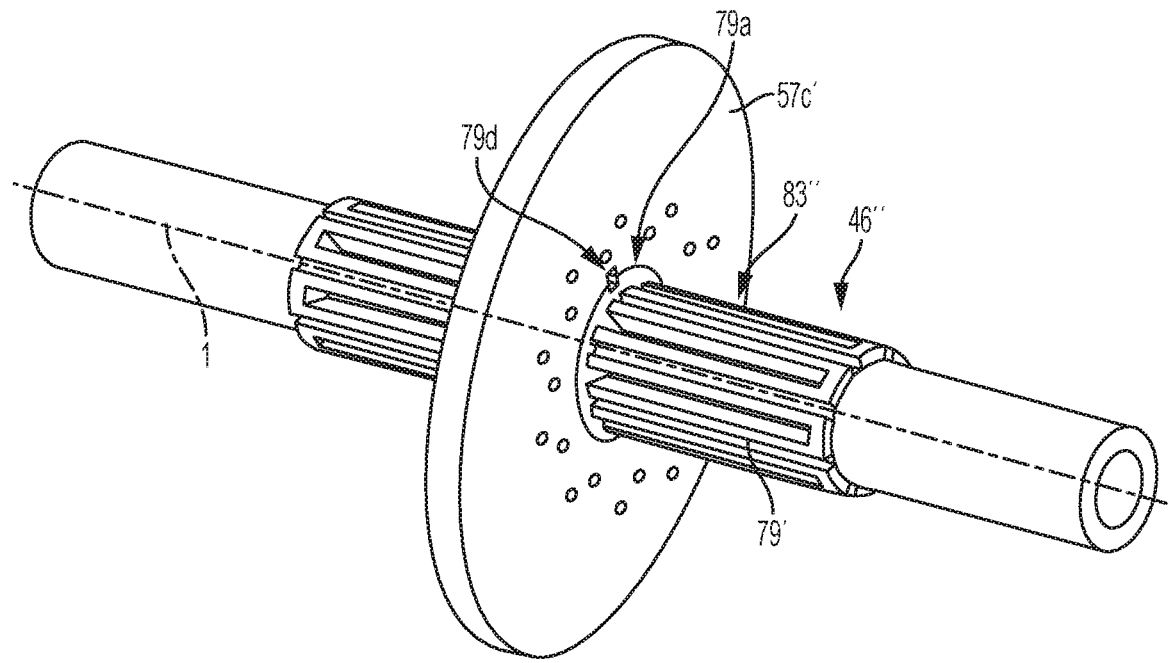

With reference to FIGS. 1M-1T, aspects and features of a rotor assembly 20" are illustrated in accordance with another example of the present disclosure. The rotor assembly 20" is similar to the rotor assembly 20' discussed above with respect to FIGS. 1K and 1L. For example, the rotor assembly 20" can include a disk carrier 46" and rotor assembly disks as described herein. The plurality of disks identified by reference number 21 above have been omitted from these figures for clarity. FIG. 1M shows outer support disks 57a', 57b' and an inner support disk 57c' coupled to the disk carrier 46". FIG. 1N shows an exploded view of the outer support disks 57a', 57b' relative to the disk carrier 46". The disk carrier 46" can have a disk coupling interface portion 61' and one or more of the rotor assembly disks can have a carrier coupling interface portion, as described above, to facilitate coupling the disks and the disk carrier to one another. For example, the outer support disks 57a', 57b' can have complementary coupling interface portions for the disk carrier 46" as described above, and the plurality of disks (not shown) can have complementary coupling interface portions in the same manner as illustrated for the support disks 57a', 57b'. In addition, as with the embodiment described above with respect to FIGS. 1K and 1L, fluid passageways 47" of the disk carrier 46" can be defined at least in part by spans 79' in a disk portion 83" extending along the axis of rotation 1.

Figure 1P:
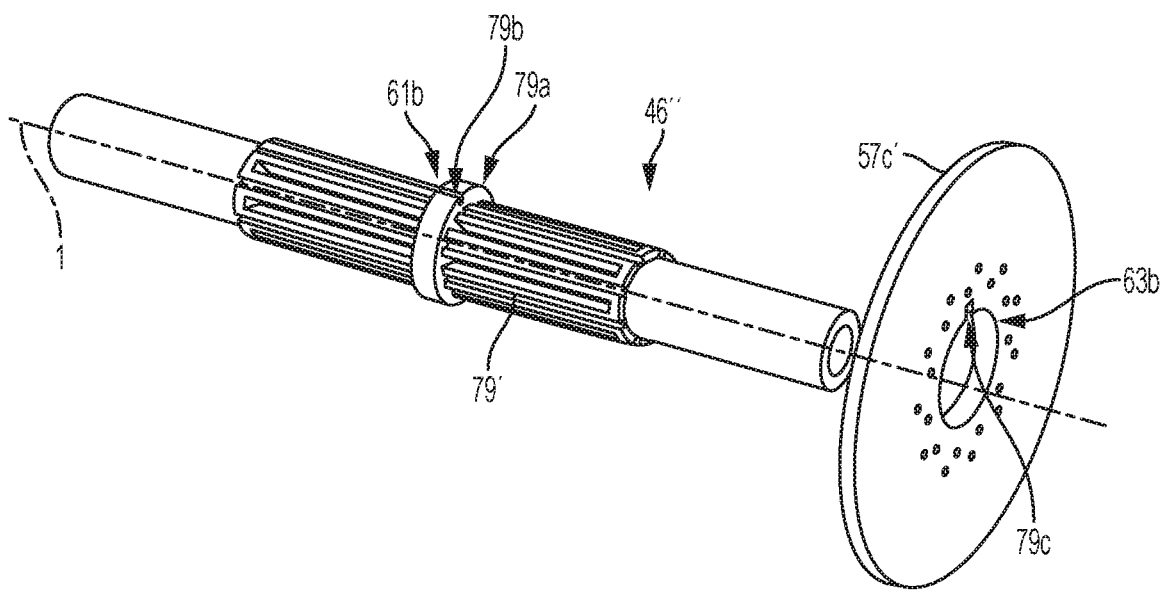
Figure 1Q:
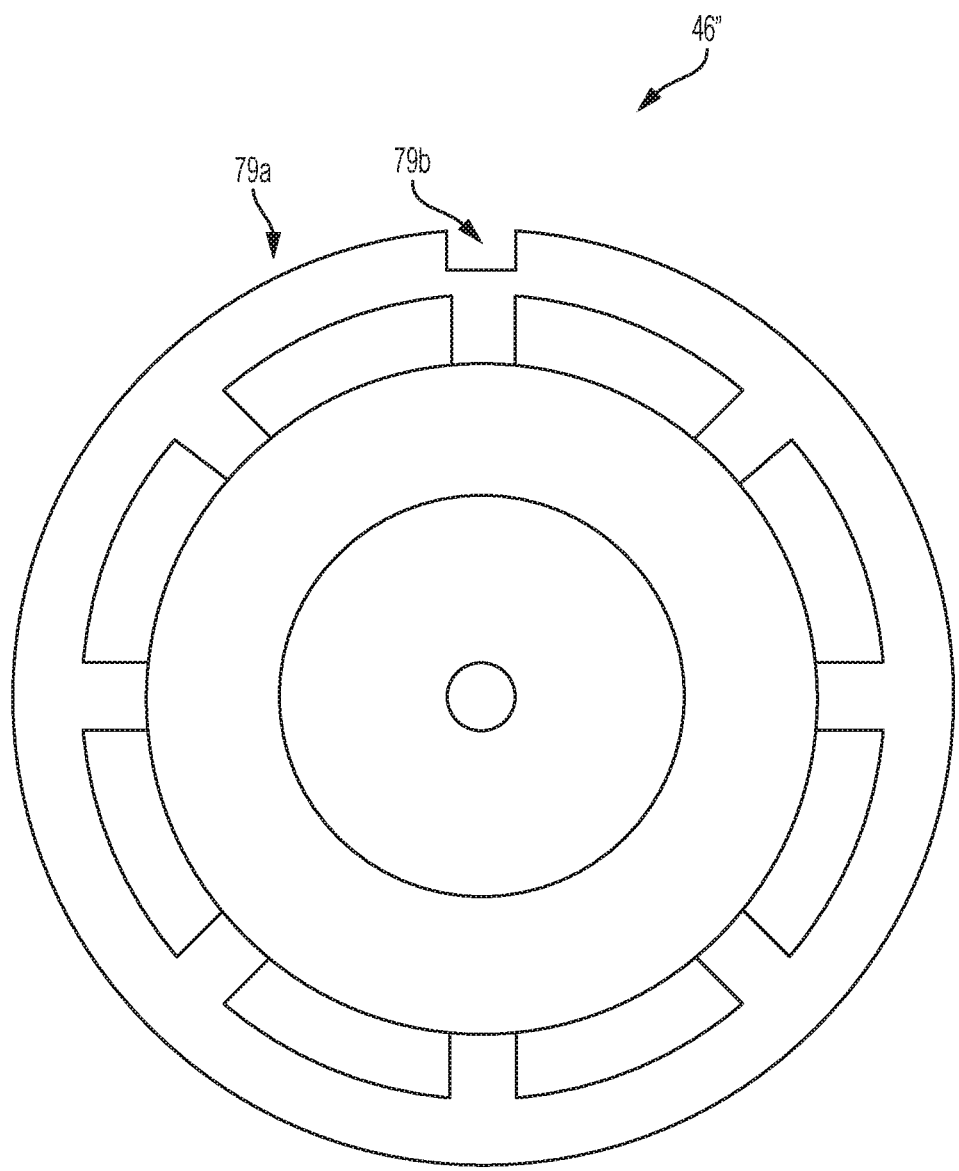
Figure 1R:
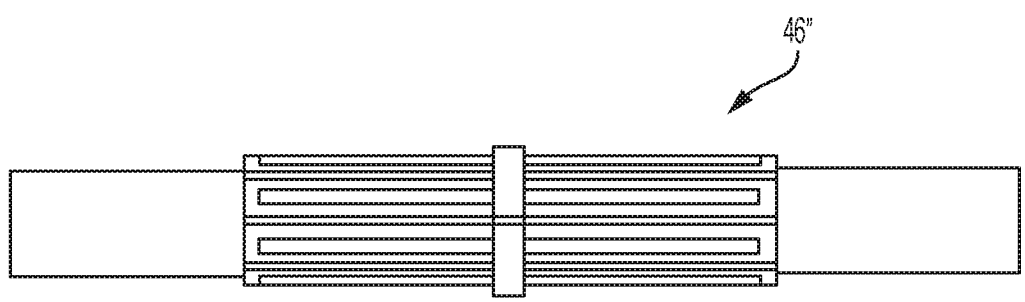
Figure 1S:
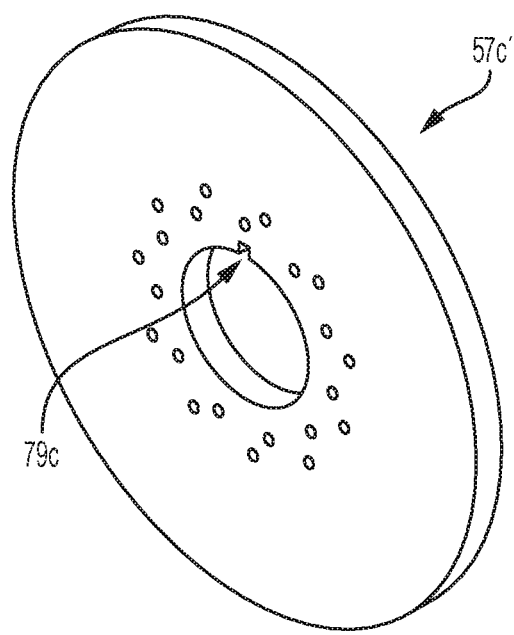
Figure 1T:
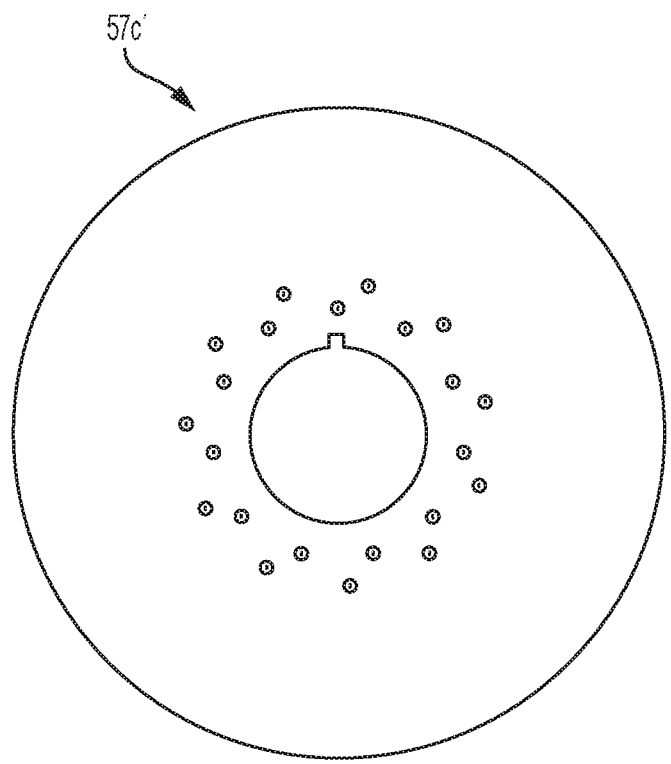

In this case, the disk carrier 46" includes a mid-span support 79a coupled to the spans 79'. In some embodiments, the mid-span support 79a can be integrally formed with the spans 79' (e.g., fixedly coupled to one another, such as by welding). The mid-span support 79a can extend circumferentially about the disk carrier 46" to provide support for the spans 79'. The inner support disk 57c' is shown isolated from other rotor assembly disks in an assembled configuration with the disk carrier 46" in FIG. 1O, and in an exploded or disassembled configuration in FIG. 1P. The disk carrier 46" is shown isolated in FIGS. 1Q and 1R, and the inner support disk 57c' is shown isolated in FIGS. 1S and 1T. In one aspect, the inner support disk 57c' can be configured to couple with the mid-span support 79a. For example, the inner support disk 57c' can have a span support coupling interface portion 63b and the mid-span support 79a can have a support disk coupling interface portion 61b (FIG. 1P). In the illustrated embodiment, the coupling interface portions 61b, 63b comprise respective recesses 79b, 79c that combine to form a keyway 79d (FIG. 1O) into which a key (not shown) may be inserted to provide torque transfer between the inner support disk 57c' and the disk carrier 46". It should be recognized that the coupling interface portions 61b, 63b can have any suitable configuration that couples the inner support disk 57c' and the mid-span support 79' to one another in a manner (e.g., one or more interfacing protrusions as described above) to transfer torque between the components about the axis of rotation 1. Although the coupling aspect of the mid-span support 79a has been shown and described as being operable to couple the inner support disc 57*c*' with the disk carrier 46", it should be recognized that outer support disks may be coupled to a disk carrier in a similar manner.

In one aspect, with the mid-span support 79*a*, a central chamber of the disk carrier 46" can remain unobstructed to fluid flow, such as by including a central aperture that forms a portion of the central chamber, thus allowing fluid to pass entirely through the disk carrier 46'. Alternatively, the mid-span support 79*a* can be configured to extend through the disk carrier 46" and partition a central chamber of the disk carrier, thus blocking or obstructing the central chamber local to the mid-span support 79*a*. In this case, fluid is prevented from passing entirely through the disk carrier 46", as the central chamber has been separated and subdivided by the mid-span support 79*a*.

Notably, the rotor assembly discussed in connection with the disk carrier can readily be incorporated into the housing, partition, inlets and other features discussed herein with respect to FIGS. 2-22C. Therefore, this description explicitly encompasses variations of the system where the rotor assembly of FIG. 1A-1P are used within the variations discussed subsequently herein. Similarly, features and variations regarding disk shapes, parameters, tapering, and the like which are discussed in other embodiments are also equally applicable to the rotor assembly including a disk carrier.

Figure 2:
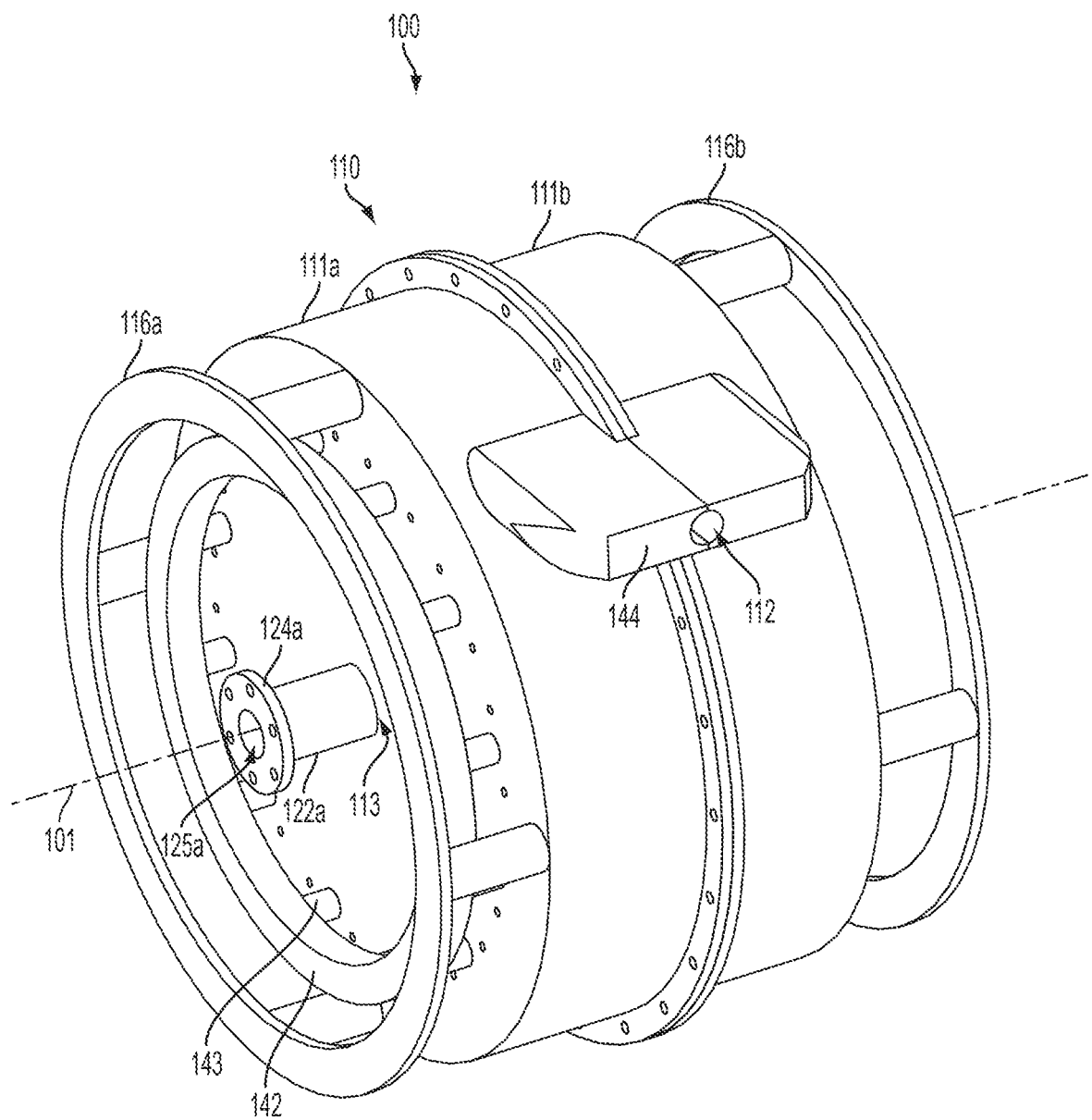
FIG. 2 is a perspective view of a boundary layer turbomachine in accordance with an example of the present disclosure.
Figure 3A:
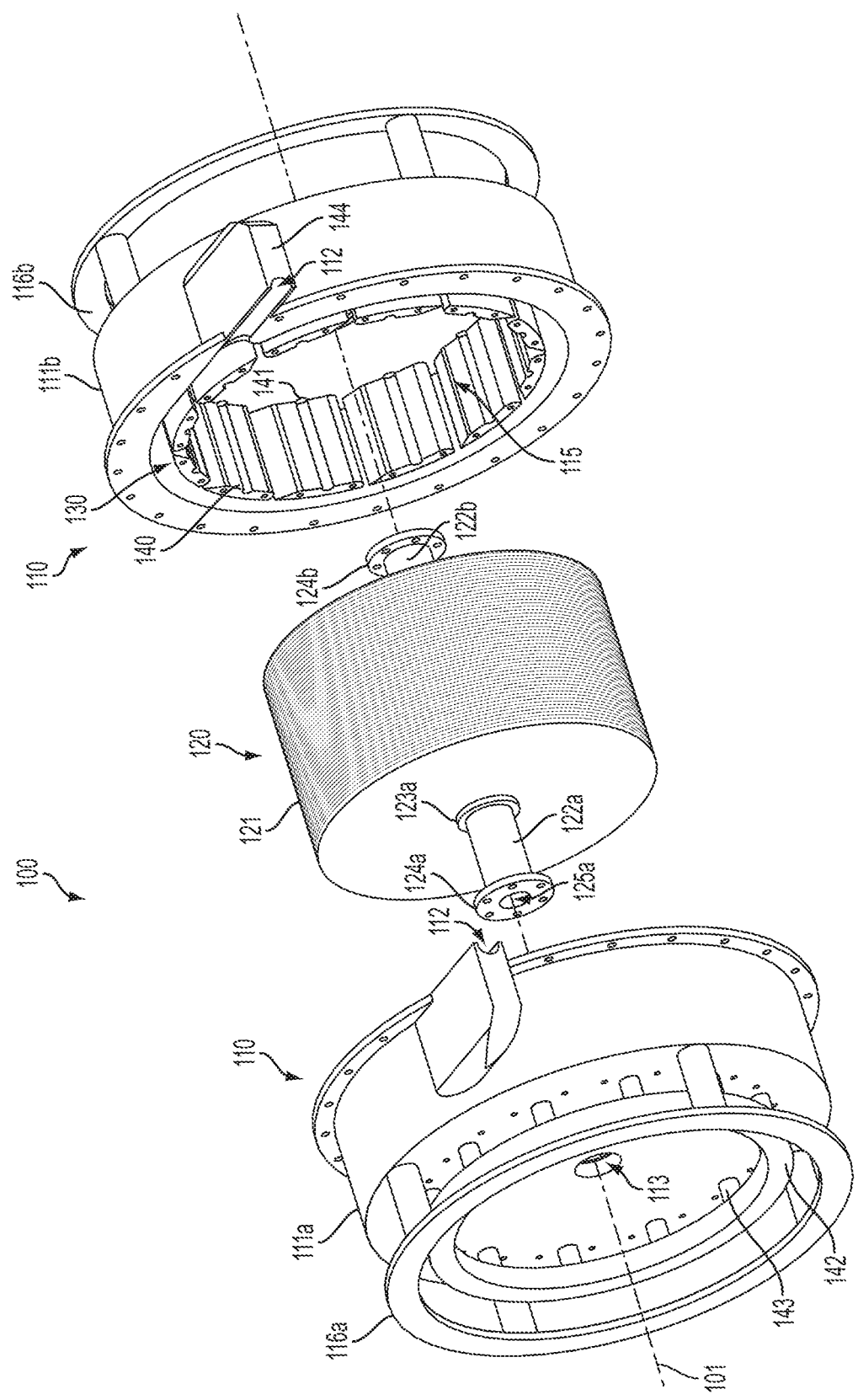
FIGS. 3A and 3B are exploded views of the boundary layer turbomachine of FIG. 2.
Figure 3B:
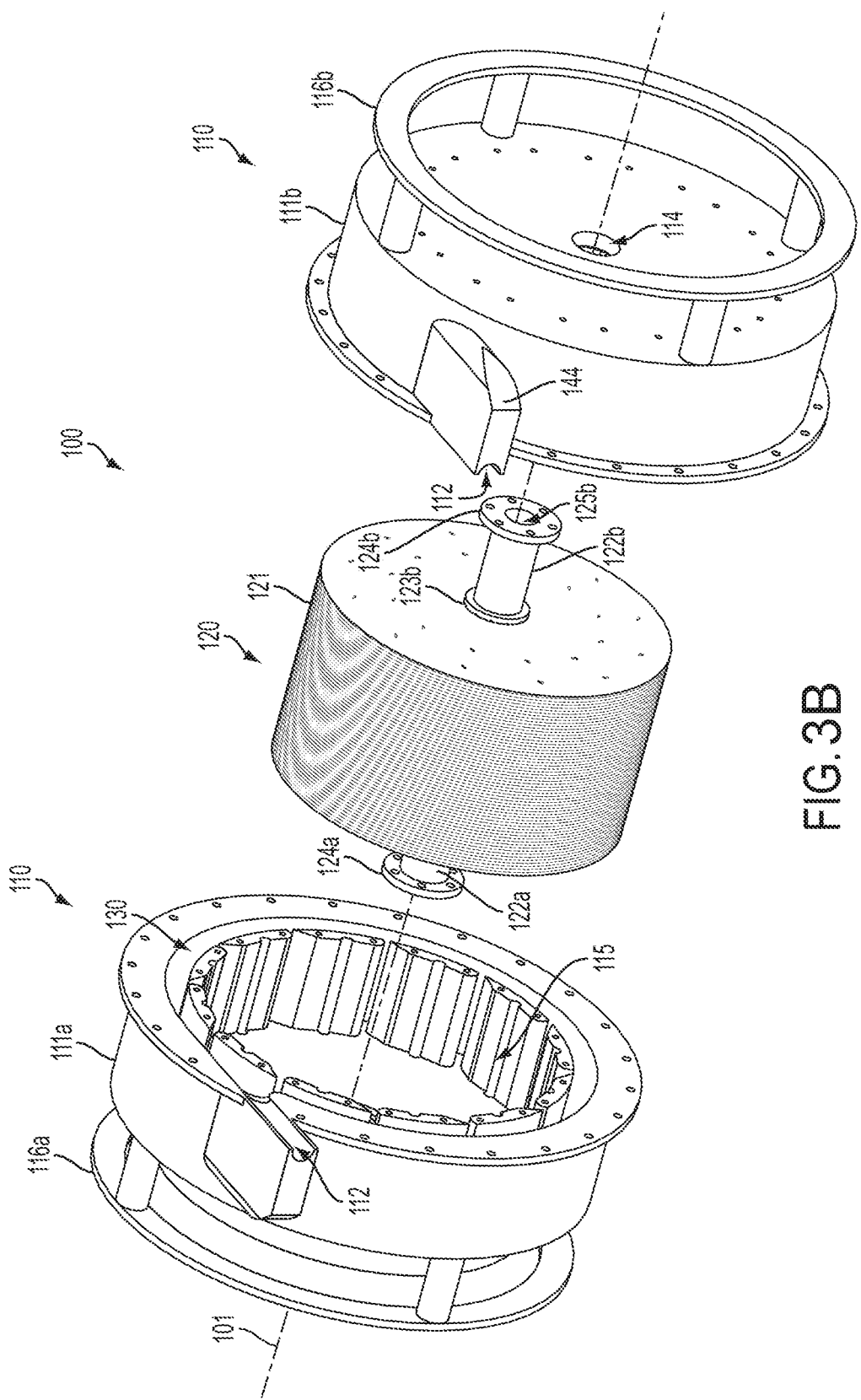

With reference to FIG. 2, a boundary layer turbomachine 100 is illustrated in accordance with an example of the present disclosure. FIGS. 3A-3B illustrate exploded views of the boundary layer turbomachine 100 for further reference. The boundary layer turbomachine can include a housing 110, which can include complementary housing portions 111*a*, 111*b*. The housing can also have an inlet opening 112 and an outlet opening 113 to facilitate movement of a fluid (i.e., a gas and/or a liquid) through the housing. The outlet opening 113 can be located at or near a rotational axis 101 of a rotor assembly 120 while the inlet opening 112 can be located on the housing 110 radially outward from the rotational axis 101. Although the rotor assembly 120 is shown and described in the context of one embodiment of a rotor assembly, it should be recognized that the boundary layer turbomachine 100 and other boundary layer turbomachines disclosed herein can include any suitable embodiment of a rotor assembly, such as those disclosed herein.

In addition, although reference numbers 112, 113 have identified an inlet opening and an outlet opening of the housing 110, respectively, it should be recognized that in some embodiments opening 113 can be an inlet opening and opening 112 can be an outlet opening based on operation of the boundary layer turbomachine. In one aspect, the boundary layer turbomachine can be designed and operated as "directional" in that the flow of fluid always enters the housing via the same inlet opening and exits the housing via the same outlet opening. In another aspect, the boundary layer turbomachine can be designed and operated as "bidirectional" in that the flow of fluid can be switched to enter the housing via either opening 112, 113 and exit the housing via the other opening to obtain forward and reverse fluid flow. In addition, the housing can include an opening 114 (FIG. 3B) that can also serve as an inlet and/or an outlet similar to the opening 113. When both openings 113, 114 are utilized they will typically have the same function. Thus, opening 112 can serve as an inlet opening, and opening 113 and/or opening 114 can serve as outlet openings. On the other hand, opening 113 and/or opening 114 can serve as inlet openings, and opening 112 can serve as an outlet opening. In some embodiments, multiple openings, which can serve as inlet and/or outlet openings, can be located on the housing 110 radially outward from the rotational axis similar to opening 112.

As illustrated in FIGS. 3A and 3B, the housing 110 can define an interior space 115 to accommodate a rotor assembly 120. The rotor assembly can be configured to rotate about the axis of rotation 101. The rotor assembly can have a plurality of disks 121 spaced apart along the axis of rotation. In one aspect, the disks can be substantially planar and oriented perpendicular to the axis of rotation, although any suitable disk configuration can be utilized, such as a conical disk configuration. For example, non-planar disks can be nested to form a rotor assembly using the principles described herein. Regardless, the disks can be substantially parallel to one another throughout. Furthermore, any suitable number of disks can be utilized (e.g., depending on power requirements). As described in more detail hereinafter, the plurality of disks 121 can define an interior opening (internal to the plurality of disks 121 and hidden from view) along the axis of rotation. Thus, fluid can pass through gaps between the disks and the interior opening as the fluid moves through the housing from the inlet opening 112 to the outlet opening 113 and/or 114.

The rotor assembly 120 can also include an extension member 122*a*, 122*b* to couple the rotor assembly to the housing 110 and facilitate rotation of the rotor assembly about the axis of rotation 101. For example, the extension members 122*a*, 122*b* can be attached to the plurality of disks 121 opposite one another and substantially inline to facilitate rotation of the rotor assembly about the axis 101. The extension members 122*a*, 122*b* can be attached to the plurality of disks 121 using an adhesive, fasteners, or any other suitable substance or device. For example, the extension member can include a flange 123*a*, 123*b* to interface with the plurality of disks and facilitate coupling with the disks. The extension members 122*a*, 122*b* can be mounted on bearings when coupled to the housing 110 to provide low friction rotational interface. In one alternative, the bearings can be brush bearing seals. In one aspect, the extension members 122*a*, 122*b* can include vent ports 125*a*, 125*b* extending through the extension members in fluid communication with the interior opening formed by the plurality of disks 121. Thus fluid can exit or enter the housing via the extension member vent ports 125*a*, 125*b*, which extend through the housing openings 113, 114, respectively.

Although the various components of the boundary layer turbomachine 100 can be constructed of any suitable material, in one aspect the rotor assembly 120 (i.e., the plurality of disks 121, the extension member 122*a*, and/or the extension member 122*b*) and/or the housing 110 (i.e., the housing portion 111*a* and/or the housing portion 111*b*) can be made in whole or in part from a composite material, such as carbon fiber composite (e.g., Toray T800S), basalt fiber composite, or any other suitable lightweight structural material. In one example, the plurality of disks can be formed of a woven fiber composite material (e.g. warp/weft). In one case, the woven fiber material can be a basalt fiber material such as, but not limited to, commercially available 15582/50 material can be used. In another example, the plurality of disks 121 can be formed of a ceramic composite material, which may be advantageous for high temperature applications. As a general guideline, the rotor assembly 120 can be designed to provide a low mass to surface area ratio. Typically, a lower mass to surface area ratio provides improved performance as long as sufficient strength is maintained in the rotor assembly. In some cases, the rotor assembly 120 can be provided as a complete unit as a replacement of a damaged or worn rotor assembly.

In one aspect, the extension member 122a, 122b can facilitate coupling the rotor assembly 120 to a generator or a motor. For example, the extension member 122a, 122b can include a flange 124a, 124b to interface with a generator shaft or a motor shaft and facilitate coupling the rotor assembly 120 to the generator or motor, such as utilizing fasteners, etc. A generator (e.g., an electric generator or a pump) can be coupled to the rotor assembly 120 to generate power as the fluid moves through the housing 110. A motor can be coupled to the rotor assembly 120 to cause rotation of the rotor assembly, thereby causing movement of the fluid through the housing 110 and utilizing the boundary layer turbomachine 100 as a pump. The extension member 122a, 122b can therefore serve as a mechanical transfer coupling for the rotor assembly 120 to an external device, such as a generator or a motor. Any suitable generator or motor can be utilized with the boundary layer turbomachine 100. In one aspect, each housing portion 111a, 111b can be coupled to a generator or a motor. For example, the housing portions 111a, 111b can include mounting features 116a, 116b, respectively, to interface with a generator or a motor and facilitate coupling the housing 110 to the generator or motor, such as utilizing fasteners, welds, etc. In one aspect, the mounting feature 116a, 116b can extend at least as far as the extension member 122a, 122b to facilitate directly attaching the housing 110 to a generator or motor without interference from the extension member 122a, 122b. In addition, the boundary layer turbomachine 100 can be operated with the axis of rotation 101 in any suitable orientation, such as vertical or horizontal.

When utilizing the boundary layer turbomachine 100 with a generator, the boundary layer turbomachine can be powered by steam from a number of different sources, such as capturing waste heat from a boiler, injecting water directly into the exhaust stream of a liquid fuel generator by replacing the muffler, or by generating its own heat content from a combustor. For example, combustion gases can be directly used as a working fluid. Each of these configurations can utilize many of the same components, such as a feedwater tank, pumps, sensors, computers, and other electronic components. Thus, water can enter the boundary layer turbomachine 100 as steam and can exit as a liquid, although any fluid within a wide range of pressures and temperatures may be used, which can depend on the material and resin properties when boundary layer turbomachine components are constructed of a carbon fiber composite. Alternatively, the turbomachine can have any number of fluids as a working fluid medium such as, but not limited to, gases, vapors, liquids, suspensions, and combinations (e.g. multiphase fluids).

Figure 4A:
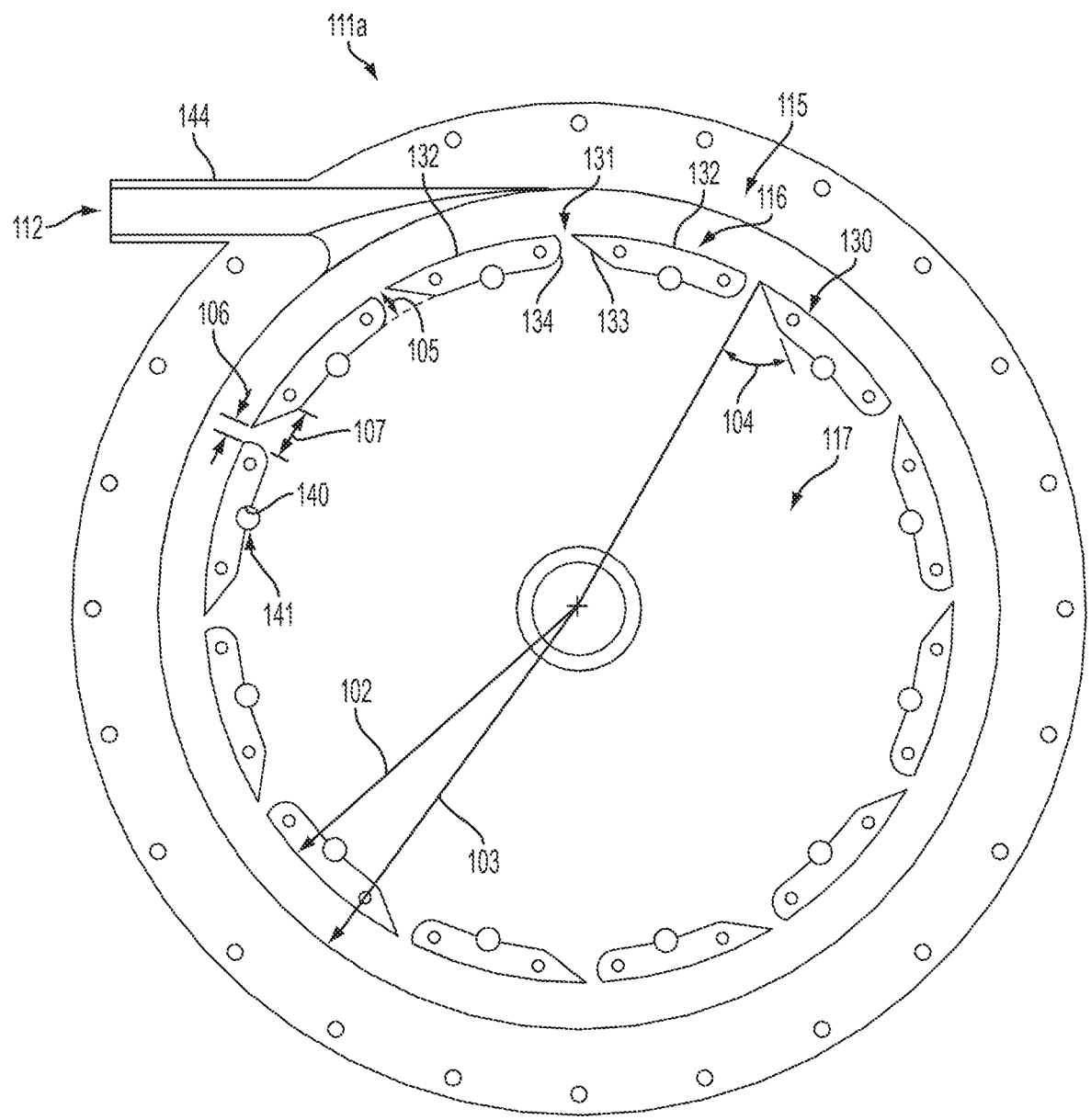
FIG. 4A is a cross-sectional view of the boundary layer turbomachine of FIG. 2 taken between housing portions with a rotor assembly omitted.
Figure 4B:
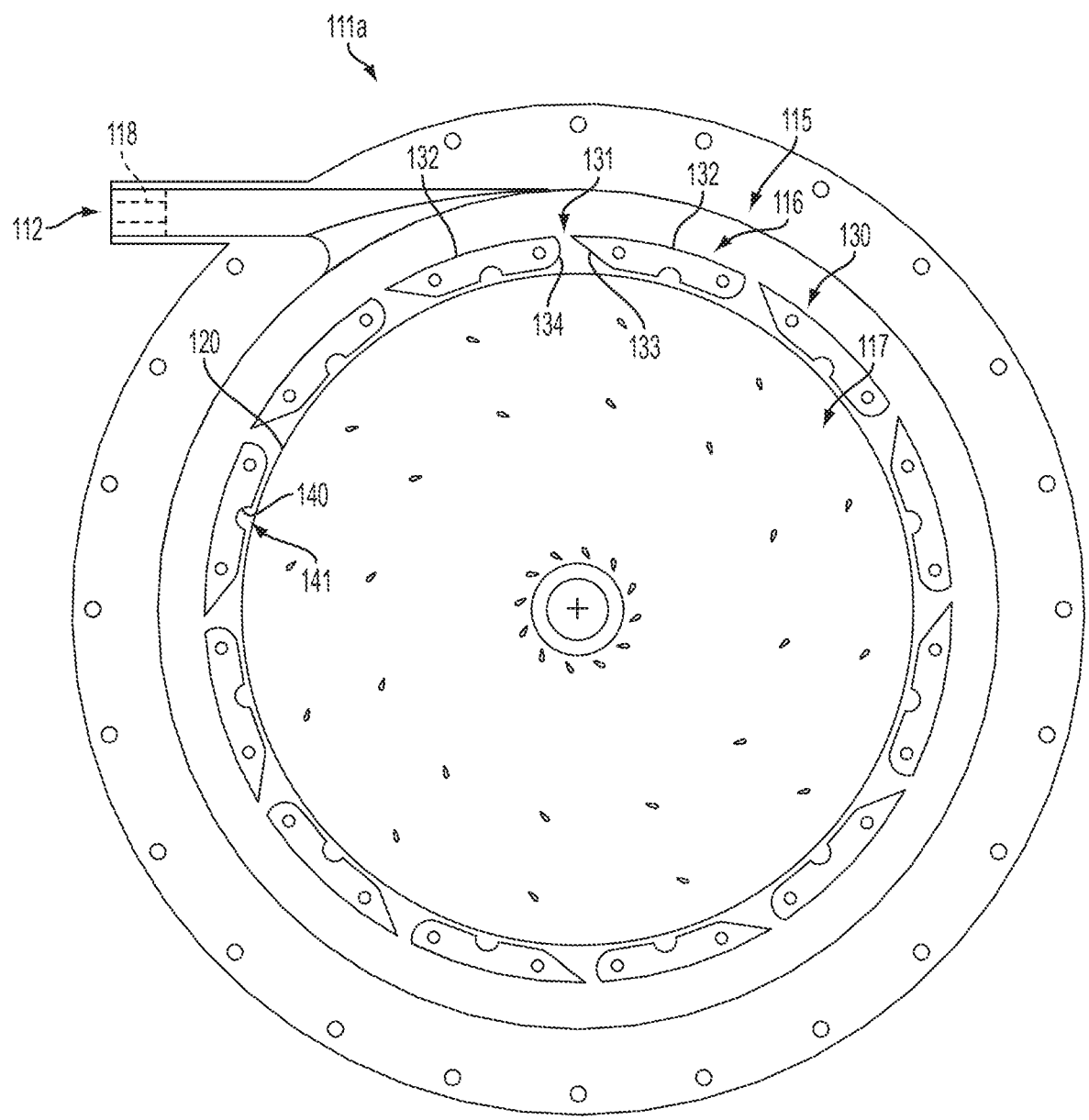
FIG. 4B is a cross-sectional view of the boundary layer turbomachine of FIG. 2 taken between housing portions showing a rotor assembly.

In one aspect, the boundary layer turbomachine 100 can include a partition 130. As more clearly illustrated in FIGS. 4A and 4B, the partition 130 can circumferentially divide the interior space 115 into an outer chamber 116 and a rotor chamber 117 located radially inward of the outer chamber. The outer chamber 116 can be an annular volume having generally having an inner radial dimension 102 of 80 to 95% of a radius 103 of the interior space 115. As shown in FIG. 4B, the rotor assembly 120 can be disposed in the rotor chamber 117. The outer edge of the rotor assembly can be spaced a radial rotor gap distance apart from the inner edge of partition members 132. The radial rotor gap can generally be 85 to 95% of a rotor chamber radius measured to the inner edge. In one aspect, the radial gap distance can be equal to 3 to 8 times a boundary layer thickness of the fluid. Despite the rigidity of most materials used for the rotor disks 121, the associated rate of spin during operation can often result in radial elongation of from 1% to 5%. The rotor gap can vary depending on size, but is often from 1 mm to 2 cm at a resting condition. Accordingly, the rotor gap can be designed to accommodate such disk stretching. Notably, operating speeds can vary considerably. However, in many cases the rotor assembly can operate at speeds of 500 rpm up to 100,000 rpm, and in some cases, at speeds of 2,000 rpm up to 8,000 rpm as a working range with loading, and in other cases from 1,000 rpm to 20,000 rpm. As a general guideline larger diameter disks can often operate a relatively lower rpms than smaller diameter disks.

The partition 130 can have partition openings 131 such that fluid is movable through the partition between the outer chamber 116 and the rotor chamber 117. In one aspect, the opening 112 can be associated with the outer chamber 116 such that the outer chamber serves as an expansion chamber for the fluid when the opening 112 is an inlet opening. Typically, although not required, the inlet can also be oriented to produce tangential flow within the expansion chamber. The partition openings 131 can be spaced (e.g., equally) circumferentially around the partition 130 so as to allow fluid to move from the outer chamber 116 into the rotor chamber 117 and, thus, into gaps between the disks of the rotor assembly 120, at multiple locations around the outer edge of the disks. This configuration offering multiple access ports from the outer chamber 116 to the rotor assembly 120 disks can increase the efficiency of the turbomachine, particularly when the partition openings 131 are equally spaced from one another. In one aspect, the partition openings 131 can be defined by two or more partition members 132 or formed in a single partition member. As shown in FIG. 4B, the partition members 132 can be arranged in a circular configuration with an internal diameter sized to accommodate the rotor assembly 120 disks (i.e., larger than the outer diameter of the disks). The partition 130 (i.e., partition members 132) can be an individual component which is secured in place, or integrally formed with the housing, such as housing portion 111a. In the embodiment illustrated in FIGS. 4A and 4B, the partition members 132 illustrated are merely one-half of the partition 130, with a complementary set of partition members secured to the opposite housing portion 111b. Alternatively, the partition can be formed as a single set of partition members in order to avoid misalignment of complementary partition members.

In one aspect, the partition openings 131 can comprise a venturi configuration. The term "venturi" is used herein to generally define a configuration wherein the partition opening 131 formed by two spaced apart complementing surfaces 133, 134 of adjacent partition members 132 converges and/or diverges such that fluid passing through the partition opening reaches enhanced speed while concurrently developing a significantly reduced pressure producing an effect similar to the Venturi effect. Any suitable venturi configuration can be utilized. In one aspect, the partition openings 131 can have an injection angle 104 of 25 to 55 degrees relative to an at least partially planar surface 133. In some cases, the injection angle 104 can range from 30 to 50 degrees, and in one specific example 41.5 degrees. Alternatively, the injection angle 104 can range from 35 to 65 degrees, in some cases from 40 to 60 degrees, and in one specific example 51.4 degrees. In another aspect, the partition openings 131 can have a radial dimension 105 of 5 mm to 5 cm. In yet another aspect, the partition openings 131 can have an outer circumferential dimension 106 of 5 mm to 5 cm and an inner circumferential dimension 107 of 1 cm to 10 cm. The angle 104, radial dimension 105, outer circumferential dimension 106, and inner circumferential dimension 107 can vary depending on the fluid type, size, and application of the turbomachine.

In one aspect, the partition openings 131 can be reconfigured during use to facilitate bidirectional flow of fluid through the housing, or to fine tune performance for particular settings and environments. For example, the configuration (i.e., the angle 104, radial dimension 105, outer circumferential dimension 106, and/or inner circumferential dimension 107) of the partition openings 131 can be controlled by manipulating one or more partition members 132 via a motor, which can be actuated by one or more switches to achieve suitable flow characteristics through the partition openings in two directions. Alternatively, the partition member orientations can be adjusted using a manual or mechanical linkage to move the partition members relative to one another. Typically, partition members can be adjusted uniformly so that each partition member is moved an equal distance to maintain uniform angle and distances throughout the partition, although in some aspects the partition members can be independently adjustable. Optimal angles, spacing and configuration can be at least partially dependent on fluid medium (including temperature, phase, etc), fluid velocity, boundary layer disk gap distance, disk roughness, and the like.

In one aspect, the outer chamber 116 (i.e., an expansion chamber in some embodiments) can have a constant or uniform cross-sectional area, such as by maintaining dimensional characteristics and geometry for a full 360 degrees about the axis of rotation 101. Notably, the expansion chamber in this case does not include inlet opening 112 space leading up to the expansion chamber. In the illustrated embodiment, the outer chamber 116 has a cylindrical configuration with the cross-sectional area being uniform about the outer chamber 116 through a constant cylindrical wall thickness.

In a steady operational state where fluid enters the housing via the opening 112, the fluid circulates around the outer chamber 116 and maintains a relatively constant pressure regime within the outer chamber. The fluid passes through the partition openings 131 into the rotor chamber 117 and enters the spaces or gaps between the individual disks 121 within the rotor assembly 120. By adhesive and viscous action on the surfaces of the disks the fluid causes the disks to rotate. As the rotational speed of the disks increases, the fluid between the disks is acted upon by both centrifugal force and the pressure difference maintained between the outer chamber 116 and the partition openings 131, which causes the fluid to be retained within the disks. This increased residence of the fluid between the disks enables the fluid to continue to transfer energy and do work by imparting further rotation in the form of torque, which increases efficiency and allows the turbomachine to convert more thermal energy to mechanical work.

In one aspect, a debris trap 140 can be included to gather and expel heavier particles thrown to the outer edges of the rotor assembly 120 disks by centrifugal force. For example, a portion of the partition 130 can form the debris trap 140 as shown in FIGS. 4A and 4B in the shape of a channel or groove along an inner radial surface of one or more of the partition members 132. The debris trap 140 can convey the particles from the interior space 115 via an opening 141, which can lead to a debris receptacle 142 external to the housing 110 via a conduit 143, as shown in FIGS. 2 and 3A. The illustrated debris trap includes openings 141 at each end, although a single opening may be suitable. The debris receptacle 142 can be easily serviced and cleaned utilizing steam pressure and gravity. The debris trap 140 can therefore capture particles from the fluid and prevent the particles from leaving the turbomachine as emissions. In certain applications this can dramatically reduce the environmentally negative emissions associated with typical existing technologies.

In one aspect, the opening 112 can be configured as an adaptive inlet port to provide the optimal efficiency intake pressure and/or flow pattern for the fluid. For example, as shown in FIG. 4B, a modular, replaceable inlet fitting 118 can optionally be used to provide different orifice or inlet opening sizes as desired to affect the intake pressure and/or flow pattern of the fluid. Alternatively, the inlet manifold 144 can include replaceable inserts across a width of the manifold.

Figure 5:
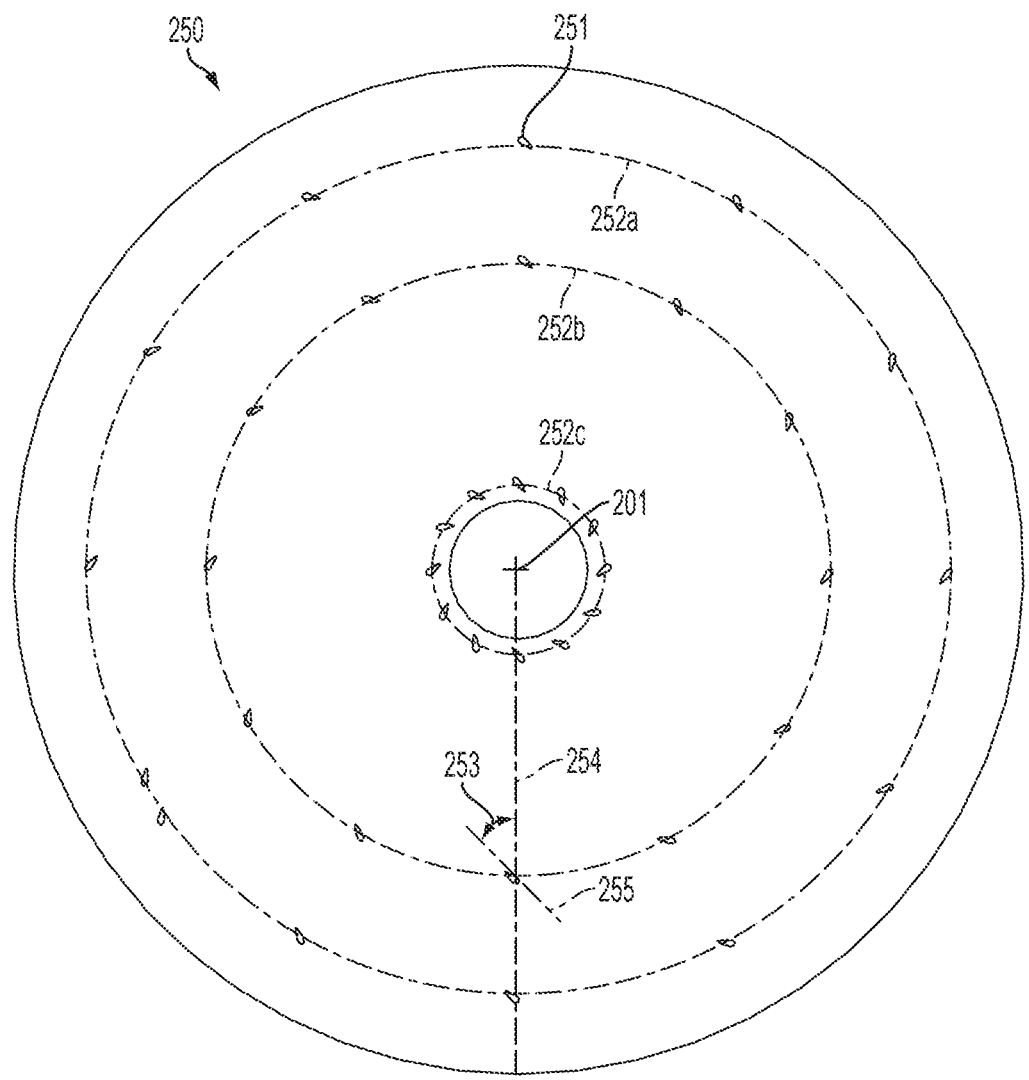
FIG. 5 is a side view of a disk of a rotor assembly in accordance with an example of the present disclosure.

FIG. 5 illustrates a disk 250 that can be utilized in a rotor assembly in accordance with an example of the present disclosure. As shown in the figure, the disk 250 can include a plurality of fluid guides 251. The fluid guides can have any suitable cross-section such as, but not limited to, airfoil, elliptical, circular, diamond, and the like. However, an airfoil cross-section as illustrated can be particularly effective. The fluid guides 251 can be arranged in a ring configuration 252a, 252b, and/or 252c across the disk 250. In one aspect, the ring configuration can comprise multiple rings 252a-c concentric about the axis of rotation 201. Although three such rings are illustrated, from about three to about eight rings can often be suitable depending on the size and design operating parameters. In another aspect, a radial relationship of the rings 252a-c can correspond to the Fibonacci ratio (1.61618) or the Golden ratio (1.61803) to maximize the efficiency of the fluid as the fluid follows a spiral flow path along the disk 250. However, other radial relationships can be used such as equidistant, or ratios of 1.2 to 2, for example. As the fluid first encounters the fluid guides 251 a pressure wave is formed, which upon passing forms a low pressure vortex area that adds further impulse in the form of mechanical transfer of energy to the (rotating) disk in addition to the force(s) already present (e.g., adhesion and viscous forces acting on the rotating rotor assembly). When using airfoil shaped fluid guides, an inclination angle can be adjusted based on desired operating parameters. As a general guideline, the inclination angle 253 (i.e. an angle between a rotor radius 254 and central longitudinal airfoil axis 255) can be from about 20° to about 75°, and in some cases 30° to 55°. The number, geometric design, and location of the fluid guides 251 on the disk 250 can be optimized based on the size of the disk, the inlet pressure, and the design speed of rotation of the rotor assembly. In one aspect, a venturi configuration of a partition opening (see FIGS. 4A and 4B) can control the fluid flow between the concentric rings 252a-c. As the rotational velocity of the rotor assembly increases, fluid flow increases towards the center of the disks. At lower rotational velocity, fluid flow tends towards the outer edges of the disks.

Figure 6:
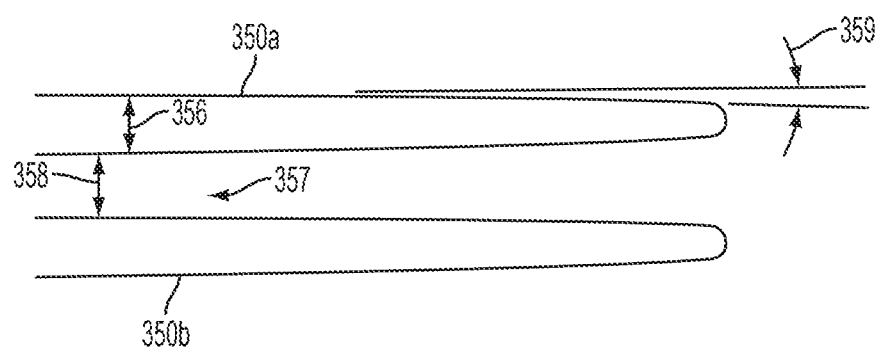
FIG. 6 is a detail view of disk peripheral edges of a rotor assembly having a tapered zone in accordance with an example of the present disclosure.

FIG. 6 illustrates adjacent disks 350a, 350b of a rotor assembly in accordance with an example of the present disclosure oriented to show a gap between the disks. The disks 350a, 350b of a rotor assembly are typically relatively thin (e.g., a thickness 356 of approximately 1.45 mm) and typically have a gap 357 or space between the disks of a distance 358 equal to or less than the disk thickness 356. More generally, the disk thickness 356 can be from about 2 to 5 times a boundary layer thickness of the fluid, often from 3 to 5, and most often about 3. Similarly, the disks 350a, 350b can be spaced apart by a distance 358 equal to 3 times a boundary layer thickness of the fluid, although from about 0.25 to 8 can be used, in some cases 1 to 5, often from 2 to 5, and most often about 3 times the boundary layer thickness. Generally, disk thickness can range from about 0.5 mm to about 5 mm, and in some cases from about 0.8 mm to about 2 mm. In one aspect, the outer edges of the disks 350a, 350b can be tapered by an angle 359 to a thinner edge of small radius to provide a tapered zone that can lessen turbulence and facilitate a smooth transition of fluid flow into or out of the rotor assembly.

Figure 7:
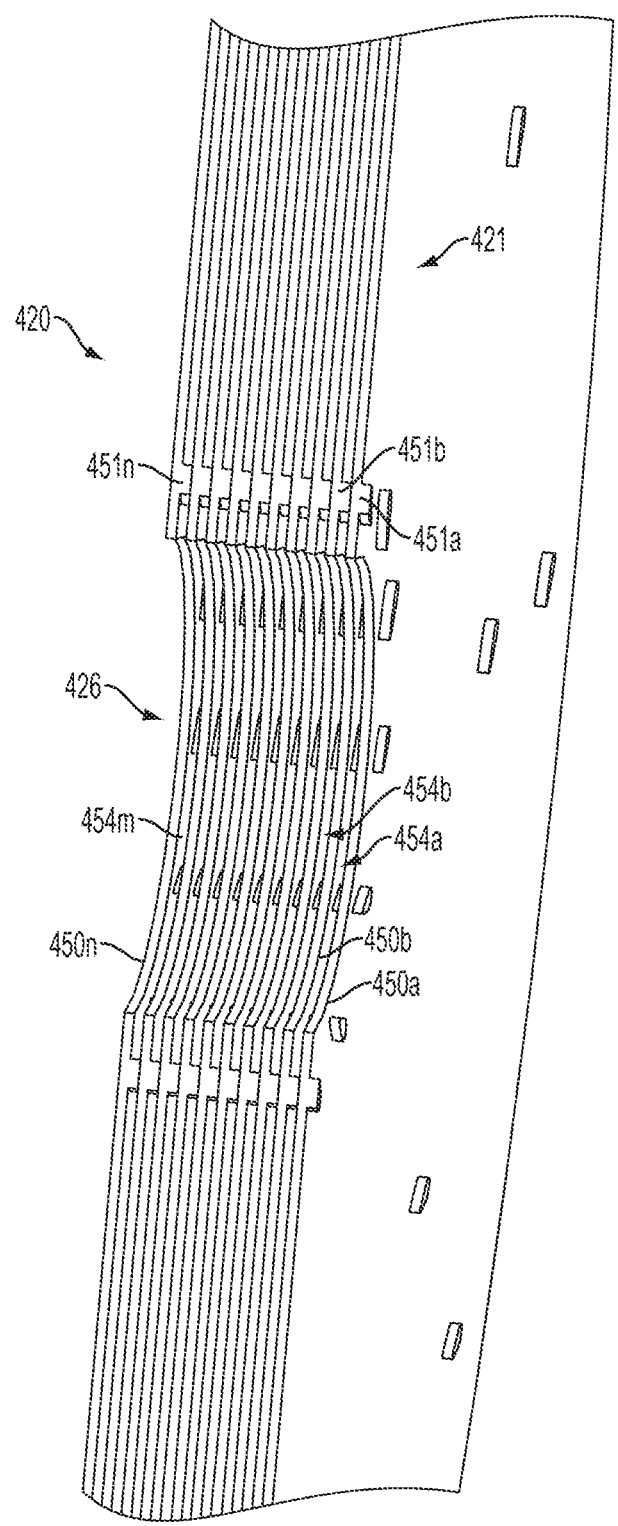
FIG. 7 is a cross-sectional view of a portion of a rotor assembly in accordance with an example of the present disclosure.

FIG. 7 illustrates a cross-section of a portion of a rotor assembly 420 in accordance with an example of the present disclosure. The rotor assembly 420 includes a plurality of disks 421 (identified individually as disks 450a-n) that defines a central hollow interior opening 426 along an axis of rotation, which extends through the interior opening. The disks 450a-n include a plurality of spacers 451a-n disposed between adjacent disks to space the disks apart along the axis of rotation to provide gaps 454a-m between the disks. Thus, fluid can pass through the gaps 454a-m between the disks 450a-n and the interior opening 426 as the fluid moves through the rotor assembly 420.

In one aspect, the disks 450a-n can be permanently coupled to one another by the plurality of spacers 451a-n, such as using an adhesive. In one example, the adhesive is a common resin binder used to form the entire assembly. In one aspect, the interior opening 426 can be a central hollow void, free of any solid structure (e.g., a shaft or other similar structure) that would couple or secure the disks 450a-n to one another and/or transfer torque. In another aspect, the interior opening can include a central hollow void as well as a disk carrier (e.g. FIG. 1A-1L) as disclosed herein, which can be coupled to the disks 450a-n for support and/or to transfer torque. Thus, solid structures are excluded from the central hollow void of the interior opening 426 along the entire length of the plurality of disks 421 and, in some embodiments, along the entire length of a rotor assembly. Such a configuration also results in fluid ingress and egress from both ends of the interior opening.

As shown in FIG. 7, the spacers 451a-n can be integrally formed with the disks 450a-n. Thus, by utilizing such built-in spacers 451a-n to couple the disks 450a-n to one another, no other parts are needed to complete the disk assembly. In one aspect, the spacers 451a-n can have an airfoil configuration and can therefore also serve as fluid guides as discussed above with reference to FIG. 5. As illustrated in FIG. 7, the disks 450a-n can be flat on one side and can have spacers projecting from an opposite side, which can be set out or arranged in a ring configuration as discussed above. Thus, the spacers 451a-n can ensure precise and proper spacing of the disks 450a-n from one another and contribute rigidity to the rotor assembly 420 structure under operating loads by providing multiple, geometrically and radially distributed coupling locations to interlock adjacent disks. In addition, utilizing adhesive to bond the spacers 451a-n to adjacent disks provides a fixed attachment condition in all degrees of freedom that increases stiffness over a simpler attachment condition without fixity in all degrees of freedom, such as a bolted coupling. Typically, the rotor assembly 420 will include from 60 to 200 disks having gap distances of 0.5 mm to 5 mm, although any suitable number and spacing of disks can be utilized. Although the number of disks within a rotor assembly can vary, as a general guideline, from 50 to 500 disks, and in some cases from 75 to 200 disks can be included. In some embodiments, identical disks can be used to construct the entire rotor assembly 420 (including outer end disks), thus simplifying construction. In other embodiments, disks of different configurations can be incorporated into the rotor assembly, such as disks having different spacer/fluid guide configurations. In one example, a "smooth" disk can be used to "cap" an end of the rotor assembly disks, thus providing smooth exposed disk faces on opposite ends of the rotor assembly. Alternatively, holes can be placed on outer plates of the disk pack which allows condensed water to escape freely into the shaft which could otherwise act as a water break.

The disks and other portions of the device can generally be formed of any material having suitable mechanical strength and rigidity. As non-limiting examples, the disks can be formed of lightweight composite materials, metal alloys, ceramics, and the like. Lightweight composite materials can include, but are not limited to, carbon fiber, basalt fiber, fiberglass, and the like. Such fiber-based materials can also be woven so as to increase rigidity against excessive stretching during operation. Non-limiting examples of suitable metals can include titanium, tungsten, magnesium alloys, aluminum, steel, tantalum, vanadium, alloys thereof, composites thereof, and the like. Ceramics and suitable ultrahard materials can include, but are not limited to, carbides, nitrides, polycrystalline diamond (PCD and CVD), and the like. The disks can be monolithic in composition or coated (e.g. metal core with a ceramic or PCD outer coating). In one aspect, the disks of the rotor assembly can be constructed of lightweight composite material (e.g., carbon fiber and/or basalt fiber), which can provide a high surface area with less mass compared to typical designs that rely heavily on a "flywheel" effect to preserve momentum, unlike a turbomachine of the present disclosure.

Figure 8:
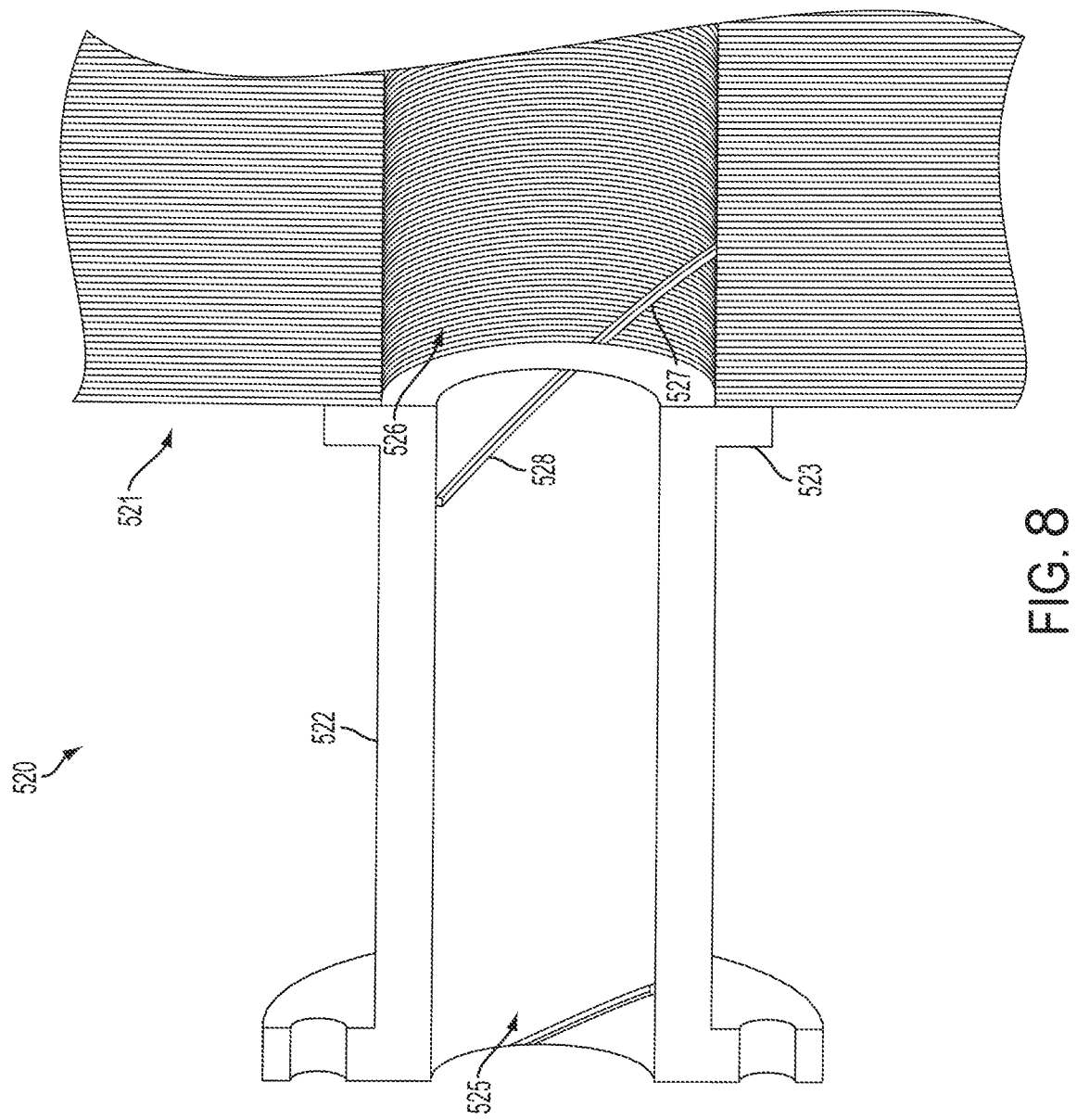
FIG. 8 is a cross-sectional view of a portion of a rotor assembly showing an optional helical baffle within the interior opening in accordance with another example of the present disclosure.

FIG. 8 illustrates a cross-section of a portion of a rotor assembly 520 in accordance with another example of the present disclosure. As with FIG. 7, the rotor assembly 520 includes a plurality of disks 521 that define a central hollow interior opening 526 along an axis of rotation, which extends through the interior opening. Accordingly, fluid moving through gaps between adjacent disks can freely enter or exit the interior opening 526 directly from the gaps. In this case, however, the interior opening 526 is also defined at least in part by a helical baffle 527 to facilitate directional flow or movement of fluid through the rotor assembly 520 for venting fluid from the rotor assembly. In some embodiments, the helical baffle 527 can be formed by a feature or protrusion on each disk such that when the disks are assembled the baffle is formed with gaps in the baffle between adjacent disks. In other embodiments, the helical baffle 527 can be a separate component added to the disk assembly such that the baffle extends across the gaps between adjacent disks.

An extension member 522 is also shown attached to the plurality of disks 521. The extension member 522 can be attached to the plurality of disks 521 using an adhesive, fasteners, or any other suitable substance or device. For example, the extension member 522 can include a flange 523 to interface with the plurality of disks 521 and facilitate coupling with the disks. The extension member 522 also includes a vent port 525 oriented along the axis of rotation. The vent port 525 can extend through the extension member 525 in fluid communication with the interior opening 526 formed by the plurality of disks, thus effectively forming an extension of the interior opening. Although a diameter of the vent port 525 is illustrated as being different than a diameter of the interior opening 526, it should be recognized that the vent port and the interior opening can have substantially the same diameter to facilitate unrestricted fluid flow between the interior opening and the vent port.

The helical baffle optionally extends across an extension member 522. In one aspect, the vent port 525 can be defined at least in part by a helical baffle 528 to facilitate movement of the fluid through the vent port 525. As with the helical baffle 527 of the internal opening 526, the helical baffle 528 can be a protruding internal surface feature integrally formed with the substrate or included as a separate component. The helical baffles 527, 528 can be continuous through the interior opening 526 and the vent port 525 such that the interfacing ends of the baffles align with one another to maintain the flow or movement of fluid through the rotor assembly 520 for venting fluid from the rotor assembly. Although interior opening 526 and the vent port 525 are shown with the helical baffles 527, 528, it should be recognized that the interior opening and the vent port can have smooth or featureless boundaries, which can simplify construction of the rotor assembly 520.

Figure 9A:
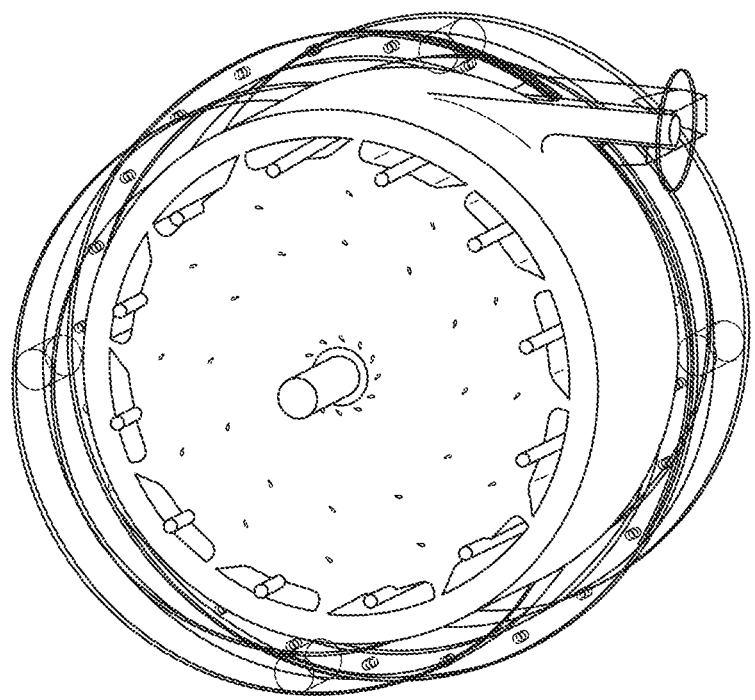
FIGS. 9A and 9B illustrate a computer model showing the fluid volume in an interior space of a boundary layer turbomachine in accordance with an example of the present disclosure.
Figure 9B:
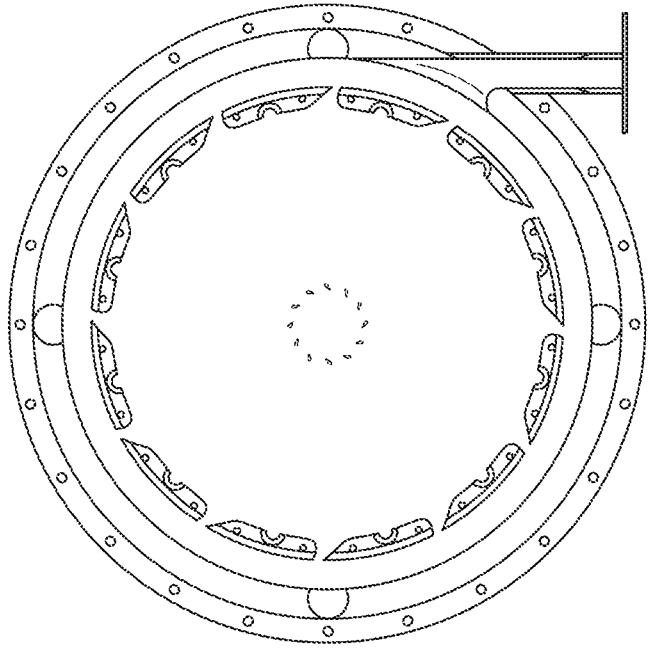

FIGS. 9A and 9B illustrate a computer model showing the fluid volume in an interior space of a boundary layer turbomachine in accordance with an example of the present disclosure. These figures show fluid in the inlet opening, the outer chamber, the partition openings, the rotor chamber, the interior opening, and the vent port.

Figure 10A:
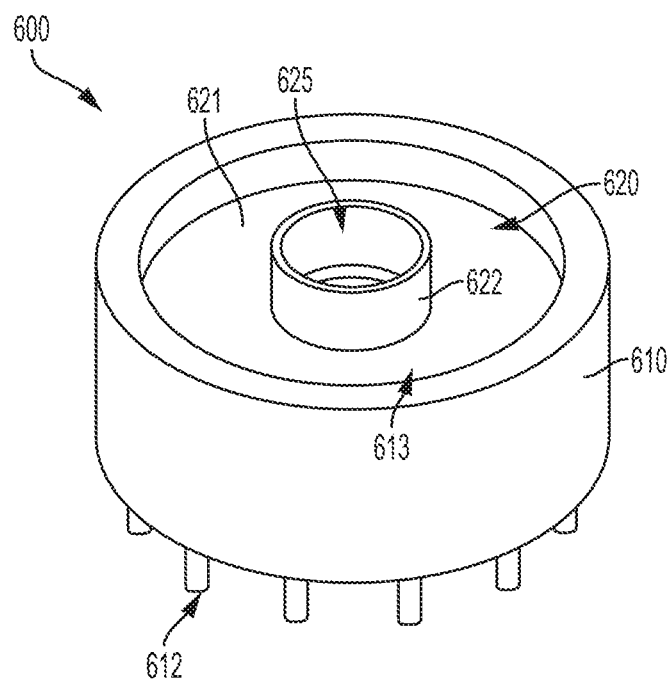
FIGS. 10A and 10B illustrate a boundary layer turbomachine in accordance with another example of the present disclosure.
Figure 10B:
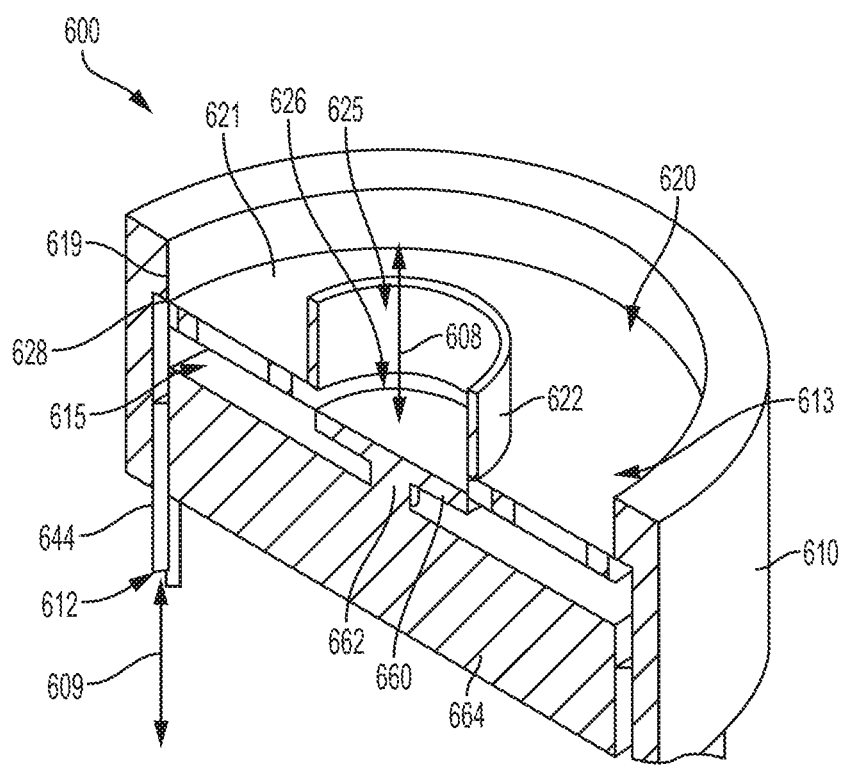
Figure 11A:
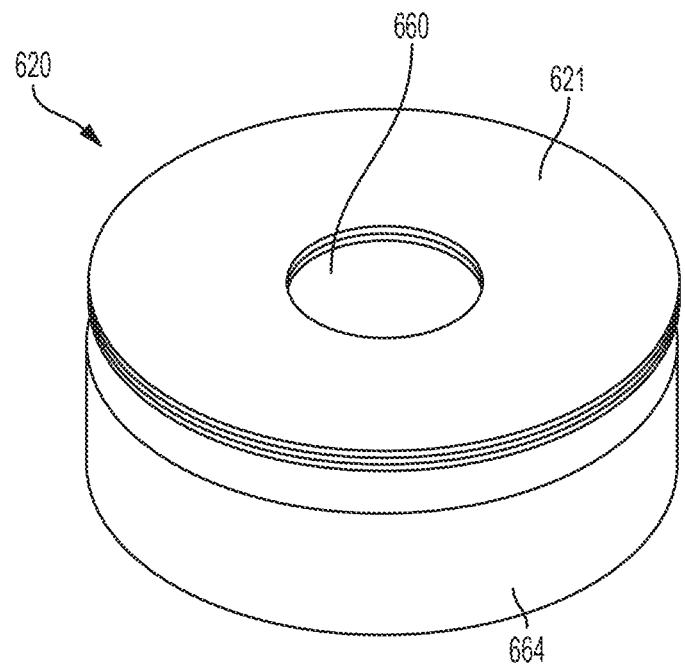
FIGS. 11A and 11B illustrate a rotor assembly of the boundary layer turbomachine of FIGS. 10A and 10B.
Figure 11B:
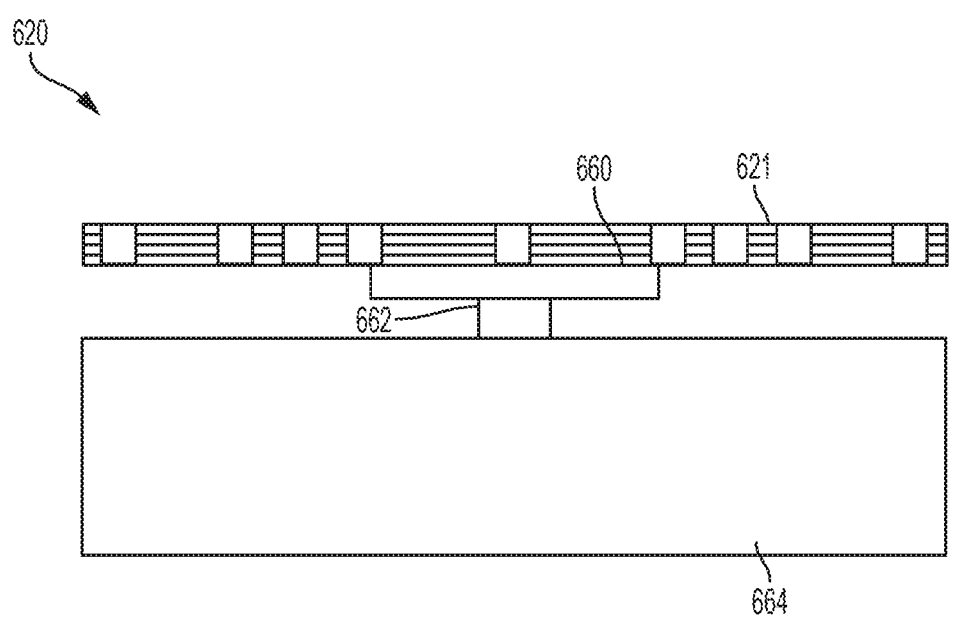

With reference to FIGS. 10A and 10B, a boundary layer turbomachine 600 is illustrated in accordance with another example of the present disclosure. The boundary layer turbomachine can include a housing 610. The housing can have openings 612, 613, which can serve as inlet or outlet openings, based on operation of the boundary layer turbomachine, to facilitate movement of a fluid (i.e., a gas and/or a liquid) through the housing, as illustrated by inlet/outlet flow directions 608, 609. Notably, the turbomachine can utilize multi-phase systems as the working medium including liquids, vapors, gases, and combinations of these, including solid suspended fine particles. The opening 613 can be located on or about a rotational axis of a rotor assembly 620 while the opening 612 can be located on the housing 610 radially outward from the rotational axis. The partition members are obscured but oriented circumferentially between the rotor assembly 620 and inner surface of the housing 610 as described with reference to FIGS. 3A and 3B. FIGS. 11A and 11B illustrate views of the rotor assembly 620 isolated from the housing 610 for further reference. In one aspect, the boundary layer turbomachine can be designed and operated as "directional" in that the flow of fluid always enters the housing via the same inlet opening and exits the housing via the same outlet opening. In another aspect, the boundary layer turbomachine can be designed and operated as "bidirectional" in that the flow of fluid can be switched to enter the housing via either opening 612 or 613 and exit the housing via the other opening to obtain forward and reverse fluid flow. In some embodiments, multiple openings 612, which can serve as inlet and/or outlet openings, can be located on the housing 610 radially outward from the rotational axis. Thus, any suitable number of openings 612 can be included and can be formed by an opening manifold 644 or conduit.

The housing 610 can define an interior space 615 to accommodate the rotor assembly 620. The rotor assembly can be configured to rotate about an axis of rotation. The rotor assembly can have a plurality of disks 621 spaced apart along the axis of rotation, as described above, that define an interior opening 626 along the axis of rotation. Thus, fluid can pass through gaps between the disks and the interior opening as the fluid moves through the housing between the opening 612 and the opening 613.

The rotor assembly 620 can also include an extension member 622 coupled to the plurality of disks 621. In one aspect, the extension member 622 can include a vent port 625 extending through the extension member in fluid communication with the interior opening 626 formed by the plurality of disks 621. Thus, fluid can exit or enter the housing via the extension member vent port 625, which may extend through the housing opening 613.

In addition, the rotor assembly 620 can include a mounting plate 660 coupled to the plurality of disks 621. The extension member 622 and the mounting plate 660 can be attached to the plurality of disks 621 using an adhesive, fasteners, or any other suitable substance or device. The mounting plate 660 can form a barrier to fluid passing through the interior opening 626, such that the fluid must flow either through the vent port 625 or the gaps between the disks as the fluid passes through the interior opening 626.

The rotor assembly 620 can further include a base 664 coupled to the mounting plate 660 via a connecting member 662. The base 664 can be disposed at least partially within the interior space 615 of the housing 610. In one aspect, the base 664 can be used to couple the rotor assembly 620 to the housing 610 and facilitate rotation of the rotor assembly about the axis of rotation 601. The base 664 can be mounted on bearings when coupled to the housing 610 to provide a low friction rotational interface. In one aspect, boundary layer turbomachine 600 can be constructed in a modular manner, where the housing 610 and the rotor assembly 620 are interchangeable with like components to achieve a desired result. Thus, the base 664 can be configured to "float" along the axis of rotation to accommodate any suitable number of disks that may be included in a given rotor assembly. In some embodiments, the base 664 can be adjusted in size as the number of disks changes to maintain a consistent stack height of the rotor assembly, although this need not be the case. The housing 610 can include a shoulder 619 configured to be located proximate the plurality of disks at location 628. The shoulder 619 can at least partially define a region radially outward from the plurality of disks 621 within the interior space 615 to facilitate the passage fluid through the housing 610 to or from the gaps in the plurality of disks 621.

In one aspect, the base 664 and/or the extension member 622 can facilitate coupling the rotor assembly 620 to a generator, a motor, a drive shaft, etc. A generator (e.g., an electric generator or a pump) can be coupled to the rotor assembly 620, such as via the base 664, to generate power as the fluid moves through the housing 610. A motor can be similarly coupled to the rotor assembly 620 to cause rotation of the rotor assembly, thereby causing movement of the fluid through the housing 610 and utilizing the boundary layer turbomachine 600 as a pump. The base 664 and/or the extension member 622 can therefore serve as a mechanical transfer coupling for the rotor assembly 620 to an external device, such as a generator or a motor. Any suitable generator or motor can be utilized with the boundary layer turbomachine 600. In addition, the boundary layer turbomachine 600 can be operated with the axis of rotation in any suitable orientation, such as vertical or horizontal.

Although the various components of the boundary layer turbomachine 600 can be constructed of any suitable material, in one aspect the rotor assembly 620 (i.e., the plurality of disks 621, the base 664, the connecting member 662, and/or the extension member 622) and/or the housing 610 can be made in whole or in part from carbon fiber composite (e.g., Toray T800S) or any other suitable lightweight structural material. As a general guideline, the rotor assembly 620 is designed to provide a low mass to volume ratio. In some cases, the rotor assembly 620 can be provided as a complete unit as a replacement of a damaged or worn rotor assembly.

Figure 12:
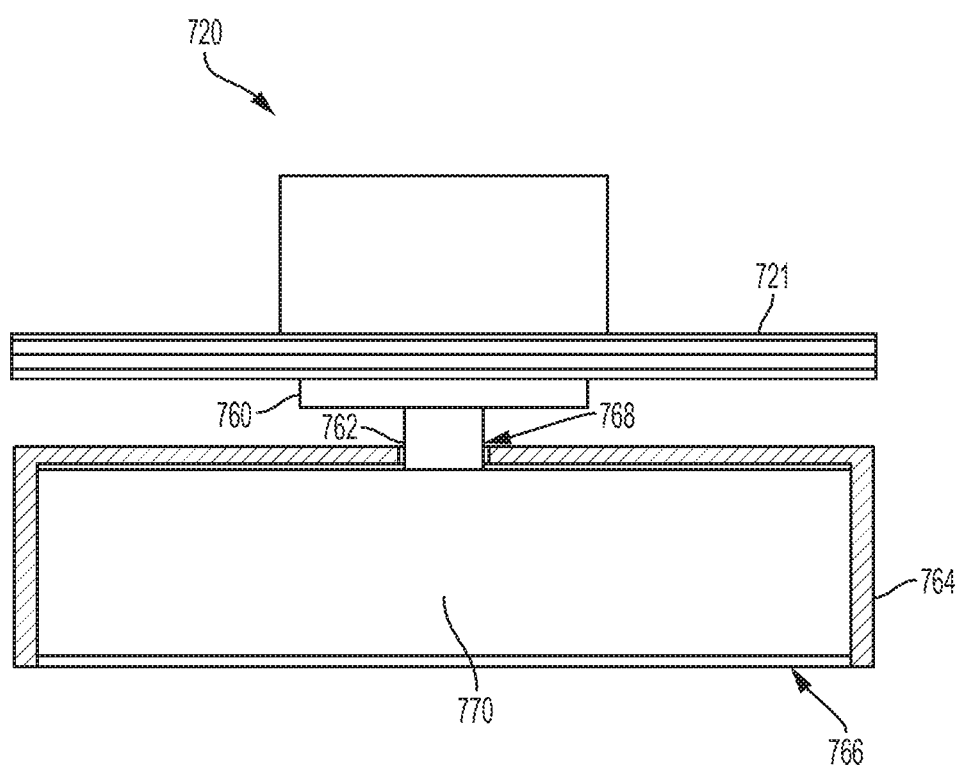
FIG. 12 illustrates a rotor assembly of a boundary layer turbomachine in accordance with another example of the present disclosure.

FIG. 12 illustrates a rotor assembly 720 in accordance with another example of the present disclosure. As with the rotor assembly 620 described above, the rotor assembly 720 includes mounting plate 760 coupled to a plurality of disks 721, a base 764, and a connecting member 762. In this case, however, the base 764 includes an opening 766 configured to accommodate a motor 770, which is coupled to the mounting plate 760 via the connecting member 762. The base 764 can include an opening 768 through which the connecting member 762 can extend. Thus, in this embodiment, the base 764 can be fixed relative to a housing and the motor 770, while the connecting member 762 serves as a drive shaft from the motor to cause rotation of the plurality of disks 721.

Figure 13A:
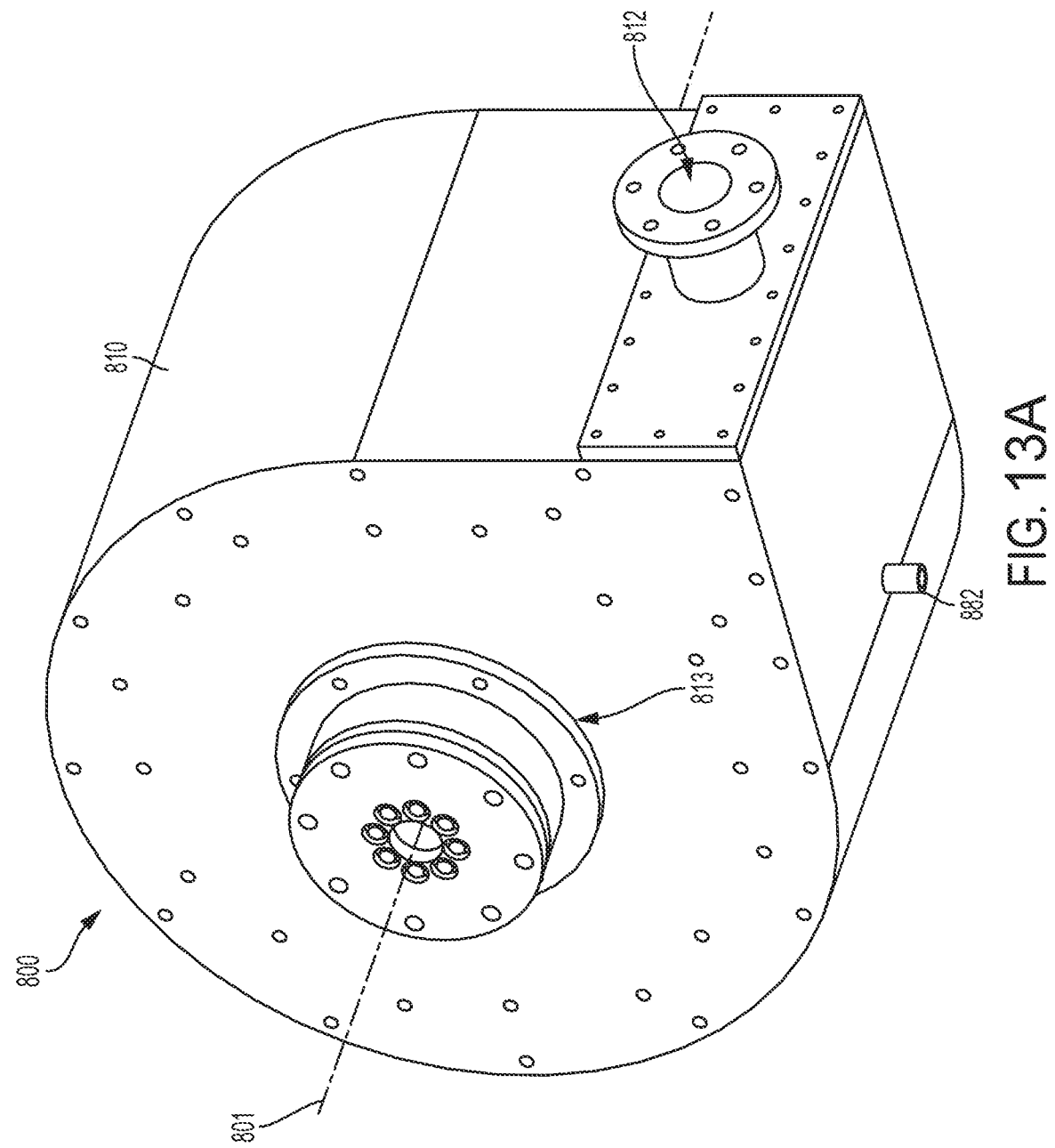
FIG. 13A is a perspective view of a boundary layer turbomachine in accordance with another example of the present disclosure.
Figure 14A:
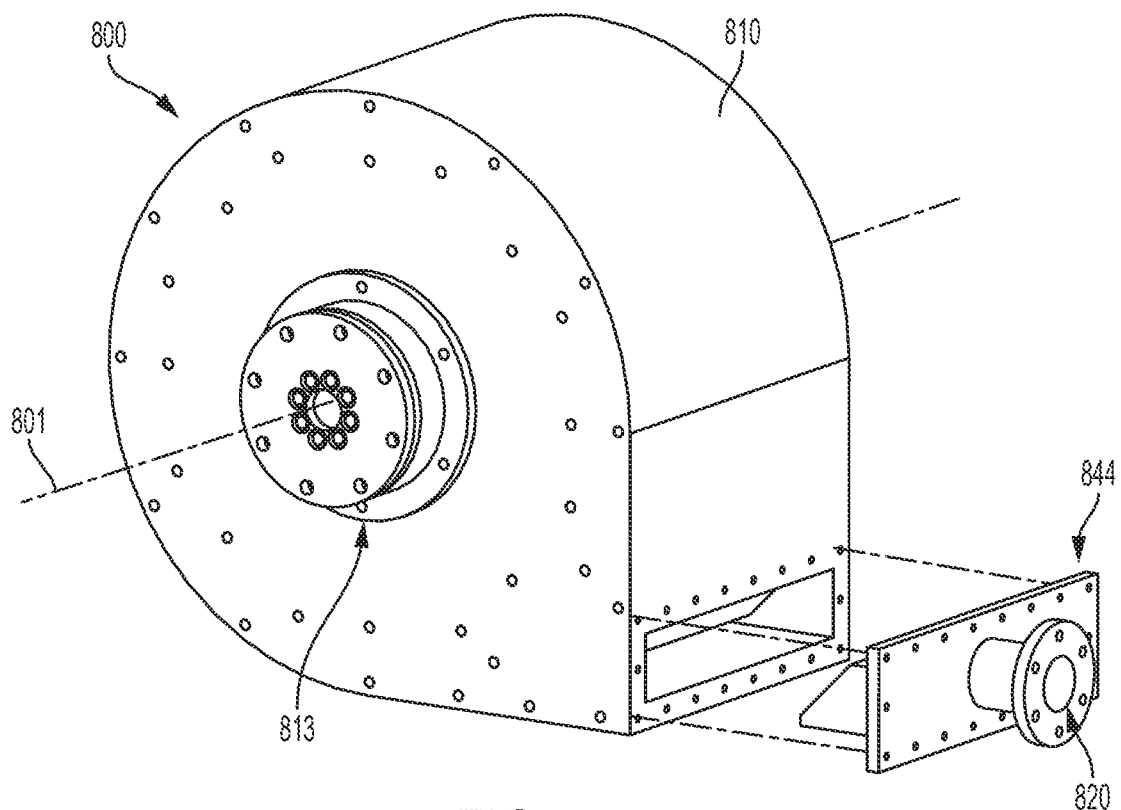
FIGS. 14A and 14B are partially exploded perspective views of the boundary layer turbomachine of FIG. 13.
Figure 14B:
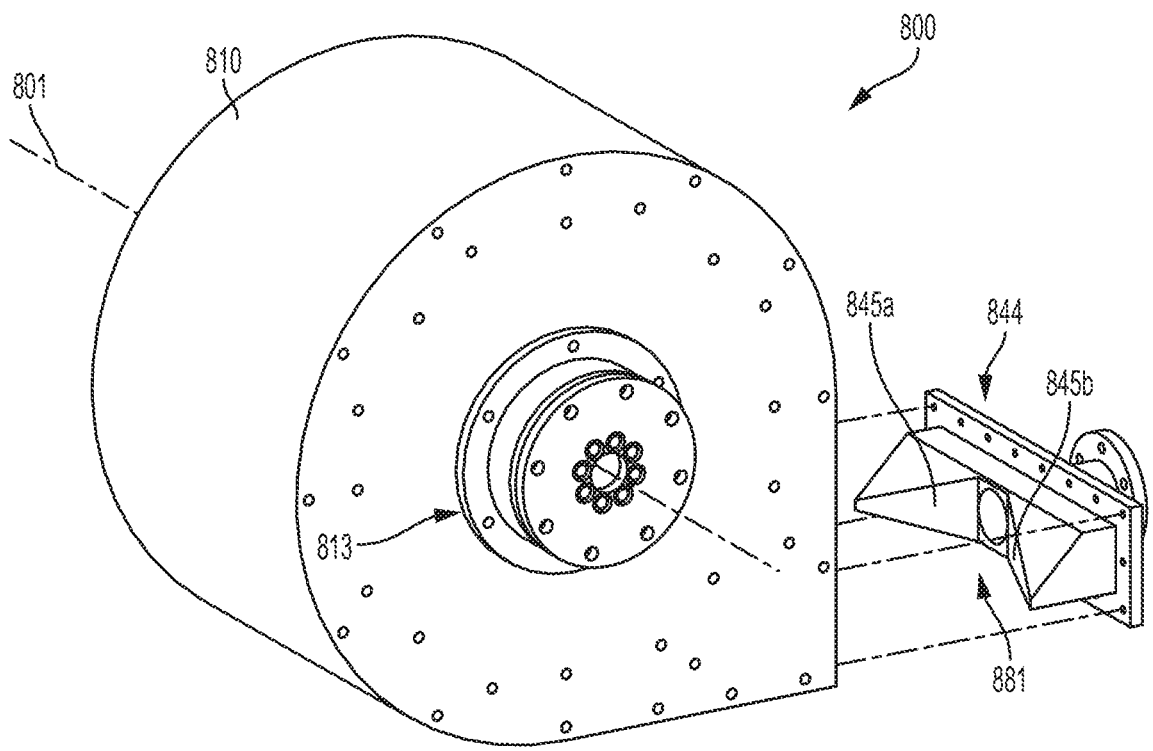
Figure 15A:
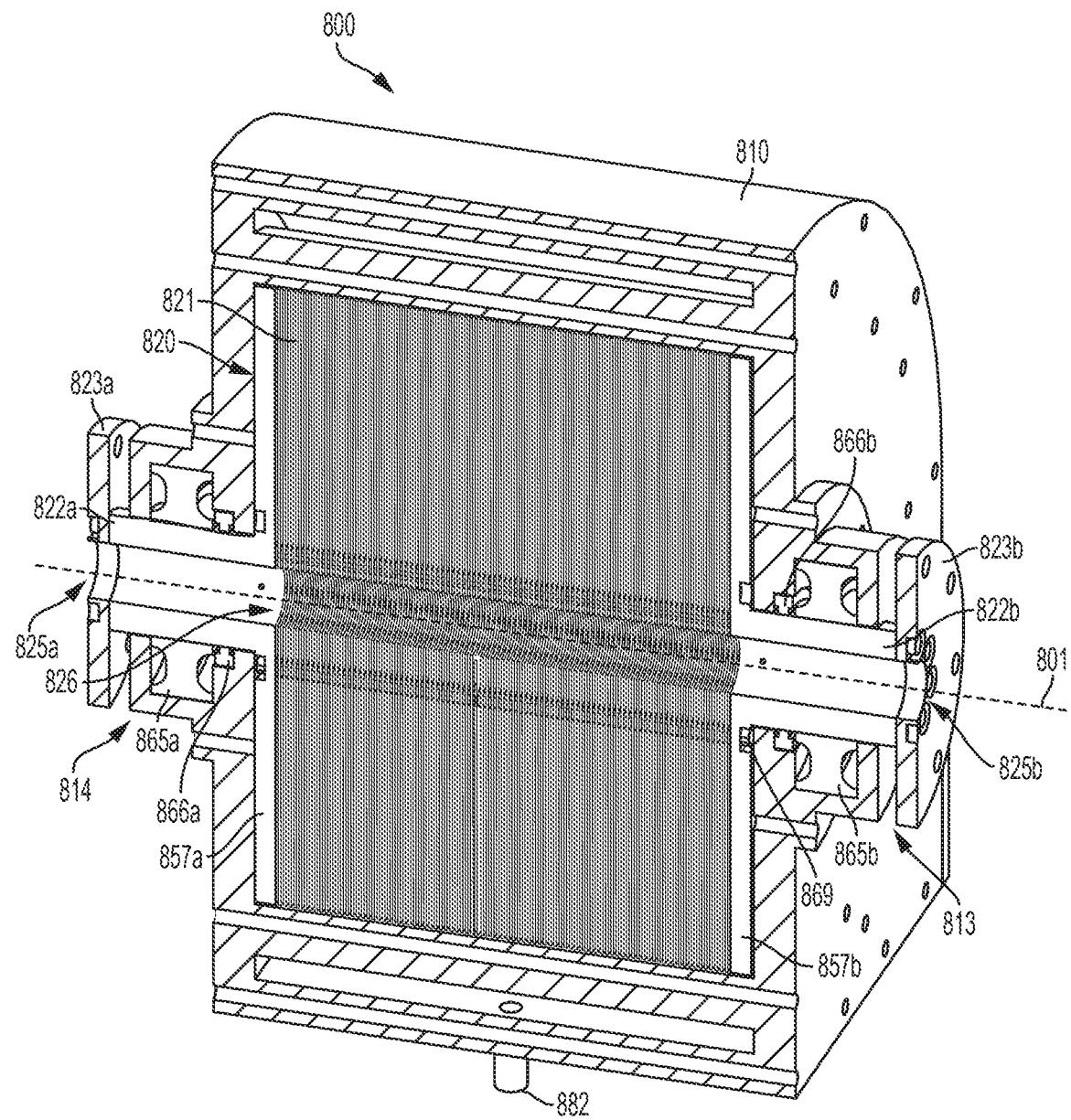
FIG. 15A is a cross-sectional view of the boundary layer turbomachine of FIG. 13 parallel to a rotational axis.
Figure 15B:
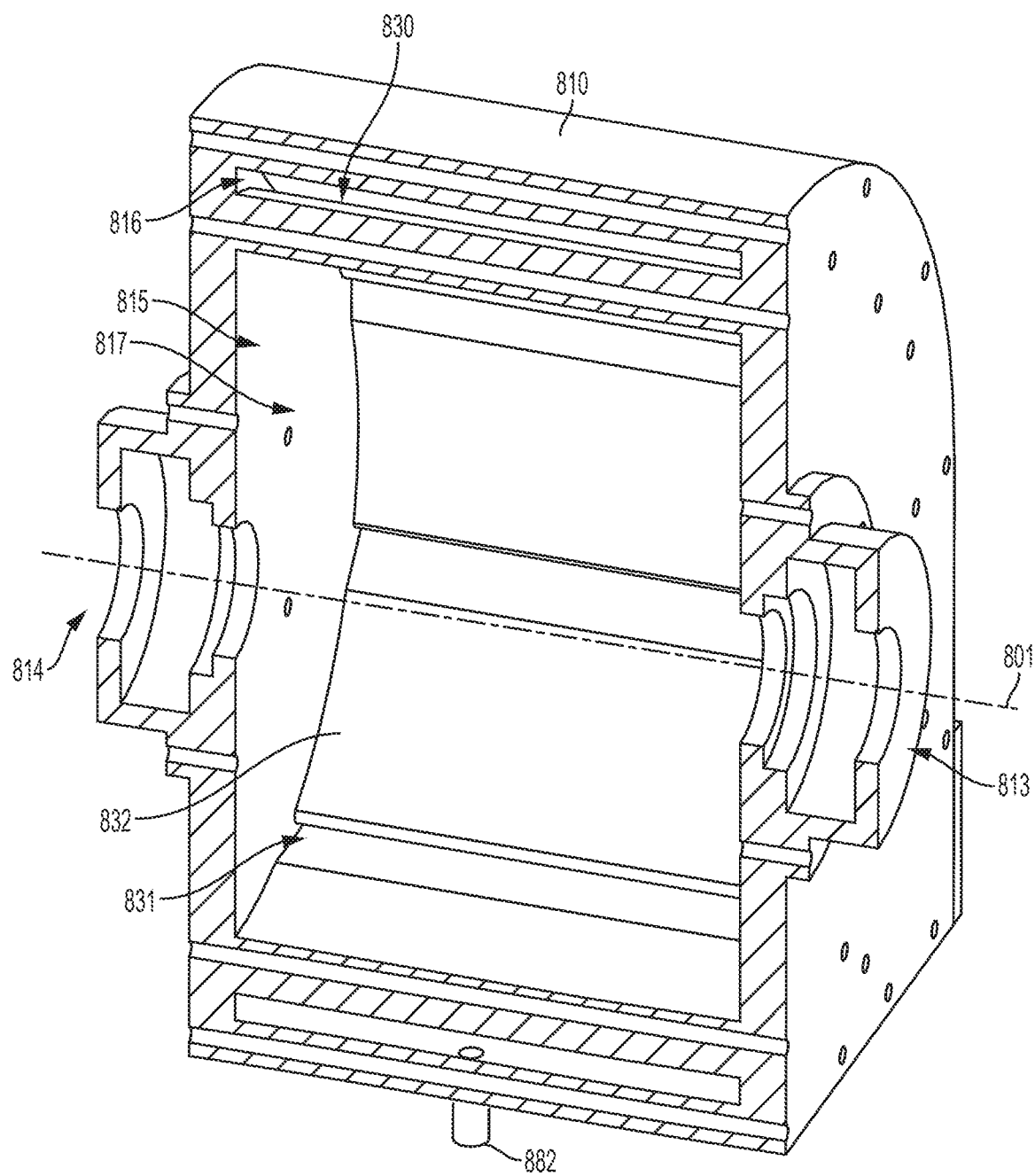
FIG. 15B is a cross-sectional view of the boundary layer turbomachine of FIG. 13 with a rotor assembly omitted.
Figure 16:
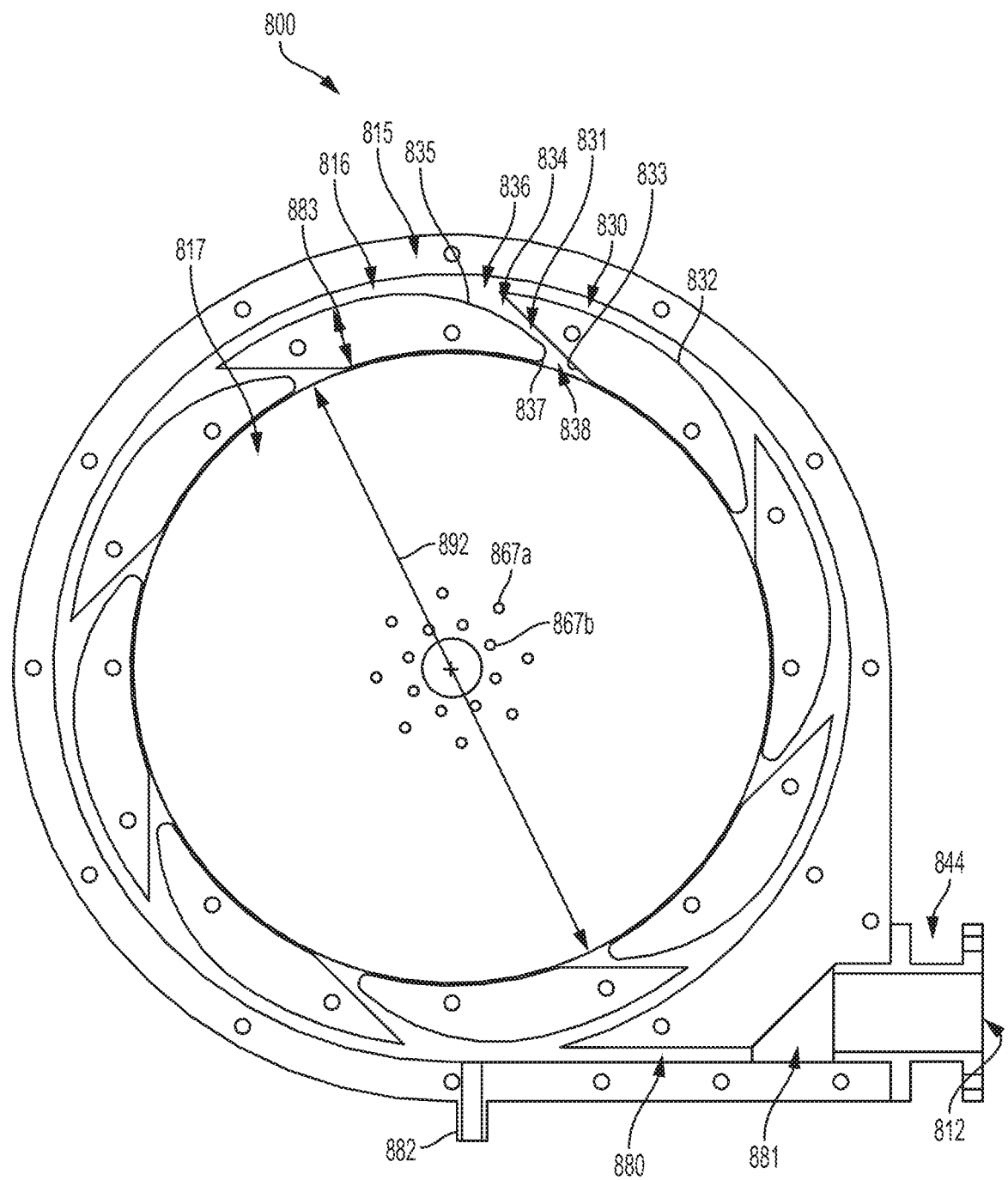
FIG. 16 is a cross-sectional view of the boundary layer turbomachine of FIG. 13 perpendicular to a rotational axis.

With reference to FIG. 13, a boundary layer turbomachine 800 is illustrated in accordance with another example of the present disclosure. FIGS. 14A-14B illustrate partially exploded views of the boundary layer turbomachine 800 and FIGS. 15A and 15B illustrate cross-sectional views of the boundary layer turbomachine 800 for further reference. As with other examples disclosed herein, the boundary layer turbomachine 800 can include a housing 810, which can include any number or configuration of housing portions in order to surround or enclose disks 821 of a rotor assembly 820 (FIG. 15A). A cross-section of the housing 810 without the rotor assembly 820 is shown in FIG. 15B and the rotor assembly 820 is shown isolated in FIG. 18 for further reference.

The housing 810 can have openings 812-814 to facilitate movement of a fluid (i.e., a gas and/or a liquid) through the housing. The openings 813, 814 can be located at or near a rotational axis 801 of the rotor assembly 820 while the opening 812 can be located on the housing 810 radially outward from the rotational axis 801. The openings 812-814 can serve as inlet or outlet openings depending on the direction of flow through the housing 810. For example, opening 812 can serve as an inlet opening, and opening 813 and/or opening 814 can serve as outlet openings. On the other hand, opening 813 and/or opening 814 can serve as inlet openings, and opening 812 can serve as an outlet opening. The boundary layer turbomachine 800 can be designed and operated as "directional" in that the flow of fluid always enters the housing 810 via the same inlet opening and exits the housing via the same outlet opening, or the boundary layer turbomachine can be designed and operated as "bidirectional" in that the flow of fluid can be switched to enter the housing via opening 812 or openings 813, 814 and exit the housing via the other opening(s) to obtain forward and reverse fluid flow. In some embodiments, multiple openings, which can serve as inlet and/or outlet openings, can be located on the housing 810 radially outward from the rotational axis similar to opening 812.

As with other examples disclosed herein, the rotor assembly 820 can have a plurality of disks 821 spaced apart along the axis of rotation 801, which can define an interior opening 826 along the axis of rotation (FIG. 15A). Thus, fluid can pass through gaps between the disks and the interior opening as the fluid moves through the housing 810, such as from the opening 812 to the opening 813 and/or 814.

Figure 17:
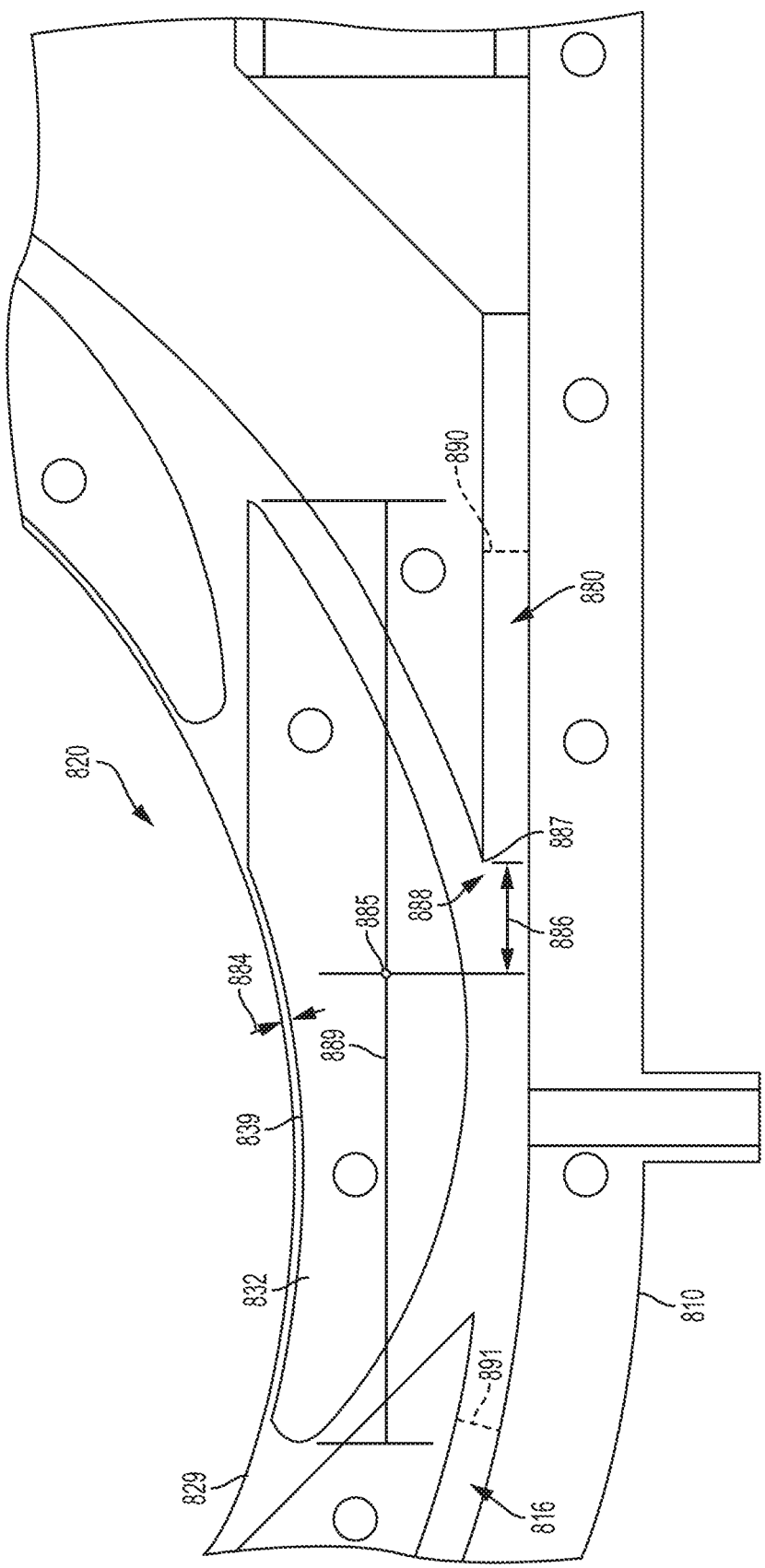
FIG. 17 is a detail of the cross-sectional view of the boundary layer turbomachine of FIG. 16.

As illustrated in FIGS. 15A and 15B, the housing 810 can define an interior space 815 to accommodate the rotor assembly 820. In addition, a partition 830 can circumferentially divide the interior space 815 into an outer chamber 816 and a rotor chamber 817 located radially inward of the outer chamber. When the opening 812 is an inlet opening, the housing 810 can have a distribution region 880 between the inlet opening and the interior space 815 to transition fluid flow from the inlet opening to the interior space. In one aspect, the opening 812 can be associated with an inlet manifold 844, which can be configured to form an expansion inlet region 881. The expansion inlet region 881 and the distribution region 880 can form a redirection chamber for the fluid, and the outer chamber 816 forms a distinct and separate expansion chamber for the fluid circumferentially about the partition 830. In one aspect, the distribution region 880 and the outer chamber 816 can have cross-sectional areas perpendicular to fluid flow directions (e.g., as represented in FIG. 17 at 890 and 891, respectively) that are equal to one another, however, it should be recognized that some differences in these areas can be acceptable. For example, the cross-sectional area 890 of the distribution region 880 can vary from the cross-sectional area 891 of the outer chamber 816 by as much as 100%. However, the cross-sectional area 890 of the distribution region 880 can most often vary from the cross-sectional area 891 of the outer chamber 816 by less than 10%, and in some cases is substantially equal (e.g. within about 1%). Providing substantially equal cross-sectional areas 890, 891 can maintain a constant velocity of the fluid and avoid eddy currents within the outer chamber 816. The manifold 844 can be configured as a modular, replaceable fitting that can be used to provide different inlet opening sizes and expansion region characteristics, as desired, to affect the intake pressure and/or flow pattern of the fluid. For example, the manifold 844 can have expansion surfaces 845a, 845b (FIG. 14B) configured to define the expansion region 881. The expansion surfaces 845a, 845b can be sized and/or angled to provide desired expansion region characteristics. In this configuration, the expansion surfaces 845a and 845b can be tapered from an inlet diameter (i.e. associated with a circular inlet) to a narrower expansion height. In this manner, the inlet manifold 844 can progressively vary cross-sectional area from a circular inlet to a rectangular distribution region 880 cross section. Such progressive transition can help to reduce or eliminate eddies or disturbances in fluid flow which can also reduce desirable laminar flow. Generally, laminar flow throughout the device can increase operating efficiencies. Accordingly, transitions into the expansion region, interior space, outer region, disk gaps, outlets, and the like can be configured to reduce or substantially eliminate non-laminar flow. Although not required, the distribution region 880 can be oriented to produce tangential flow within the outer chamber 816. A fluid drain 882 can be associated with the housing 810 and in fluid communication with the interior space 815 to drain liquid from the interior space.

The partition 830 can have partition openings 831 such that fluid is movable through the partition between the outer chamber 816 and the rotor chamber 817. The partition openings 831 can be spaced (e.g., equally) circumferentially around the partition 830 so as to allow fluid to move from the outer chamber 816 into the rotor chamber 817 and, thus, into gaps between the disks of the rotor assembly 820, at multiple locations around the outer edge of the disks. In one aspect, the partition openings 831 can be defined by two or more partition members 832 or formed in a single partition member. The partition members 832 can be arranged in a circular configuration with an internal diameter sized to accommodate the rotor assembly 820 disks (i.e., larger than the outer diameter of the disks). The partition members 832 can be spaced (e.g., equally) circumferentially around the rotor chamber 817. The partition 830 (i.e., partition members 832) can be an individual component which is secured in place, or integrally formed with the housing 810.

The partition openings 831 can comprise a venturi configuration formed by two spaced apart complementing surfaces 833, 834 of adjacent partition members 832 that converges and/or diverges such that fluid passing through the partition opening reaches enhanced speed while concurrently developing a significantly reduced pressure producing an effect similar to the Venturi effect. Any suitable venturi configuration can be utilized. In one aspect, each partition member 832 can have an inlet surface radius 835 forming a portion of a partition opening inlet 836. The inlet surface radius 835 (e.g. radius of curvature) can be equal to a radial thickness 883 (i.e., a maximum radial thickness) of the partition member plus ½ the radial thickness. As a general guideline, the inlet surface radius can be within 5%, and most often within about 1% of 1.5 times the radial thickness 883. In another aspect, each partition member 832 can have an outlet surface radius 837 forming a portion of a partition opening outlet 838. The outlet surface radius 837 can be equal to one-third of the inlet surface radius 835, and generally at least within 20%, often within 5% of one-third the inlet surface radius 835. As illustrated, the surfaces 833 of the partition members 832 can be planar in whole or in part, although any suitable configuration can be utilized.

Any suitable number of partition members 832 can be utilized. In one aspect, the number of the partition members 832 can be at least 8 and equal to the nearest or next larger even whole number of inches (e.g. units of 2.54 cm) within an outer diameter 892 of the plurality of disks 821 divided by 2. In one aspect, at least 8 partition members 832 can be included regardless of the outer diameter of the disks 821. For example, 10 partition members can be used with 19-inch diameter disks, and 8 partition members can be used with 14-inch diameter disks. As shown in the detail view of FIG. 17, the position of the partition members 832 can be established relative to the housing 810. In one aspect, one of the partition members 832 can be located such that a midpoint 885 of the partition member is offset 886 by 51% (not shown to scale for clarity) of a length 889 of the partition member from a terminal point 887 of the housing 810 defining a fluid inlet pathway or conduit 888, such as at a termination of the distribution region 880. However, the forward offset 886 can in some cases be within about 1% of 51% of the length 889, although not less than 50% to avoid creation of eddies. The midpoint 885 can represent a geometric center of a line 889 defining a length of the partition member 832.

In one aspect, the outer chamber 816 (i.e., an expansion chamber in some embodiments) can have a constant or uniform cross-sectional area 891, such as by maintaining dimensional characteristics and geometry for a full 360 degrees about the axis of rotation 801, and in most cases at least 330 degrees about the axis of rotation 801. It is noted that the outer chamber 816 does not include the partition openings 831 formed between adjacent partition members 832, or the distribution region 880. Thus, in the illustrated embodiment, the outer chamber 816 has a cylindrical configuration with the cross-sectional area 891 being uniform about the outer chamber 816 through a constant cylindrical wall thickness.

In order to scale the turbomachine 800, the diameter of the disks may be increased and/or the number of disks may be increased. When increasing the number of disks, the length of the turbomachine will increase along the axis of rotation. In one aspect, the disks can be configured in disk packs or disk pack segments having a plurality of disks "bookended" by outer support disks. Such disk pack segments can include one or more inner support disks as described above. Multiple disk pack segments can be combined together on a common disk carrier (which may be a combination of multiple disk carriers) to suit a given design objective. In such cases, a turbomachine can include multiple inlets and/or outlets to facilitate movement of fluid through the turbomachine. In this manner, multiple disk pack segments can form multiple corresponding fluid flow regions. In some embodiments, inlet/outlet regions within the turbomachine (e.g., within a common housing) can be physically separated with baffles or shrouds to substantially isolate fluid flow to respective inlet/outlet regions. In other embodiments, inlet/outlet regions of a multiple fluid flow region configuration can have a common expansion chamber and/or common fluid outlet region.

FIG. 17 further illustrates an outer diameter edge 829 of the rotor assembly 820 spaced a radial rotor gap distance 884 apart from an inner edge or surface 839 of partition members 832. In one aspect, the radial distance 884 can be equal to 6 times a boundary layer thickness of the fluid, in some cases from 3 to 10 times, and in some 3 to 8 times. Although distances can vary based on specific design parameters, the radial distance can generally be slightly higher when the turbomachine is configured as a pump. For example, in a pump configuration, the radial distance 884 may be about 2-10% higher than a similarly configured turbine configuration. In either case, a range of 3 to 10 times the boundary layer thickness can be suitable.

Figure 18:
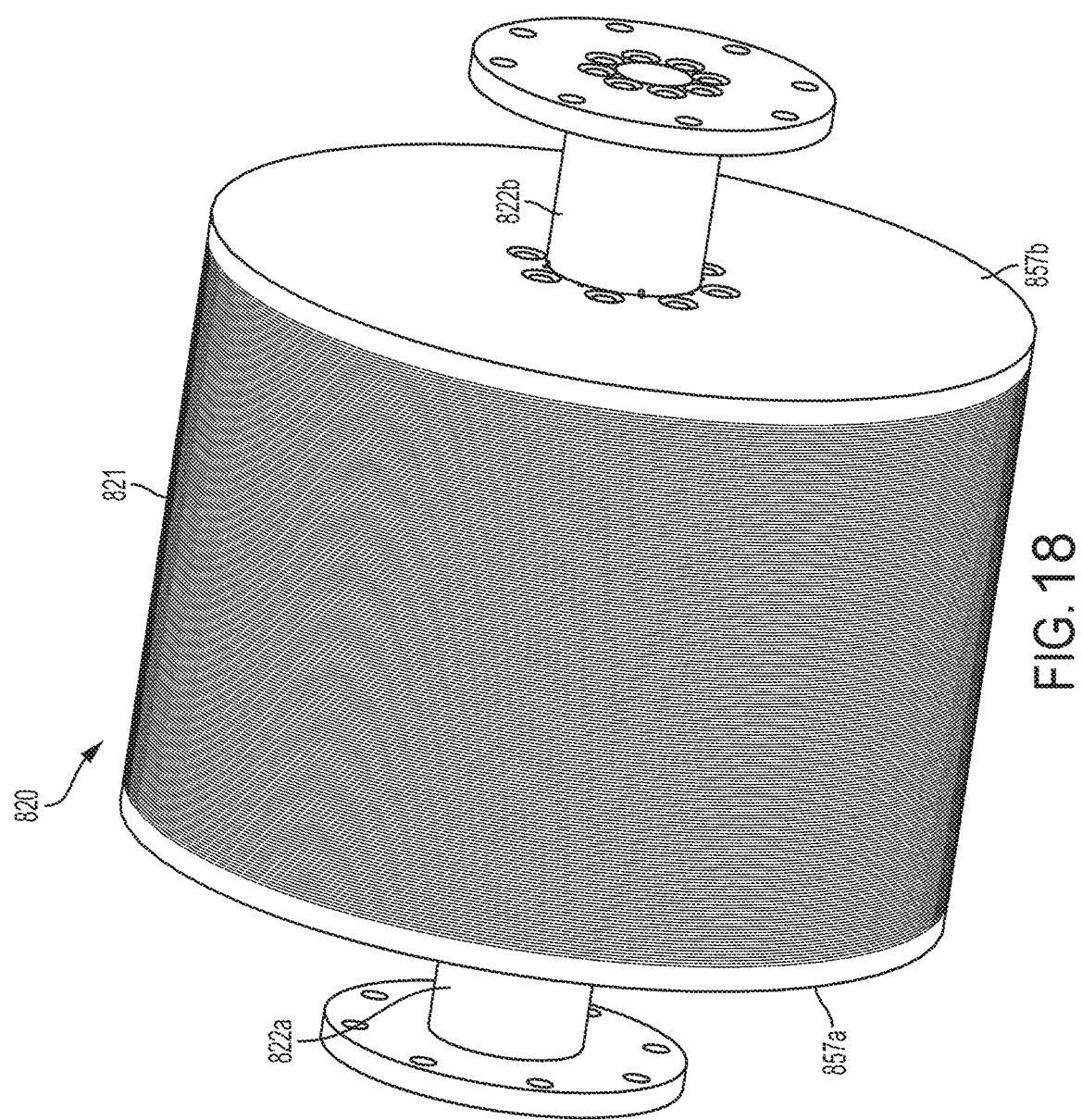
FIG. 18 is perspective view of a rotor assembly of the boundary layer turbomachine of FIG. 13.

As shown in FIGS. 15A and 18, the rotor assembly 820 can also include an extension member 822*a*, 822*b* to couple the rotor assembly to the housing 810 and facilitate rotation of the rotor assembly about the axis of rotation 801. For example, the extension members 822*a*, 822*b* can be attached to the plurality of disks 821 opposite one another and substantially inline to facilitate rotation of the rotor assembly about the axis 801. In one aspect, the extension members 822*a*, 822*b* can be attached to the plurality of disks 821, such as via outer support disks 857*a*, 857*b*, using an adhesive, fasteners, or any other suitable substance or device. In another aspect, the extension members 822*a*, 822*b* can be integrally formed with outer support disks 857*a*, 857*b*, respectively. In addition to providing an interface or structure for coupling with the extension members 822*a*, 822*b*, the outer support disks 857*a*, 857*b* can be used to "cap" an end of the rotor assembly disks, thus providing smooth exposed disk faces on opposite ends of the rotor assembly. In one aspect, the disks of the rotor assembly 820 can be constructed of lightweight composite material (e.g., carbon fiber and/or basalt fiber). In a particular aspect, the outer support disks 857*a*, 857*b* can be constructed of a metal material (e.g., steel, aluminum, nickel, bronze, etc.), which may be of the same or a similar type of material used to construct the extension members 822*a*, 822*b*.

As shown in FIG. 15A, the extension members 822*a*, 822*b* can be mounted on bearings 865*a*, 865*b* when coupled to the housing 810 to provide low friction rotational interface, although other mounts can be used. Seals 866*a*, 866*b* can be included to prevent or minimize leakage of fluid from the housing 810 around the extension members 822*a*, 822*b*. In one aspect, the extension members 822*a*, 822*b* can include vent ports 825*a*, 825*b* extending through the extension members in fluid communication with the interior opening 826 formed by the plurality of disks 821. Thus fluid can exit or enter the housing 810 via the extension member vent ports 825*a*, 825*b*, which extend through the housing openings 813, 814, respectively.

Extension plates 823*a*, 823*b* can be attached to ends of extension members 822*a*, 822*b*, respectively. The extension plates can be used to couple to a suitable mechanical rotational energy capture device (e.g. driveshaft, belt, or the like). Fluids can be withdrawn through vent ports 825*a*, 825*b* by coupling the extension plates with a rotational coupling to a fixed outlet conduit. Alternatively, the extension members 822*a*, 822*b* can be elongated to extend well beyond the outer housing 810. Fluid outlets can be distributed along the elongated portion to allow release of the fluids such that a fixed driveshaft or other member can be attached at a distal end of the elongated portion while also allowing removal of the fluid from the system. Regardless, any number of configurations can be used to couple a corresponding mechanical energy capture device while also allowing exit of fluid from the interior opening 826.

Figure 19:
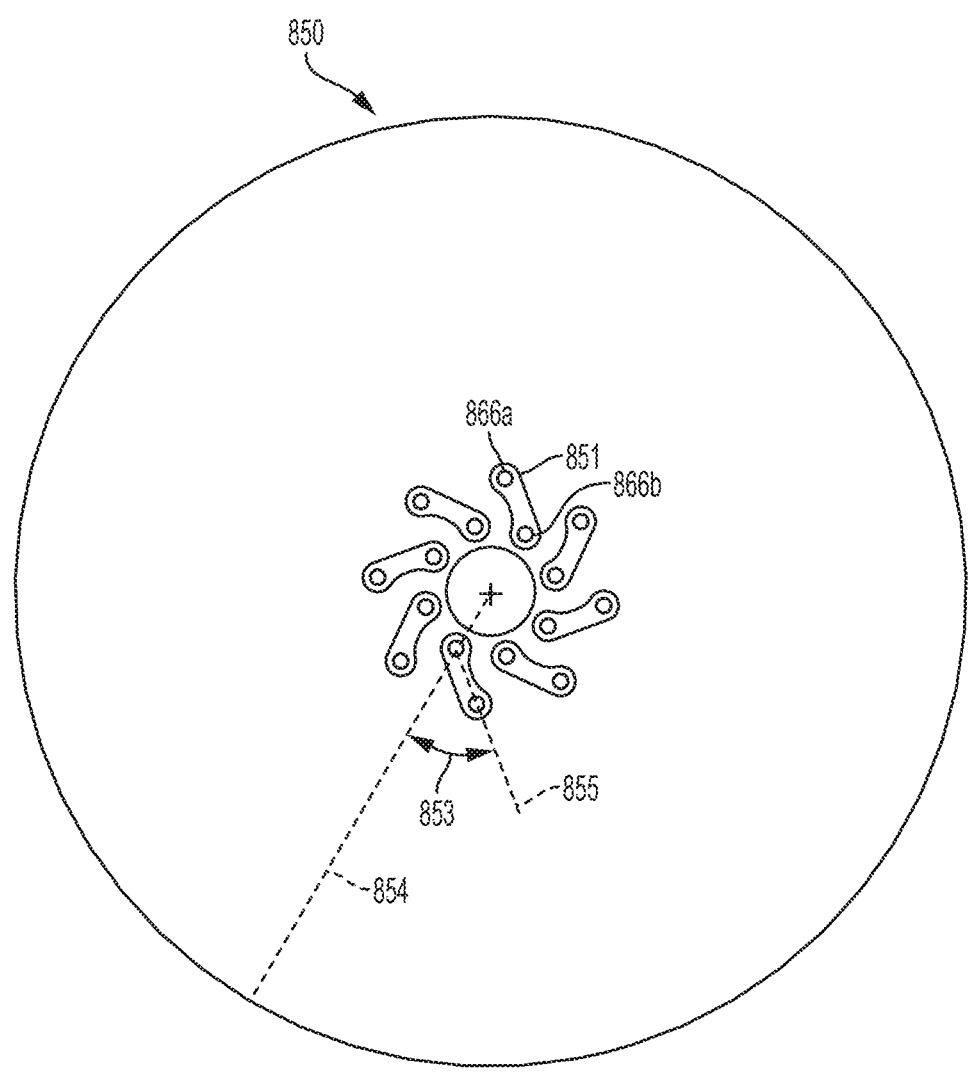
FIG. 19 illustrates a disk and spacers of the rotor assembly of the boundary layer turbomachine of FIG. 13.

FIG. 19 illustrates a disk 850 that can be utilized in a rotor assembly in accordance with an example of the present disclosure, such as the rotor assembly 820 discussed above. As shown in the figure, the disk 850 can include a plurality of spacers 851. The spacers 851 can have any suitable cross-section such as, but not limited to, airfoil, elliptical, circular, diamond, and the like. The spacers 851 can be arranged in a ring configuration across the disk 850 as illustrated. In one aspect, the spacers 851 can be confined to a region within one-half of a radius 854 of the disk 850. In another aspect, the spacers 851 can be confined to a region within one-third of the radius 854 of the disk 850. Centrally locating the spacers 851 (e.g. but not within the interior open space) about the disk 850 can allow radially outward portions of the disk freedom to flex or deflect. Under operating conditions (e.g., high rotational speed with fluid between adjacent disks), such flexibility of the disks can be beneficial in that the disks can "self-adjust" in response to pressure differentials by equalizing distance between adjacent disks, which can provide performance benefits for the turbomachine 800.

In one aspect, the spacers 851 can be configured as fluid guides. In this case, the spacers 851 can be oriented at an inclination angle 853, which can be selected based on desired operating parameters. As a general guideline, the inclination angle 853 (i.e. an angle between a rotor radius 854 and a central longitudinal spacer axis 855) can be from about 20° to about 75°, and in some cases 30° to 55°. The number, geometric design, and location of the spacers 851 on the disk 850 can be optimized based on the size of the disk, the inlet pressure, and the design speed of rotation of the rotor assembly. In one aspect, the number of spacers 851 can be equal to the number of partition members (e.g., partition members 832).

In one aspect, multiple disks 850 can be coupled to one another utilizing the spacers 851 to form the disks of a rotor assembly. For example, the spacers 851 can include holes or openings 866*a*, 866*b* and the disk 850 can include holes or openings 867*a*, 867*b* (see, e.g., FIG. 16), which are configured to receive a fastener (e.g., threaded fastener 869 of FIG. 15A) that can couple multiple disks to one another. In this example, two fasteners can be used to extend through and secure an individual spacer 851 between adjacent disks 850, which can serve to provide stability for the spacer during operation of the turbomachine. Thus, the fasteners can optionally be a plurality of bolts which pass through the disks. Such fasteners can be distributed about the disks as described in more detail herein. It should be recognized that, alternatively, spacers can be integrally formed with the disks. In one aspect, aside from the exposed central opening in the disk 850 that combines to form an interior opening within a rotor assembly, the disk can be solid with no windows or other fluid passageways when assembled in a rotor assembly. In other words, the disk 850 can be solid with no fluid communication through the disk in a direction parallel to the axis of rotation (e.g. other than through the central opening), thus precluding gap-to-gap fluid flow through the disk. At least one disk in a plurality of disks can be solid, and in another option all of the plurality of disks can be solid (exclusive of a central axial opening).

Figure 20:
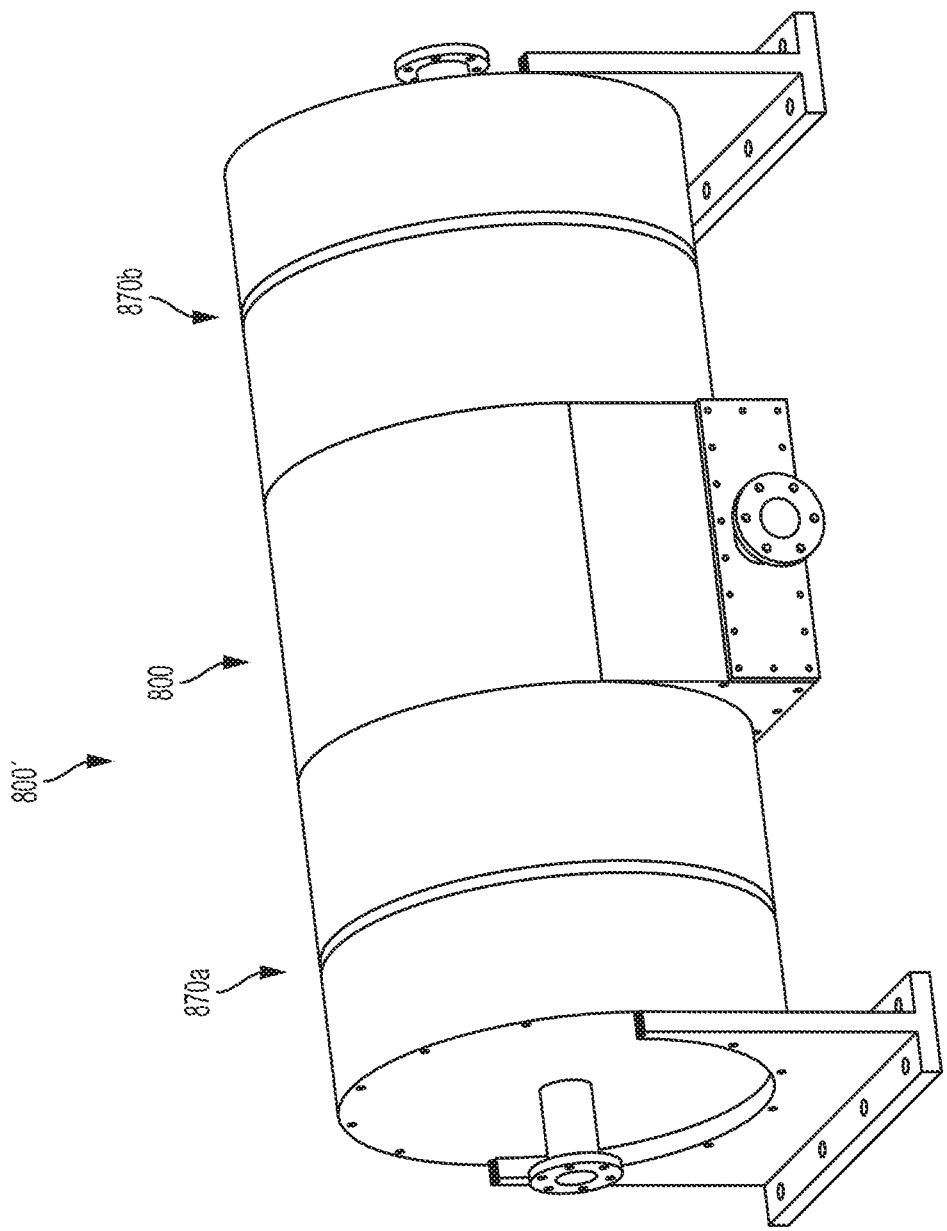
FIG. 20 is a perspective view of a boundary layer turbomachine in accordance with another example of the present disclosure.
Figure 21:
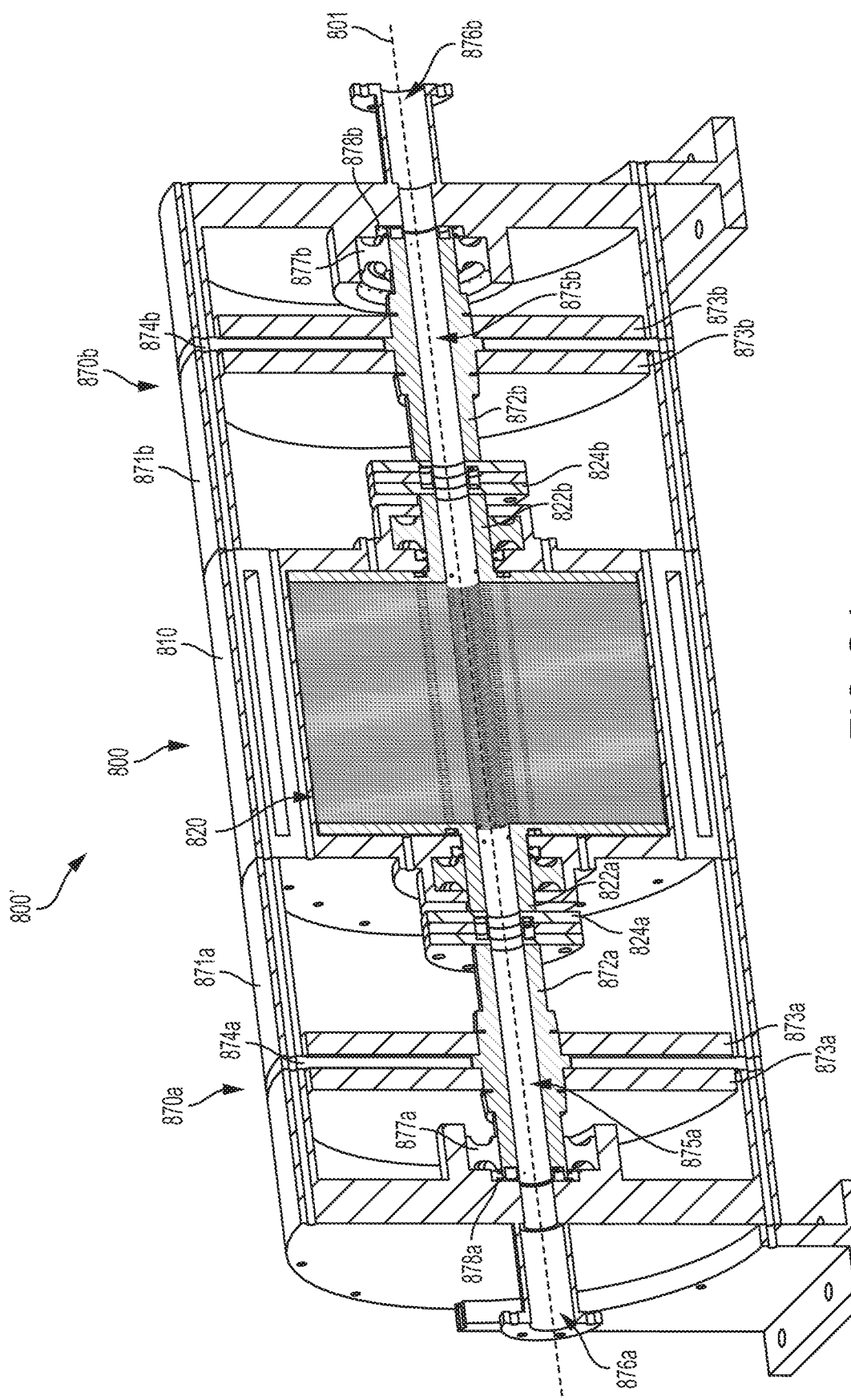
FIG. 21 is a cross-sectional view of the boundary layer turbomachine of FIG. 20.

FIGS. 20 and 21 illustrate a turbomachine 800' in accordance with another example of the present disclosure. In this case, the turbomachine 800' includes the turbomachine 800 discussed above with reference to FIGS. 13-16, which is coupled to one or more generators and/or motors 870*a*, 870*b*. As shown in FIG. 21, the extension member 822*a*, 822*b* can facilitate coupling the rotor assembly 820 to the generator and/or motors 870*a*, 870*b*. For example, the extension member 822*a*, 822*b* can include a flange 824*a*, 824*b* to interface with a generator shaft and/or a motor shaft 872*a*, 872*b* and facilitate coupling the rotor assembly 820 to the generators and/or motors 870*a*, 870*b*, such as utilizing fasteners, etc.

In one aspect, the generators and/or motors 870*a*, 870*b* can be configured to cause rotation of the rotor assembly 820, thereby causing movement of the fluid through the housing 810. The generators and/or motors 870*a*, 870*b* can therefore serve to provide torque to the extension member 822*a*, 822*b* when the turbomachine is operating as a pump or to "start-up" the turbomachine when used as a generator. In the latter case, the generators and/or motors 870*a*, 870*b* can switch from a motor that provides torque to a generator once the rotor assembly reaches a desired operating speed. The extension member 822*a*, 822*b* can therefore serve as a mechanical transfer coupling for the rotor assembly 820 to an external device, such as the generators and/or motors 870*a*, 870*b*. Any suitable generator or motor can be utilized with the boundary layer turbomachine 800. In one aspect, the housing 810 can be coupled to a housing 871*a*, 871*b* of the generators and/or motors 870*a*, 870*b*.

The shafts 872*a*, 872*b* can include central openings 875*a*, 875*b* to serve as conduits for fluid exiting or entering the turbomachine 800 via the extension members 822*a*, 822*b*. The housing 871*a*, 871*b* can include openings 876*a*, 876*b* to facilitate the passage of fluid through a wall of the housing 871*a*, 871*b*. In the illustrated example, the openings 876*a*, 876*b* are in fluid communication with the central openings 875*a*, 875*b* of the shafts 872*s*, 872*b*, but in some embodiments the shaft can extend through the opening in the housing. Bearings 877*a*, 877*b* and seals 878*a*, 878*b* can be associated with the housing 871*a*, 871*b* to support and seal about the shafts 872*s*, 872*b*.

In one aspect, one or more flywheels 873*a*, 873*b* can be coupled to the rotor assembly 820. The flywheels 873*a*, 873*b* can be mounted to the shafts 872*a*, 872*b* and can therefore rotate with the rotor assembly 820 about the axis of rotation 801. The shafts 872*a*, 872*b* can be sized to accommodate any suitable number of flywheels or other such rotary components. As shown in FIG. 21, the flywheels 873*a*, 873*b* can be disposed within the housing 871*a*, 871*b*. The flywheels 873*a*, 873*b* can serve to store rotational energy and/or can include an electricity generation member, therefore forming a portion of a generator and/or a motor. The generators and/or motors 870*a*, 870*b* can also include one or more stators 874*a*, 874*b* operable with the flywheels 873*a*, 873*b* to form a generator and/or a motor. The flywheels can be reduced in size or removed by making a disk carrier and/or outer disks within the disk assembly having a larger mass.

Figure 22A:
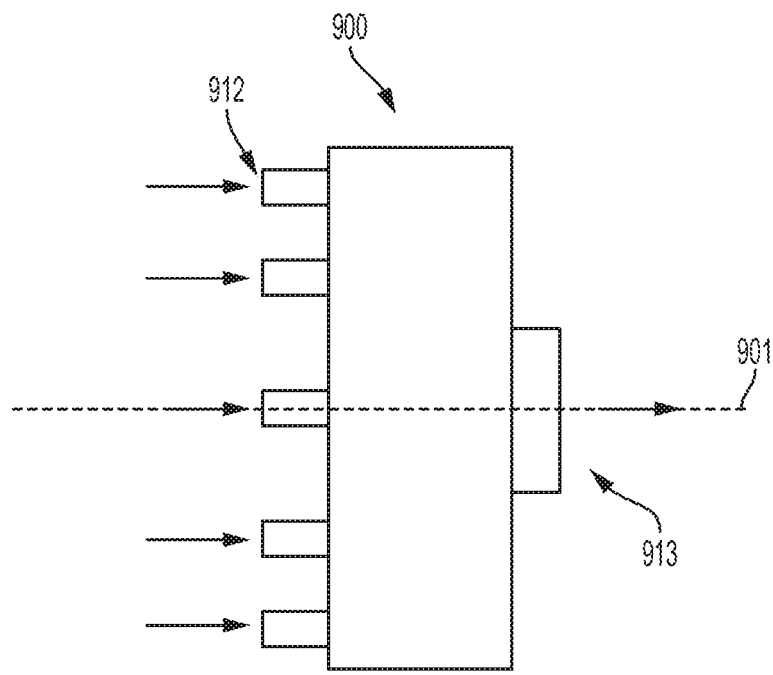
FIG. 22A is a schematic illustration of a boundary layer turbomachines configured as a pump in accordance with an example of the present disclosure.

FIGS. 22A-22F schematically illustrate boundary layer turbomachines in accordance with several examples of the present disclosure. For example, FIG. 22A illustrates a boundary layer turbomachine 900 configured as a pump. In this case, the fluid can enter the turbomachine via openings 912 located radially outward from the rotational axis 901, and can move radially inward to exit the turbomachine via an opening 913 located on or about the rotational axis.

Figure 22B:
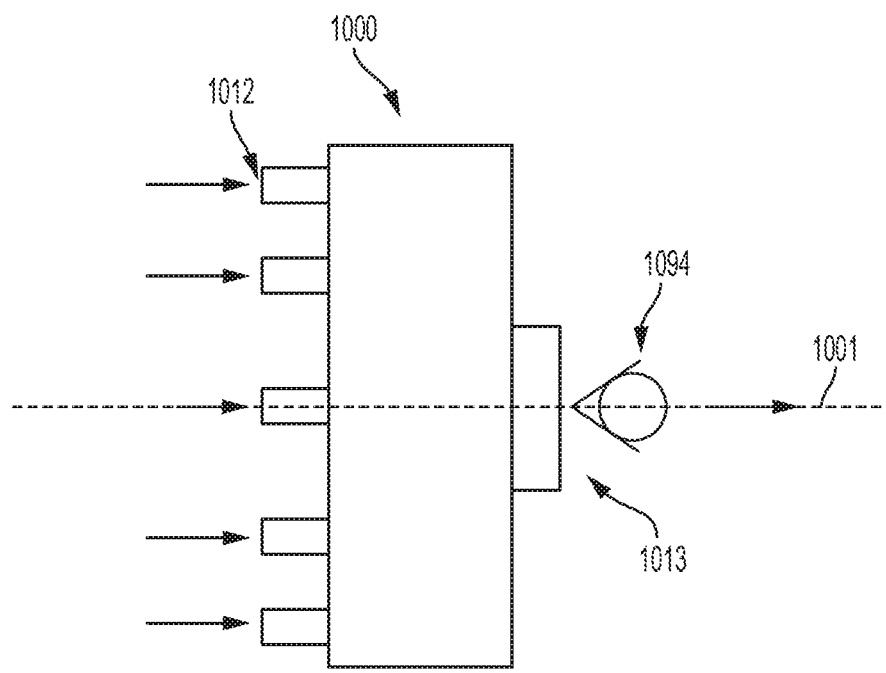
FIG. 22B is a schematic illustration of a boundary layer turbomachines configured as a vacuum pump in accordance with an example of the present disclosure.

FIG. 22B illustrates a boundary layer turbomachine 1000 configured as a vacuum pump. In this case, the fluid can enter the turbomachine via openings 1012 located radially outward from the rotational axis, and can move radially inward to exit the turbomachine via an opening 1013 located on or about the rotational axis. This can cause a suction to create a vacuum. In one aspect, a check valve 1094 can be associated with the outlet to prevent backflow of fluid into an evacuated chamber.

Figure 22C:
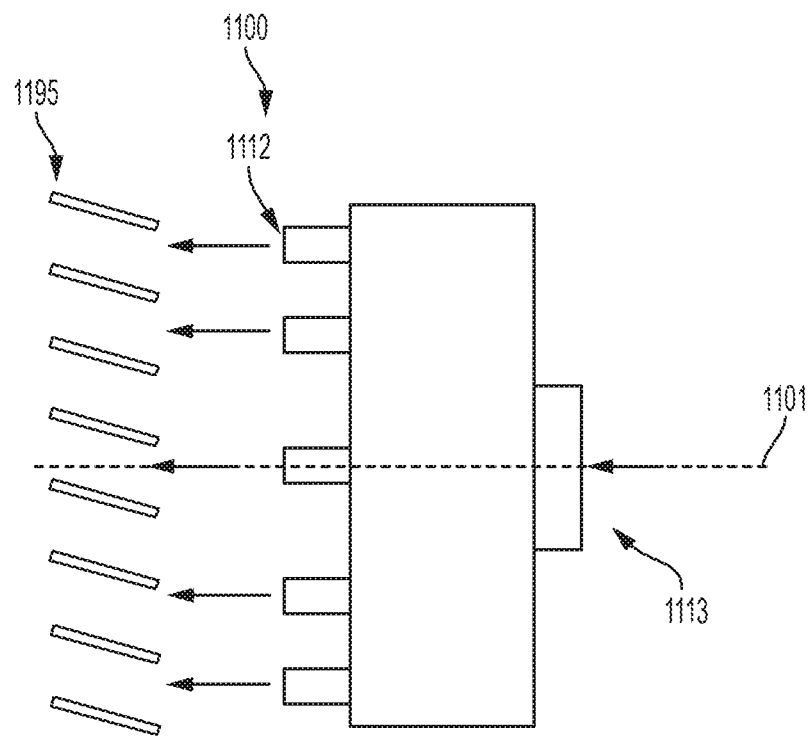
FIG. 22C is a schematic illustration of a boundary layer turbomachines configured as a fan or a blower in accordance with an example of the present disclosure.

FIG. 22C illustrates a boundary layer turbomachine 1100 configured as a fan or a blower. In this case, the fluid can enter the turbomachine via an opening 1113 located on or about the rotational axis 1101, and can move radially outward (accelerated) to exit the turbomachine via openings 1112 located radially outward from the rotational axis. In one aspect, a fluid guide structure 1195 can be included to control the direction of fluid movement upon exiting the turbomachine. For example, a housing of the turbomachine can be configured to control the exit direction of the fluid.

Figure 22D:
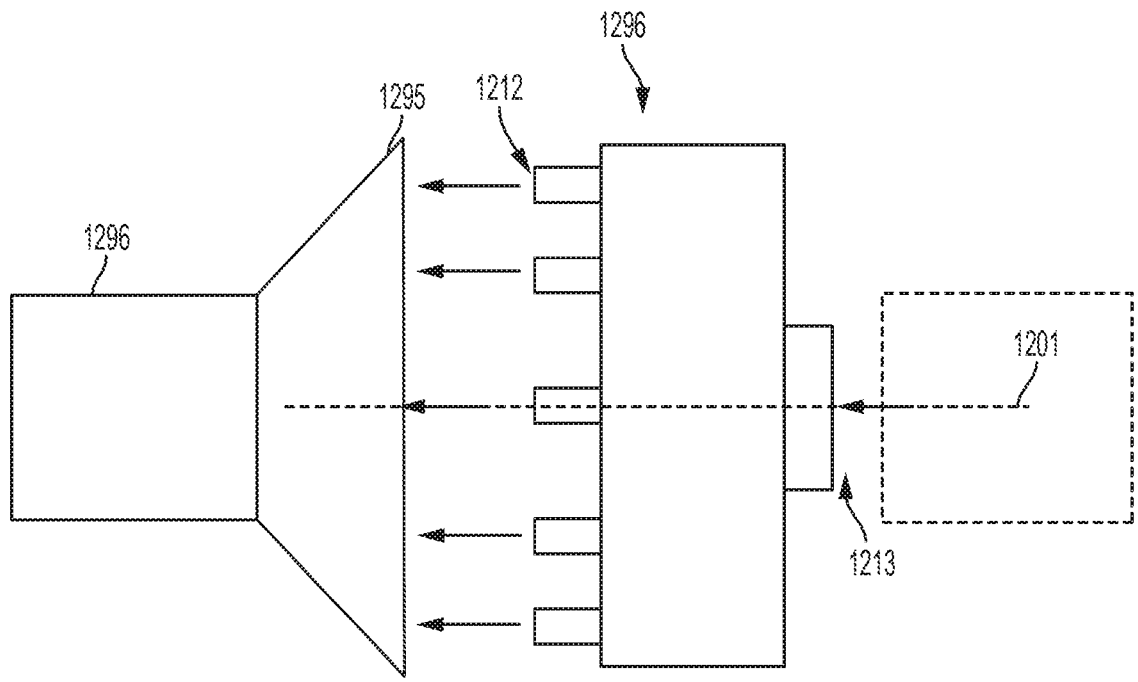
FIG. 22D is a schematic illustration of a boundary layer turbomachines configured as an in-line pump in accordance with an example of the present disclosure.

FIG. 22D illustrates a boundary layer turbomachine 1200 configured as an in-line pump coupled to a fluid conduit 1296. In this case, the fluid can enter the turbomachine via an opening 1213 located on or about the rotational axis 1201, and can move radially outward (accelerated) to exit the turbomachine via openings 1212 located radially outward from the rotational axis. In one aspect, a fluid guide structure 1295 can be included to cause the fluid to converge back to the smaller diameter fluid conduit. For example, a housing of the turbomachine can be configured to funnel or direct the fluid to the conduit.

Figure 22E:
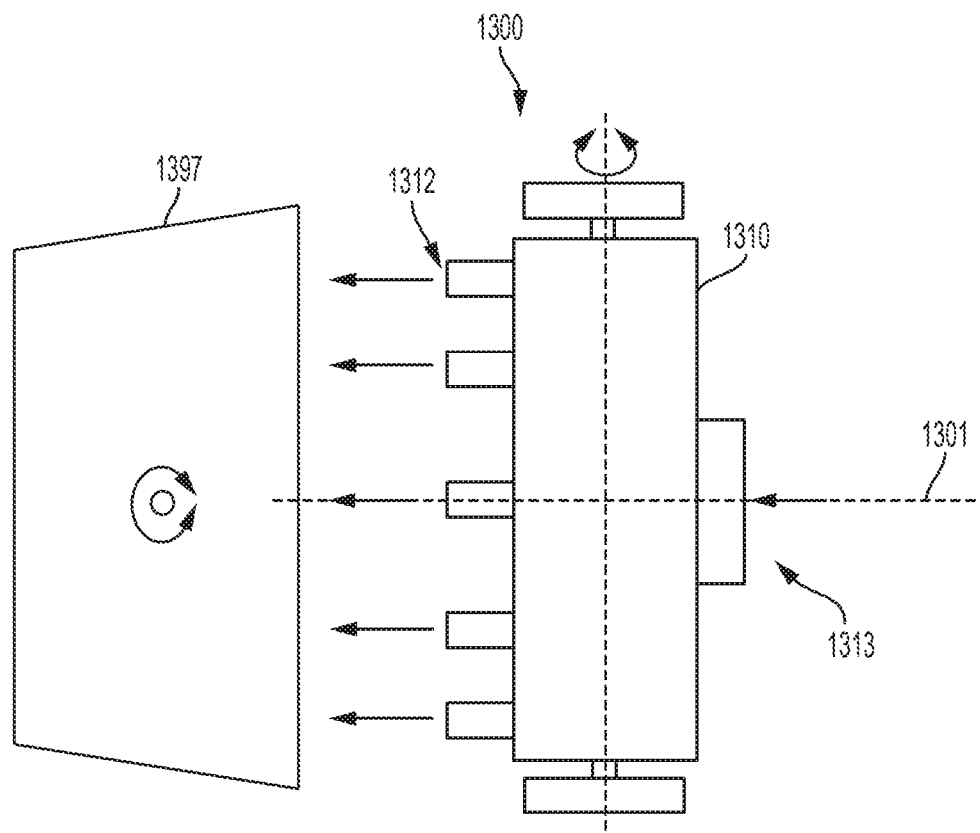
FIG. 22E is a schematic illustration of a boundary layer turbomachines configured as a boat motor in accordance with an example of the present disclosure.

FIG. 22E illustrates a boundary layer turbomachine 1300 configured as a boat motor. In this case, the fluid can enter the turbomachine via an opening 1313 located on or about the rotational axis 1301, and can move radially outward to exit the turbomachine via openings 1312 located radially outward from the rotational axis for an efficient transfer of rotational force towards horizontal movement. In one aspect, the fluid can be directed for vector thrust. For example, the housing 1310 can be configured to rotate and/or a nozzle 1397 downstream can be configured to rotate in order to direct the exiting fluid in one or more degrees of freedom.

Figure 22F:
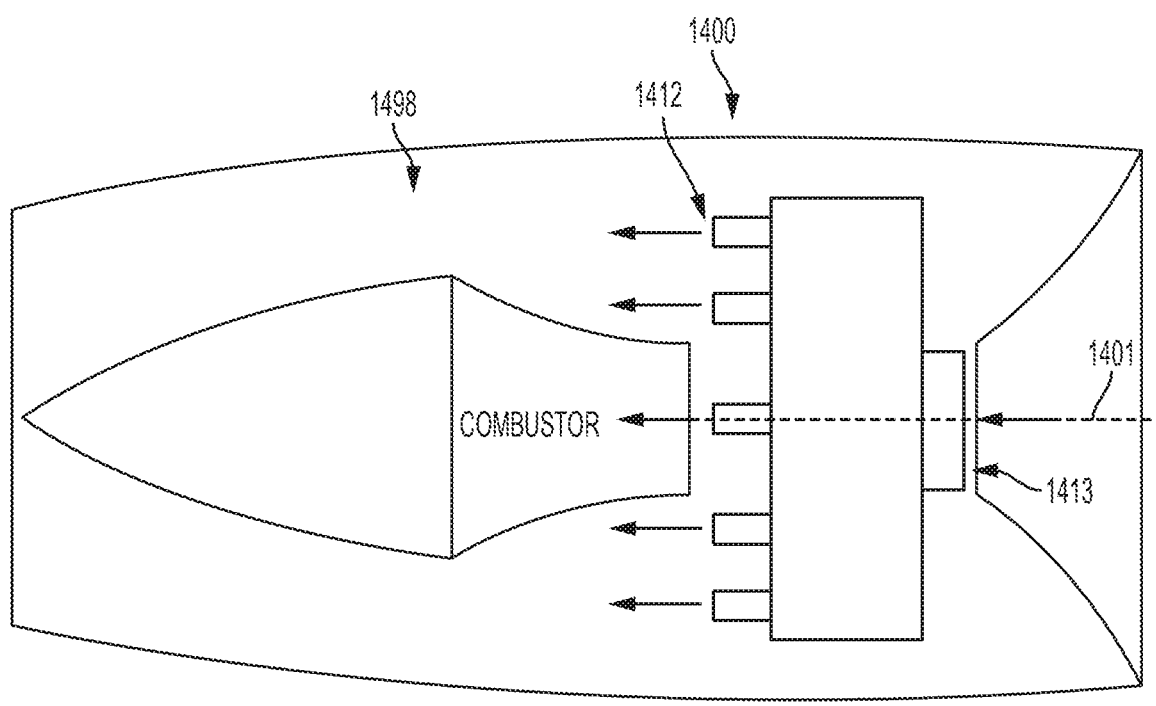
FIG. 22F is a schematic illustration of a boundary layer turbomachines configured as a thruster in accordance with an example of the present disclosure.

FIG. 22F illustrates a boundary layer turbomachine 1400 configured as a thruster. In this case, the fluid can enter the turbomachine via an opening 1413 located on or about the rotational axis 1401, and can move radially outward to exit the turbomachine via openings 1412 located radially outward from the rotational axis where the air is compressed for combustion. Opening 1413 can be configured as with inlet assembly 844 described previously in order to transition flow to a rectangular cross-section. The expansion from this combustion can be funneled out through a Venturi nozzle 1498 to efficiently create thrust. The boundary layer turbomachines 1300, 1400 of FIGS. 22E and 21F can be used to provide power or thrust for any suitable transportation platform, such as an aircraft, a watercraft (e. g., a boat or a submarine), or a land-based or terrestrial transportation platform.

The direction of fluid flow illustrated in FIGS. 22A-22F represent examples of the fluid flow direction for a given type of boundary layer turbomachine or application. It should be recognized that the direction of fluid flow for a given type of boundary layer turbomachine or application may vary from that depicted in the figures.

Furthermore, the apparatus can also be used as a chiller and/or a condenser in refrigeration, HVAC, or engine cooling applications.

Figure 23A:
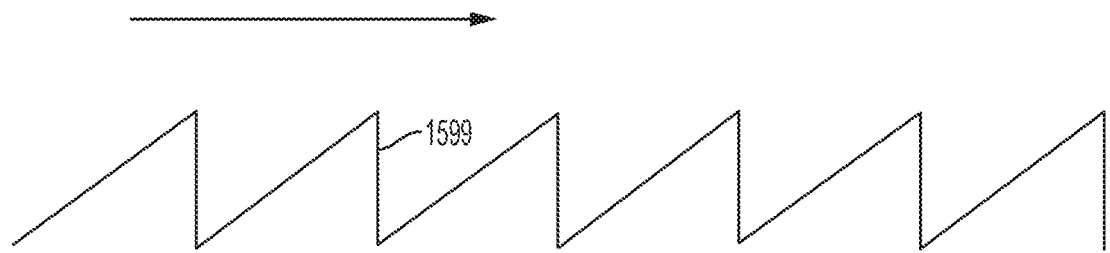
FIGS. 23A-23C illustrate drag reducing structures for surfaces exposed to fluid flow, in accordance with several examples of the present disclosure.
Figure 23B:
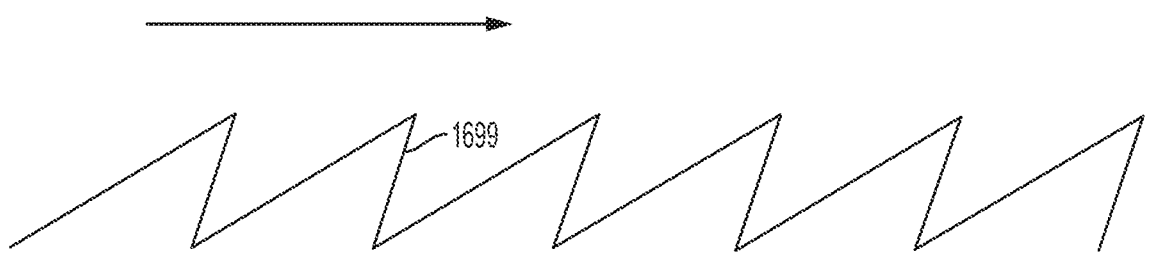
Figure 23C:
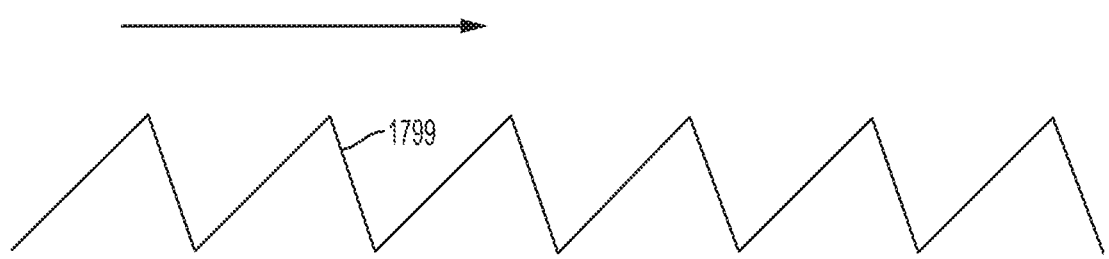

FIGS. 23A-23C illustrate drag reducing structures for surfaces exposed to fluid flow, in accordance with several examples of the present disclosure. As shown in the figures, ridges with leading edges angled or directed with the direction of fluid flow can create a vacuum on the trailing edges as fluid passes over the ridges, forming vortices. The result is similar to an air bearing, which can reduce drag over the surface of the ridges. In one aspect, the ridges can have trailing edges that are vertical (1599 in FIG. 23A), undercut (1699 in FIG. 23B), and/or extend away from peaks of the ridges in the direction of flow (1799 in FIG. 23C). The ridges can be of any suitable height. In one aspect, the ridges are about 0.030 inch in height. The drag reducing structures can be applied to any surface that is exposed to fluid flow, such as an aerodynamic surface, a vehicle body, a nozzle, etc.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A boundary layer turbomachine, comprising:
    a housing defining an interior space including a rotor chamber, the housing having an inlet opening and an outlet opening to facilitate movement of a fluid through the housing; and
    a rotor assembly disposed in the rotor chamber and configured to rotate about an axis of rotation, the rotor assembly having
        a plurality of disks spaced apart along the axis of rotation to provide gaps between the disks, the plurality of disks defining an interior opening along the axis of rotation, and
        a disk carrier comprising a hollow shaft disposed at least partially in the interior opening in support, of the plurality of disks, the disk carrier comprising:
            a fluid passageway formed in the hollow shaft and exposed to two or more of the gaps between the disks, wherein the fluid passes through the gaps between the disks and the interior opening as the fluid moves through the housing, and
            a first extension portion and a second extension portion of the hollow shaft disposed on respective ends of the disk carrier to couple the rotor assembly to the housing and facilitate rotation of the rotor assembly about the axis of rotation, and
            a first vent port and a second vent port in fluid communication with the interior opening, the first, vent extending through the first extension portion and the second vent extending through the second extension portion of the hollow shaft;

the boundary layer turbo machine further comprising at least one of:

a partition circumferentially dividing the interior space into an outer chamber and the rotor chamber located radially inward of the outer chamber, the partition having partition openings such that fluid is movable through the partition between the outer chamber and the rotor chamber, wherein the outer chamber is an annular volume having a uniform radial thickness around an entire circumference of the outer chamber; and a plurality of first outer fluid passageways formed through an outer circumferential surface of the first extension portion of the hollow shaft to be in fluid communication with the first vent port and a plurality of second outer fluid passageways formed through an outer circumferential surf ace of the second extension portion of the hollow shaft to be in fluid communication with the second vent port.

2. The boundary layer turbomachine of claim 1, wherein the fluid passageway comprises a plurality of fluid passageways.

3. The boundary layer turbomachine of claim 2, wherein the plurality of fluid passageways are distributed circumferentially about the disk carrier and extend along a disk portion of the disk carrier.

4. The boundary layer turbomachine of claim 1, wherein the disk carrier comprises a disk coupling interface portion, and at least one of the plurality of disks comprises a carrier coupling interface portion, and wherein the disk coupling interface portion and the carrier coupling interface portion interface to couple the disk carrier and the at least one of the plurality of disks to one another.

5. The boundary layer turbomachine of claim 4, wherein the disk coupling interface portion extends radially outward relative to the axis of rotation.

6. The boundary layer turbomachine of claim 4, wherein the disk coupling interface portion and the carrier coupling interface portion comprise complementary protrusions circumferentially offset from one another about the axis of rotation.

7. The boundary layer turbomachine of claim 4, further comprising a support disk to couple with and provide support for the plurality of disks, the support disk having a second carrier coupling interface portion, wherein the disk coupling interface portion and the second carrier coupling interface portion interface to couple the disk carrier and the support disk to one another, wherein the support disk is at least one of: an outer support disk configured to be disposed at an end of the plurality of disks, and an inner support disk configured to be disposed between at least two of the plurality of disks.

8. The boundary layer turbomachine of claim 4, wherein the fluid passageway comprises a plurality of fluid passageways defined at least in part by a plurality of spans extending along the axis of rotation, and wherein the disk coupling interface portion is associated with the plurality of spans.

9. The boundary layer turbomachine of claim 8, wherein the plurality of spans extend parallel to the axis of rotation.

10. The boundary layer turbomachine of claim 8, wherein the disk carrier further comprises a mid-span support coupled to the plurality of spans and extending circumferentially about the disk carrier to provide support for the spans.

11. The boundary layer turbomachine of claim 1, wherein the plurality of disks are oriented perpendicular to the axis of rotation.

12. The boundary layer turbomachine of claim 1, further comprising a flywheel coupled to the rotor assembly.

13. The boundary layer turbomachine of claim 1, wherein the inlet opening is associated with the outer chamber such that the outer chamber serves as an expansion chamber for the fluid.

14. The boundary layer turbomachine of claim 13, wherein a cross-section of the outer chamber is uniform 360 degrees about the axis of rotation.

15. The boundary layer turbomachine of claim 1, wherein at least one of the plurality of disks is a solid disk with no fluid communication through the at least one disk in a direction parallel to the axis of rotation, other than through the central opening.

16. The boundary layer turbomachine of claim 1, wherein the plurality of first outer fluid passageways and the plurality of second fluid passageways are configured allow fluid to pass between an interior and an exterior of the disk carrier.

17. The boundary layer turbomachine of claim 1, wherein the plurality of first outer fluid passageways are distributed circumferentially about the outer circumferential surface at the first extension portion, and wherein the plurality of second outer fluid passageways are distributed circumferentially about the outer circumferential surface at the second extension portion.

18. The boundary layer turbomachine of claim 17, wherein the plurality of first outer fluid passageways and the plurality of second outer fluid passageways are respectively formed through the circumferential surface at portions of the first extension portion and the second extension portion disposed outside of the housing.

19. A rotor assembly for a boundary layer turbomachine, comprising:

a plurality of disks spaced apart along an axis of rotation to provide gaps between the disks, the plurality of disks defining an interior opening along the axis of rotation;

a disk carrier comprising a hollow shaft disposed at least partially in the interior opening in support of the plurality of disks, the disk carrier comprising:

a fluid passageway formed in the hollow shaft and exposed to at least two of the gaps between the disks, such that fluid passes through the at least two of the gaps between the disks and the interior opening as the fluid moves through the rotor assembly, and a first extension portion and a second extension portion of the hollow shaft disposed on respective ends of the disk carrier to facilitate rotation of the rotor assembly about the axis of rotation, and a first vent port and a second vent port in fluid communication with the interior opening, the first vent extending through the first extension portion and the second vent extending through the second extension portion of the hollow shaft; and a plurality of first outer fluid passageways formed through an outer circumferential surface of the first extension portion of the hollow shaft to be in fluid communication with the first vent port and a plurality of second outer fluid passageways formed through an outer circumferential surface of the second extension portion of the hollow shaft to be in fluid communication with the second vent port.

20. The rotor assembly of claim 19, wherein the fluid passageway comprises a plurality of fluid passageways, and wherein the plurality of disks are oriented perpendicular to the axis of rotation.

21. The rotor assembly of claim 20, wherein the plurality of fluid passageways are distributed circumferentially about the disk carrier.

22. The rotor assembly of claim 19, wherein the first extension portion and the second extension portion couple the rotor assembly to portions of the turbomachine.

23. The rotor assembly of claim 19, wherein at least one of the plurality of disks is a solid disk with no fluid communication through the at least one disk in a direction parallel to the axis of rotation, other than through the central opening.

* * * * *